United States Patent
Wang et al.

(10) Patent No.: US 9,400,903 B2
(45) Date of Patent: Jul. 26, 2016

(54) COMMUNICATION METHOD, DEVICE, AND SYSTEM

(71) Applicant: NATIONZ TECHNOLOGIES INC., Shenzhen (CN)

(72) Inventors: Haixiang Wang, Shenzhen (CN); Rui Dong, Shenzhen (CN)

(73) Assignee: NATIONZ TECHNOLOGIES INC., Shenzhen (CN)

( * ) Notice: Subject to any disclaimer, the term of this patent is extended or adjusted under 35 U.S.C. 154(b) by 322 days.

(21) Appl. No.: 14/162,787

(22) Filed: Jan. 24, 2014

(65) Prior Publication Data

US 2014/0139322 A1 May 22, 2014

Related U.S. Application Data

(63) Continuation of application No. PCT/CN2012/074390, filed on Apr. 19, 2012.

(30) Foreign Application Priority Data

| May 3, 2011 | (CN) | 2011 1 0112459 |
|---|---|---|
| May 3, 2011 | (CN) | 2011 1 0112747 |
| May 3, 2011 | (CN) | 2011 1 0112756 |
| May 3, 2011 | (CN) | 2011 1 0112777 |

(51) Int. Cl.
*G06K 7/10* (2006.01)
*G06F 21/83* (2013.01)
*H04B 5/00* (2006.01)

(52) U.S. Cl.
CPC ............ *G06K 7/10366* (2013.01); *G06F 21/83* (2013.01); *G06K 7/10267* (2013.01); *H04B 5/0031* (2013.01); *H04B 5/0075* (2013.01)

(58) Field of Classification Search
CPC ........... G06K 7/10366; G06K 7/10267; H04B 5/0031; H04B 5/0075; G06F 21/83
USPC ................................................ 340/10.1–10.5
See application file for complete search history.

(56) References Cited

U.S. PATENT DOCUMENTS

| 6,356,198 | B1 * | 3/2002 | Wuidart | G06K 19/07777 235/384 |
|---|---|---|---|---|
| 6,685,096 | B1 * | 2/2004 | Degrauwe | G06K 19/0716 235/375 |
| 2005/0093374 | A1 * | 5/2005 | Connors | G06K 19/0705 307/126 |
| 2005/0258940 | A1 * | 11/2005 | Quan | G06K 7/0008 340/10.3 |
| 2007/0111746 | A1 * | 5/2007 | Anderson | H04W 52/223 455/522 |
| 2007/0129039 | A1 * | 6/2007 | Sherrets | G06K 7/0008 455/230 |

* cited by examiner

*Primary Examiner* — Jennifer Mehmood
*Assistant Examiner* — Omar Casillashernandez
(74) *Attorney, Agent, or Firm* — Anova Law Group, PLLC

(57) ABSTRACT

The present invention relates to a communication method, device, and system. The communication method include using low-frequency alternating magnetic field signals to control a communication distance between a first radio frequency (RF) device and second RF device. The communication device receives and uses a first low-frequency alternating magnetic field signal transmitted from a second RF device to control the communication distance to the second RF device. The communication system includes a first RF device and a second RF device. The first RF device generates and transmits a first low-frequency alternating magnetic field signal and receives a second low-frequency alternating magnetic field signal, and the second RF device generates and transmits the second low-frequency alternating magnetic field signal and receives the first low-frequency alternating magnetic field signal. The first RF device and the second RF device control the communication distance using the first and second low-frequency alternating magnetic field signals.

12 Claims, 24 Drawing Sheets

| Preamble (FF) | Control field (8bit) (Length, data type) | IDr 32bit | CRC 8bit |

| Preamble (FF) | Control field (8bit) (Length, data type) | Idr+Idc 64bit | CRC 8bit |

| Preamble (FF) | Control field (8bit) (Length, data type) | IDr 32bit | CRC 8bit |

| Preamble (FF) | Control field (8bit) (Length, data type) | Idr+Idc 64bit | CRC 8bit |

COMMUNICATION METHOD, DEVICE, AND SYSTEM

FIELD OF THE INVENTION

The present invention relates to the field of communication and, more particularly, relates to a communication system method, a communication device, and a communication system.

BACKGROUND

With the growing popularity of mobile terminals, mobile payments using mobile terminals has become in high and urgent demands. Although there are many implementation solutions, these solutions all have their disadvantages. Currently, methods adding radio frequency (RF) functions onto the subscriber identity module (SIM) of a mobile terminal (called an RF SIM card) or adding a short-distance communication module on the main board of a mobile terminal to achieve a short-distance communication of the mobile terminal have been developed. The later short-distance communication is called near field communication (NFC). These methods have enabled the mobile terminal to become a super smart terminal which can be used to recharge, shop, transact, or verify identification. This significantly fulfills the imperious market demands.

The short-distance solution based on the mobile-terminals with RF SIM cards has attracted extensive attentions because of its simplicity and no need to modify the mobile terminals. In such solution, the RF SIM card uses an ultra-high frequency (UHF) technology. Because the UHF SIM card, especially the SIM card using a 2.4 GHz·ISM public frequency range (i.e., the industry, science, and medical frequency), has a very high working frequency, and the size of antenna is small, RF signals with sufficient strength can be generated by putting a small antenna in a SIM card. Thus, even when the SIM card is installed inside a mobile terminal, the RF signals can still emit from the mobile terminal. An industry-widely-used RF transceiver chip installed in a card reader can reliably receive RF signals from a majority of the mobile terminals without extra amplification. Thus, this can enable the mobile terminals to achieve the short-distance communication function without modifying the existing mobile terminals. However, current technologies often fail to effectively control the communication distance between the RF card and a card reader.

SUMMARY OF THE INVENTION

The present invention provides a communication method, a communication device, and a communication system to solve the problems of prior art as being unable to effective control RF communication distance.

To solve such problems, the present invention provides the following technical solutions.

A communication method includes controlling a communication distance between a first radio frequency (RF) device and a second RF device using a low-frequency magnetic field; and exchanging information between the first RF device and the second RF device within a predetermined distance range using RF channels.

In one embodiment, one of the first RF device and the second RF device receives a first low-frequency alternating magnetic field signal from the other of the first RF device and the second RF device to control communication distance between the first RF device and the second RF device.

In one embodiment, receiving the first low-frequency alternating magnetic signal to control the communication distance further includes detecting the received first low-frequency alternating magnetic field signal; converting the first low-frequency alternating magnetic field signal into a first electrical signal; comparing the first electrical signal with a first preset threshold value; and controlling the communication distance between the first RF device and second RF device based on a comparison result.

In one embodiment, when the first electrical signal is greater than or equal to the first preset threshold value, determining that the first RF device and second RF device are within the predetermined distance range.

In one embodiment, the first low-frequency alternating magnetic field signal is related to a frequency f0 and, when a frequency of first low-frequency alternating magnetic field signal is less than or equal to the frequency f0, the first RF device and the second RF device are within a valid distance range.

In one embodiment, the first RF device is a card reader, the second RF device is a card, and the frequency f0 is determined by: determining a distance control target (Din, Dv) based on the first low-frequency alternating magnetic field signal, wherein Din represents a distance in which, within a range of 0-Din, card transaction is ensured, and Dv represents a distance fluctuation range in which, within Din~(Din+Dv), card transaction is allowed and, beyond Din+Dv, card transaction is not allowed; determining a detection voltage fluctuation range $\delta_R$ of the card reader; determining a detection voltage fluctuation range $\delta_C$ of the card; determining voltage-distance curves of the plurality typical terminals and obstacles at the frequency f of first low-frequency alternating magnetic field signal; based on the distance control target (Din, Dv), determining a detection voltage fluctuation range $\delta_A$ of the card reader, the range $\delta_A$ being equal to a difference between a voltage corresponding to a distance point Din on a voltage-distance curve with an average field intensity attenuation curve slope and obtained from the voltage-distance curves of the plurality of typical terminals and obstacles and the voltage corresponding to a distance point (Din+Dv); determining a detection voltage fluctuation range $\delta_T$ of the of the card caused by a mobile terminal containing the card, the parameter $\delta_T$ representing a fluctuation range of a detection voltage of the card caused by attenuation characteristics of the mobile terminal and $\delta_T = \delta_A - \delta_R - \delta_C$; calculating a maximum field intensity difference $\delta$ at various distances with distance control range of various typical terminals and obstacles; if $\delta$ is greater than $\delta_T$, decreasing the frequency f and continuing from the step of determining the voltage-distance curves; if $\delta$ is less than $\delta_T$, increasing the frequency f and continuing from the step of determining the voltage-distance curves; and if $\delta$ is equal to $\delta_T$, determining the current frequency f is the frequency f0.

In one embodiment, the modulation mode, the coding mode, and the transmission magnetic flux density Bc of the first low-frequency alternating magnetic field signal is selected by: selecting a coding mode without an average DC component; selecting no modulation or a carrier modulation mode without amplitude change; selecting the transmission magnetic flux density Bc by: under a selected operating frequency that is less than f0, a selected modulation and a selected coding mode, selecting magnetic detection and the amplification gain that are easy to achieve by the card reader; detecting an inherent noise voltage amplitude Vn of the detection voltage of the card reader when no low-frequency alternating magnetic field signal; detecting the detection voltage Vr of the card reader when the card reader is sending the low-frequency alternating magnetic field signal using the selected modulation and coding mode; and selecting the transmission magnetic flux density Bc such that such that Vr/Vn>SNR, where SNR is signal-to-noise-ratio of the card reader.

In one embodiment, the encoding mode of the first low-frequency alternating magnetic field signal is a Manchester code, a Differential Manchester code, or an NRZ code.

In one embodiment, the modulation of the first low-frequency alternating magnetic field signal is an on-off keying modulation, a phase shift keying modulation, or a frequency shift keying modulation.

In one embodiment, the first electrical signal is a voltage signal, the first threshold value is a voltage threshold Vt, and the voltage threshold Vt is determined by: under selected transmission parameters, measuring voltage-distance curves of a plurality of typical terminals and obstacles, the selected transmission parameters including a frequency of the low-frequency alternating magnetic field signal, a modulation mode, a coding mode, and a transmission magnetic flux density Br; and obtaining a reference voltage-distance curve, the reference voltage-distance curve being a average value of curves of the typical terminals and obstacles; and selecting a voltage value at a distance point at half of a maximum valid card transaction range on the reference voltage-distance curve as Vt for the card reader.

In one embodiment, the frequency of the low-frequency alternating magnetic field signal is in a range of approximately 300 Hz~50 KHz.

In one embodiment, the frequency of the low-frequency alternating magnetic field signal is one of 10 KHz, 15 KHz, 20 KHz, 25 KHz, and 30 KHz.

In one embodiment, the one of the first RF device and the second RF device sends a second low-frequency alternating magnetic field signal to the other of the first RF device and the second RF device with communication distance confirmation information.

In one embodiment, one of the first RF device and the second RF device sends a first low-frequency alternating magnetic field signal to the other of the first RF device and the second RF device, and receives a second low-frequency alternating magnetic field signal from the other of the first RF device and the second RF device; and identification information carried in the second low-frequency alternating magnetic field signal is used to control communication distance between the first RF device and the second RF device.

In one embodiment, when the identification information in the second low-frequency alternating magnetic field signal is the same as identification information of the one of the first RF device and the second RF device sending the first low-frequency alternating magnetic field signal, it is determined that the first RF device and the second RF device are within a valid distance range.

In one embodiment, one of the first RF device and the second RF device converts the second low-frequency alternating magnetic field signal into a second electrical signal and compares the second electrical signal with a second preset threshold; and when the second electrical signal is greater than or equal to the second preset threshold and the identification information in the second low-frequency alternating magnetic field signal is the same as identification information of the one of the first RF device and the second RF device sending the first low-frequency alternating magnetic field signal, it is determined that the first RF device and the second RF device are within a valid distance range.

In one embodiment, the other of the first RF device and the second RF device controls the communication distance between the first RF device and the second RF device based on received first low-frequency alternating magnetic field signal and, when it is considered that the first RF device and the second RF device are within a valid distance range, sends back the second low-frequency alternating magnetic field signal.

In one embodiment, the other of the first RF device and the second RF device controlling the communication distance between the first RF device and the second RF device based on received first low-frequency alternating magnetic field signal further includes: converting the first low-frequency alternating magnetic field signal into a first electrical signal; comparing the first electrical signal with a first preset threshold value; and controlling the communication distance between the first RF device and second RF device based on a comparison result.

In one embodiment, when the first electrical signal is greater than or equal to the first preset threshold value, determining that the first RF device and second RF device are within the predetermined distance range.

In one embodiment, the first RF device is a card reader, the second RF device is a card, the first low-frequency alternating magnetic field signal is related to a frequency f0 and, when a frequency of first low-frequency alternating magnetic field signal is less than or equal to the frequency f0, mobile terminals equipped with the second RF device are within a valid distance range, the frequency f0 is determined by: determining a distance control target (Din, Dv) based on the first low-frequency alternating magnetic field signal, wherein Din represents a distance in which, within a range of 0-Din, card transaction is ensured for the mobile terminals equipped with the second RF device, and Dv represents a distance fluctuation range in which, within Din~(Din+Dv), card transaction is allowed and, beyond Din+Dv, card transaction is not allowed; determining a detection voltage fluctuation range $\delta_R$ of the second RF device caused by the first RF device; determining a detection voltage fluctuation range $\delta_C$ caused by the second RF device; determining voltage-distance curves of the plurality typical terminals and obstacles at the frequency f of first low-frequency alternating magnetic field signal; based on the distance control target (Din, Dv), determining a detection voltage fluctuation range $\delta_A$ of the second RF device, the range $\delta_A$ being equal to a difference between a voltage corresponding to a distance point Din on a voltage-distance curve with an average field intensity attenuation curve slope and obtained from the voltage-distance curves of the plurality of typical terminals and obstacles and the voltage corresponding to a distance point (Din+Dv); determining a detection voltage fluctuation range $\delta_T$ of the second RF device caused by a mobile terminal containing the second RF device, the parameter $\delta_T$ representing a fluctuation range of a detection voltage of the card caused by attenuation characteristics of the mobile terminal and $\delta_T = \delta_A - \delta_R - \delta_C$; calculating a maximum field intensity difference $\delta$ at various distances with distance control range of various typical terminals and obstacles; if $\delta$ is greater than $\delta_T$, decreasing the frequency f and continuing from the step of determining the voltage-distance curves; if $\delta$ is less than $\delta_T$, increasing the frequency f and continuing from the step of determining the voltage-distance curves; and if $\delta$ is equal to $\delta_T$, determining the current frequency f is the frequency f0.

In one embodiment, the first RF device is a card reader, the second RF device is a card, the second low-frequency alternating magnetic field signal is related to a frequency f0' and, when a frequency of second low-frequency alternating magnetic field signal is less than or equal to the frequency f0', mobile terminals equipped with the second RF device are within a valid distance range, the frequency f0' is determined by: determining a distance control target (Din, Dv') based on the second low-frequency alternating magnetic field signal, wherein Din represents a distance in which, within a range of 0-Din, card transaction is ensured for the mobile terminals equipped with the second RF device, and Dv' represents a distance fluctuation range in which, within Din~(Din+Dv'), card transaction is allowed and, beyond Din+Dv', card transaction is not allowed; determining a detection voltage fluctuation range $\delta_R$ of the first RF device caused by the second RF device; determining a detection voltage fluctuation range $\delta_C$ caused by the first RF device; determining voltage-distance curves of the plurality typical terminals and obstacles at the frequency f' of second low-frequency alternating magnetic field signal; based on the distance control target (Din, Dv'), determining a detection voltage fluctuation range $\delta_A'$ of the first RF device, the range $\delta_A'$ being equal to a difference between a voltage corresponding to a distance point Din on a voltage-distance curve with an average field intensity attenuation curve slope and obtained from the voltage-distance curves of the plurality of typical terminals and obstacles and the voltage corresponding to a distance point (Din+Dv'); determining a detection voltage fluctuation range $\delta_T'$ caused by a mobile terminal containing the second RF device, the parameter $\delta_T'$ representing a fluctuation range of a detection voltage of the card caused by attenuation characteristics of the mobile terminal and $\delta_T' = \delta_A' - \delta_R' - \delta_C'$; and calculating a maximum field intensity difference $\delta'$ at various distances with distance control range of various typical terminals and obstacles; if $\delta'$ is greater than $\delta_T'$, decreasing the frequency f and continuing from the step of determining the voltage-distance curves; if $\delta'$ is less than $\delta_T'$, increasing the frequency f and continuing from the step of determining the voltage-distance curves; and if $\delta'$ is equal to $\delta_T'$, determining the current frequency f' is the frequency f0'.

In one embodiment, the modulation mode, the coding mode, and the transmission magnetic flux density Br of the first low-frequency alternating magnetic field signal is selected by: selecting a coding mode without an average DC component; selecting no modulation or a carrier modulation mode without amplitude change; selecting the transmission magnetic flux density Br by: under a selected operating frequency that is less than f0, a selected modulation and a selected coding mode, selecting a typical noise mobile terminal and magnetic detection and the amplification gain that are easy to achieve in the second RF device; detecting an inherent noise voltage amplitude Vn of the detection voltage of the second RF device when no low-frequency alternating magnetic field signal; detecting the detection voltage Vc of the second RF device when the first RF device is sending the low-frequency alternating magnetic field signal using the selected modulation and coding mode; and selecting the transmission magnetic flux density Br such that such that Vc/Vn>SNR, where SNR is signal-to-noise-ratio of the second RF device.

In one embodiment, the encoding mode of the first low-frequency alternating magnetic field signal is a Manchester code, a Differential Manchester code, or an NRZ code.

In one embodiment, the modulation of the first low-frequency alternating magnetic field signal is an on-off keying modulation, a phase shift keying modulation, or a frequency shift keying modulation.

In one embodiment, the modulation mode, the coding mode, and the transmission magnetic flux density Bc of the second low-frequency alternating magnetic field signal is selected by: selecting a coding mode without an average DC component; selecting no modulation or a carrier modulation mode without amplitude change; selecting the transmission magnetic flux density Bc by: under a selected operating frequency that is less than f0', the selected modulation and the selected coding mode, selecting a typical noise terminal and magnetic detection and the amplification gain that are easy to achieve by the first RF device; detecting an inherent noise voltage amplitude Vn' of the detection voltage of the first RF device when no low-frequency alternating magnetic field signal; detecting the detection voltage Vr of the first RF device when the mobile terminal is sending the low-frequency alternating magnetic field signal using the selected modulation and coding mode; and selecting the transmission magnetic flux density Bc such that such that Vr/Vn'>SNR', where SNR' is signal-to-noise-ratio of the first RF device.

In one embodiment, the frequency of each of the first low-frequency alternating magnetic field signal and the second low-frequency alternating magnetic field signal is in one of a low frequency band, a very-low frequency band, and an ultra-low frequency band, wherein the ultra-low frequency band is a range of approximately 300 Hz~3000 Hz, the very-low frequency band is in a range of approximately 3 KHz~30 KHz, and the low frequency band is in a range of approximately 30 KHz~300 KHz.

In one embodiment, the frequency of each of the first low-frequency alternating magnetic field signal and the second low-frequency alternating magnetic field signal is in a range of approximately 300 Hz~50 KHz.

In one embodiment, the frequency of the low-frequency alternating magnetic field signal is one of 500 Hz, 1 KHz, 1.5 KHz, 2 KHz, 2.5 KHz, 3 KHz, 4 KHz, 5 KHz, 10 KHz, 20 KHz, and 30 KHz.

In one embodiment, the frequency of the low-frequency alternating magnetic field signal is one of 10 KHz, 15 KHz, 20 KHz, 25 KHz, and 30 KHz.

A radio frequency (RF) device includes a magnetic signal receiver module configured to receive a first low-frequency alternating magnetic field signal of another RF device; a main control module configured to control a communication distance between the RF device and the another RF device; and an RF transceiver module configured to exchange data with the another RF device within a predetermined distance range.

In one embodiment, the main control module is further configured to: convert the first low-frequency alternating magnetic field signal into a first electrical signal; to compare the first electrical signal with a first preset threshold value; and to control the communication distance between the first RF device and second RF device based on a comparison result.

In one embodiment, the magnetic signal receiver module includes an amplifier circuit, a filter circuit, and a decoding circuit, sequentially connected; the filter circuit is connected to a coupling coil in the RF device; and the decoding circuit is connected to the main controller; the amplifier circuit is configured to amplify a first electrical signal converted from the first low-frequency alternating magnetic field signal received by the coupling coil; the filter circuit is configured to filter the amplified first electrical signal and to suppress noise and interference outside a valid signal frequency band; the decoding circuit is configured to decode the filtered signal based on the coding mode of the RF device sending the first low-frequency alternating magnetic field signal and to send the decoded signal to the main controller.

In one embodiment, the magnetic signal receiver module further includes a demodulation circuit disposed between the filter circuit and the decoding circuit and configured to demodulate the filtered signal based on a modulation scheme used by the another RF device and to send the demodulated signal to the decoding circuit.

In one embodiment, the magnetic signal receiver module includes an amplifier circuit and a filter circuit, sequentially connected; the filter circuit is connected to a coupling coil in the RF device; and the decoding circuit is connected to the main controller; the amplifier circuit is configured to amplify a first electrical signal converted from the first low-frequency alternating magnetic field signal received by the coupling coil; the filter circuit is configured to filter the amplified first electrical signal and to suppress noise and interference outside a valid signal frequency band; the main controller is further configured to decode the filtered signal based on the coding mode of the RF device sending the first low-frequency alternating magnetic field signal.

In one embodiment, the magnetic signal receiver module further includes a demodulation circuit disposed between the filter circuit and the main controller and configured to demodulate the filtered signal based on a modulation scheme used by the another RF device and to send the demodulated signal to the main controller.

In one embodiment, the RF transceiver module includes an RF transceiver, an impedance matching network, and an RF antenna, sequentially connected, and the RF transceiver is connected to the main controller.

In one embodiment, the RF device further includes a magnetic signal transmitting module configured to transmit the communication distance confirmation information to the another RF device.

In one embodiment, the magnetic signal transmitting module includes an encoder circuit, a modulation circuit, a D/A converter circuit, and a drive circuit, sequentially connected, the encoder circuit is connected to the main controller, and the drive circuit is connected to the coupling coil in the RF device; the main controller is configured to generate information carried in the second low-frequency alternating magnetic field signal to be transmitted by the RF device, the second low-frequency alternating magnetic field signal information being a digital baseband signal; the encoder circuit is configured to encode the digital baseband signal provided by the main controller; the D/A converter circuit is configured to convert the encoded digital signal into a low-frequency analog signal; and the drive circuit is configured to amplify the low-frequency analog signal and to drive the coupling coil to generate the second low-frequency alternating magnetic field.

In one embodiment, the magnetic signal transmitting module further includes a modulation circuit disposed between the main controller and the D/A converter circuit; and the modulation circuit is configured to modulate the encoded data and to send the modulated data to the D/A converter circuit.

In one embodiment, the magnetic signal transmitting module further includes a modulation circuit disposed between the main controller and the D/A converter circuit; and the modulation circuit is configured to modulate the encoded digital baseband signal and to send the modulated signal to the D/A converter circuit.

In one embodiment, the magnetic signal transmitting module includes a D/A converter circuit and a drive circuit, sequentially connected, the D/A converter circuit is connected to the main controller, and the drive circuit is connected to the coupling coil in the RF device; the main controller is configured to generate low-frequency encoded data and to send the data to the D/A converter circuit; the D/A converter circuit is configured to convert the low-frequency encoded data into a low-frequency analog signal; and the drive circuit is configured to amplify the low-frequency analog signal and to drive the coupling coil to generate the second low-frequency alternating magnetic field.

In one embodiment, the magnetic signal receiver module and the magnetic signal transmitting module perform two-way communication with the RF device transmitting the first low-frequency alternating magnetic field signal through a time-division duplex mode or a frequency-division duplex mode; and an operating frequency of the magnetic signal receiver module and an operating frequency of the magnetic signal transmitting module both less than a predetermined maximum operating frequency.

A communication system comprises a first radio frequency (RF) device and second RF device, the first RF device and the second RF device control a communication distance using low-frequency alternating magnetic field signals and exchange information between the first RF device and the second RF device using RF channels, the first RF device further includes: a first magnetic signal transceiver configured to generate and transmit a first low-frequency alternating magnetic field signal and to receive a second low-frequency alternating magnetic field signal; a first RF communication unit configured to exchange information with the second RF device; the second RF device further includes: a second magnetic signal transceiver configured to generate and transmit the second low-frequency alternating magnetic field signal and to receive the first low-frequency alternating magnetic field signal; a second RF communication unit configured to exchange information with the first RF communication unit.

In one embodiment, the first magnetic signal transceiver further includes a first magnetic signal receiving unit and a first magnetic signal transmitting unit; the first magnetic signal transmitting unit is configured to transmit the first low-frequency alternating magnetic field signal; and the first magnetic signal receiving unit is configured to receive the second low-frequency alternating magnetic field signal; the second magnetic signal transceiver further includes a second magnetic signal receiving unit and a second magnetic signal transmitting unit; the second magnetic signal transmitting unit is configured to transmit the second low-frequency alternating magnetic field signal; and the second magnetic signal receiving unit is configured to receive the first low-frequency alternating magnetic field signal.

In one embodiment, the first magnetic signal transceiver includes a first modulation unit, and the first modulation unit is configured to add identification information of the first RF device into the first low-frequency alternating magnetic field signal; and the second magnetic signal transceiver includes a second modulation unit, and the second modulation unit is configured to add identification information of the second RF device into the second low-frequency alternating magnetic field signal.

In one embodiment, the first magnetic signal transceiver includes a first determination unit, and the first determination unit is configured to determine whether the first RF device enters into the preset valid card transaction range between the second RF device and the first RF device, based on the second low-frequency alternating magnetic field signal detected by the first RF device; and the second magnetic signal transceiver includes a second determination unit, and the second determination unit is configured to determine whether the second RF device enters into the preset valid card transaction range between the first RF device and the second RF device, based on the first low-frequency alternating magnetic field signal detected by the second RF device; when the second determination unit determines that the second RF device enters into the preset valid card transaction range between the first RF device and the second RF device, and when the first determination unit determines that the first RF device enters into the preset valid card transaction range between the second RF device and the first RF device, it is determined that the distance between the first RF device and the second RF device is within the predetermined effective communication distance range.

In one embodiment, the first determination unit includes a first comparison sub-unit and a first determination sub-unit, the first comparison sub-unit is configured to compare the identification information of the first RF device demodulated from the second low-frequency alternating magnetic field signal with its own identification information; and the first determination sub-unit is configured to, based on a comparison result, determine whether the first RF device enters into a predetermined valid distance range between the second RF device and the first RF device; and the second determination unit includes a second comparison sub-unit and a second determination sub-unit, the second comparison sub-unit is configured to compare the electrical signal converted from the first low-frequency alternating magnetic field signal with the preset threshold value, and the second determination sub-unit is configured to, based on a comparison result, determine whether the second RF device enters into a predetermined valid distance range between the second RF device and the first RF device.

In one embodiment, the first judgment unit includes a third comparison sub-unit and a third determination sub-unit, the third comparison sub-unit is configured to compare a second electrical signal converted from the second low-frequency alternating magnetic field signal with a second threshold value, and the third determination sub-unit is configured to, based on a comparison result, determine whether the second RF device enters into the predetermined valid distance range between the second RF device and the first RF device.

DETAILED DESCRIPTION OF THE INVENTION

Embodiment One

Figure 1:
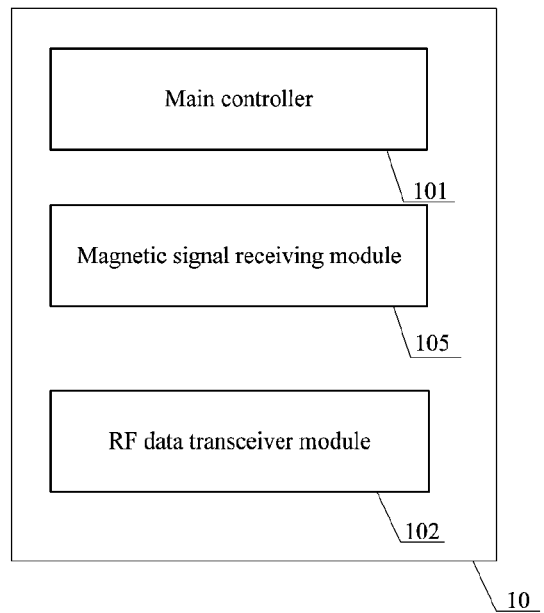
FIG. 1 illustrates a block diagram of an RF device according to the present invention.

As shown in FIG. 1, a radio frequency (RF) device 10 includes an RF data transceiver module 102, and also includes a magnetic signal receiving module 105 for receiving a first low-frequency alternating magnetic field signal emitted by another RF device; a main control module 101 for controlling the communication distance between the RF device 10 and another RF device according to the first low-frequency alternating magnetic field signal. The RF data transceiver module 102 is used by the RF device 10 to exchange information with another RF device within a preset distance range.

That is, the RF device 10 controls the communication distance with the another RF device through the first low-frequency alternating magnetic field signal, and the RF device 10 exchanges information with the another RF device via the RF data transceiver module 102. The other RF device may be an RF card reader. Further, the RF device 10 may be an RF card (e.g., a SIM card, a UIM card, a USIM card, a TF card, or an SD card), may be placed in a mobile terminal, or may be a built-in RF card. The mobile terminal may include a mobile phone, a personal digital assistant PDA, an MP4 or a laptop computer, etc.

Figure 2:
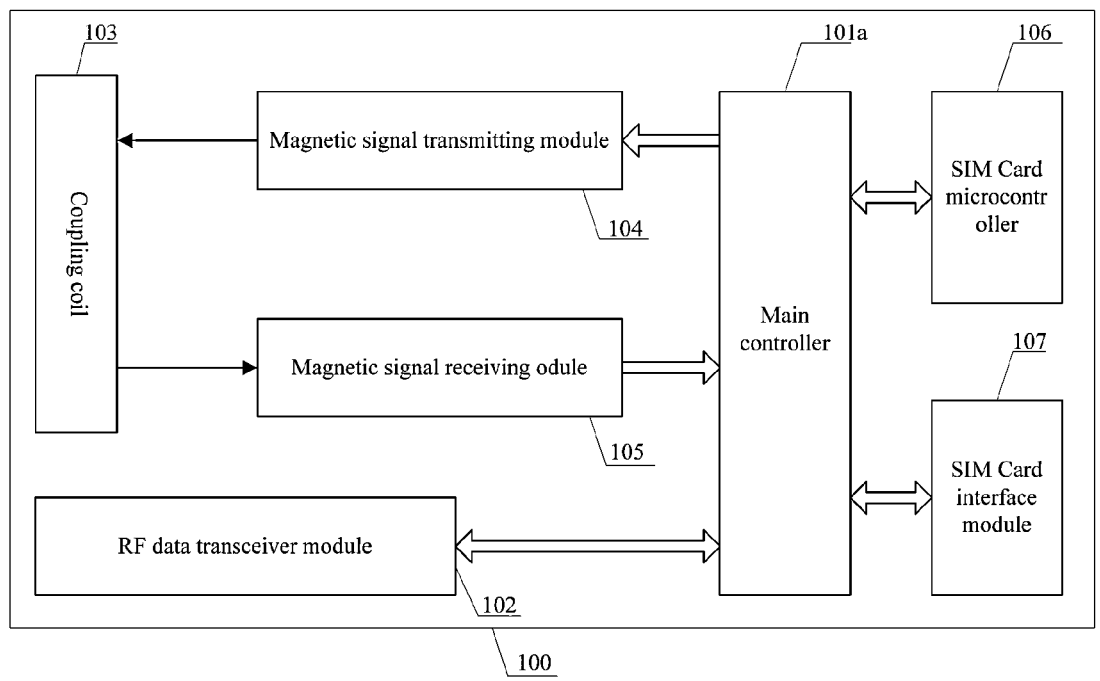
FIG. 2 illustrates a block diagram of an RF SIM card according to the present invention.

The RF device 10 is further described in detail using an SIM card as an example. As shown in FIG. 2, an RF SIM card 100 with two-way low-frequency communication functionality is provided. The RF SIM card 100 includes a main controller 101a, the RF data transceiver module 102, a coupling coil 103, a magnetic signal transmitting module 104, a magnetic signal receiving module 105, an SIM card microcontroller 106, and an SIM card interface module 107.

The magnetic signal receiving module 105 receives a first low-frequency alternating magnetic field signal through the coupling coil 103 and sends the received signal to the main controller 101a. The magnetic signal transmitting module 104 is used to generate and transmit through the coupling coil section 103 a second low-frequency alternating magnetic field signal, the second low-frequency alternating magnetic field signal is used to send RF communication distance confirmation information to the RF card reader transmitting the first low-frequency alternating magnetic field signal.

The first low-frequency alternating magnetic field signal may carry identification information of the RF card reader transmitting the first low-frequency alternating magnetic field signal. The second low-frequency alternating magnetic field signal may carry the identification information of the RF SIM card 100. The magnetic signal receiving module 105 and the magnetic signal transmission module 104 may perform two-way communication with the RF card reader transmitting the first low-frequency alternating magnetic field signal through a time-division duplex mode or a frequency-division duplex mode.

Figure 3:
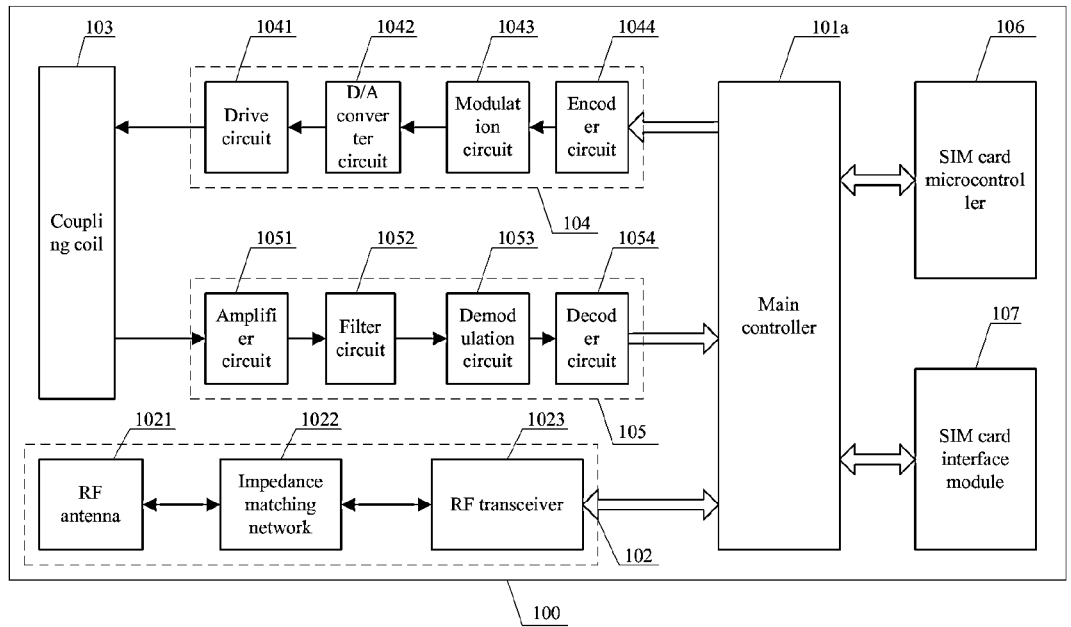
FIG. 3 illustrates a block diagram of a specific configuration of the magnetic signal transmitter module, magnetic signal receiver module, and RF data transceiver module inside an RF SIM card of FIG. 2.

As shown in FIG. 3, the magnetic signal receiving module 105 may includes an amplifier circuit 1051, a filter circuit 1052, a demodulation circuit 1053, and a decoder circuit 1054, sequentially connected with one another. The amplifier circuit 1051 is also connected to the coupling coil 103, and the decoder circuit 1054 is also connected to the main controller 101a. The demodulation circuit 1053 may be optional and, when the first low-frequency magnetic signal received is an un-modulated baseband signal, the filter circuit 1052 may be directly connected to the decoder circuit 1054.

The coupling coil 103 is inductive to and receives the first low-frequency magnetic signal carrying the identification information of the RF card reader, which is generated by the RF card reader, and converts the received magnetic signal to a first electrical signal. The amplifier circuit 1051 performs amplification processing on the first electrical signal reflecting changes of the magnetic field intensity, and increases and adjusts the signal amplitude within a predetermined range. The filter circuit 1052 performs filtering processing on the amplified first electrical signal, and suppresses noise and interference outside a useful signal frequency band. The demodulation circuit 1053 performs demodulation processing on the filtered signal according to the modulation scheme used by the RF card reader. The decoder circuit 1054 performs corresponding decoding processing according to the coding scheme used by the RF card reader. Finally, the main controller 101a is configured to further process the digital baseband signal obtained by the above processes, to determine the inductive magnetic field intensity based on the signal amplitude, and to determine whether the one-way communication distance from the RF card reader to the mobile terminal having the RF SIM card 100. Meanwhile, the main controller 101a may obtain the identification information of the RF card reader carried in the baseband signal and determine whether to trigger a next step operation.

The amplifier circuit 1051 may be a unilateral amplifier circuit or differential amplifier circuit or a fully differential amplifier circuit, and the gain may be adjusted flexibly according to the communication distance. The filter circuit 1052 may use an analog band-pass filter structure, a passive RC filter structure, or an active filter structure with an operational amplifier or a dedicated filter IC, and its bandwidth may be determined based on the center frequency of the low-frequency magnetic signal and the upper and lower cut-off frequency may also be adjusted flexibly. The demodulation circuit 1053 and the decoder circuit 1054 may be determined based on the modulation scheme and the coding mode of the received low-frequency magnetic signal.

The decoder circuit 1054 may use a corresponding dedicated IC to realize the decoding by hardware, or the main controller 101a may use internal software to realize the decoding. When the decoder circuit 1054 uses dedicated IC hardware to realize the decoding, the connection between the decoder circuit 1054 and the main controller 101a may be a single-line serial mode, or a multi-line parallel mode. When the decoder circuit 1054 uses internal software to realize the decoding, the received first low-frequency magnetic induction signal, after amplifying, filtering, and demodulation (if necessary), is directly sent to the main controller 101a.

Further, the magnetic signal transmitting module 104 includes an encoder circuit 1044, a modulation circuit 1043, a D/A converter circuit 1042, and a drive circuit 1041, sequentially connected with one another. The encoder circuit 1044 is also connected to the main controller 101a, and the drive circuit 1041 is also connected to the coupling coil 103. The modulation circuit 1043 can be adjusted according to actual need and, when only the baseband signal is transmitted in order to simplify the signaling link, the encoder circuit 1044 may be directly connected with the D/A converter circuit 1042.

The main controller 101a is used to generate information carried in the second low-frequency magnetic signal to be transmitted by the SIM card 100. The information may be a digital baseband signal. The encoder circuit 1044 is used to perform certain encoding processing on the digital baseband signal provided by the main controller 101a, and the encoding scheme may depend on system requirements. The modulation circuit 1043 is used to perform certain modulation processing on the encoded digital baseband signal, and the modulation format may depend on the system requirements. The D/A converter circuit 1042 is used to convert the encoded and modulated digital signal into a low-frequency analog signal. The drive circuit 1041 is used to amplify the low-frequency analog signal and to drive the coupling coil 103 to generate a low-frequency alternating magnetic field to transmit the second low-frequency magnetic induction signal.

The encoder circuit 1044 may choose any appropriate coding scheme without a DC component, such as Manchester encoding, differential Manchester encoding, alternate mark inversion code (AMI), third-order high-density bipolar code (HDB3), or Miller code (Miller), etc. The modulation circuit 1043 may use any appropriate digital modulation format without amplitude change, such as on-off keying (OOK), frequency shift keying (FSK), binary phase shift keying (BPSK), quadrature phase shift keying (QPSK), or other digital modulation format. The carrier waveform may be select as one of a sine waveform, a triangular waveform, or a square waveform. Further, with respect to the D/A converter circuit 1042, the digital input can be a serial input or parallel inputs, and the analog output can be a single-sided or differential current or voltage waveform outputs. The conversion accuracy and conversion ratio can be configured based on system performance requirements. The drive circuit 1041 may be a multi-stage amplifier circuit containing at least one stage of amplification, and may be formed by integrated operational amplifiers or by discrete transistors, the gain can be adjusted according to real needs.

The encoder circuit 1044 may use a corresponding dedicated IC to realize the encoding by hardware, or the main controller 101a may use internal software to realize the encoding. When the encoder circuit 1044 uses dedicated IC hardware to realize the encoding, the connection between the encoder circuit 1044 and the main controller 101a may be a single-line serial mode, or a multi-line parallel mode. When the encoder circuit 1044 uses internal software to realize the encoding, the low-frequency encoded signal generated by the main controller 101a is directly sent to the modulation circuit 1043 (if necessary), or to the D/A converter circuit.

The RF data transceiver module 102 includes an RF transceiver 1023, impedance matching network 1022, and an RF antenna 1021, sequentially connected. The RF transceiver 1023 is connected with the main controller 101a via a serial bus interface, which may be any appropriate bus supporting a full-duplex or half-duplex communication bus mode, such as a serial peripheral bus (SPI) interface, or a Universal Asynchronous Receiver Transmitter (UART) interface. The impedance matching network 1022 is used to connect the RF transceiver 1023 and the RF antenna 1021 and to ensure the maximum power transmission of the RF signals transmitted or received in the communication link. The RF antenna 1021 is used to radiate electromagnetic energy to external space and to receive the electromagnetic field from the external space. The RF antenna may be a monopole antenna or a dipole antenna.

The SIM card microcontroller 106 is configured to store and process user identification data of users of mobile phone services provided by the operators, as supported by the RF SIM card 100 and to exchange data with the main controller 101a through a standard smart card master/slave interface. The SIM card interface module 107 is used for providing an external interface between the SIM card 100 and the mobile communication terminal, which may meet ISO/IEC 7816 specification or other standards.

Figure 4:
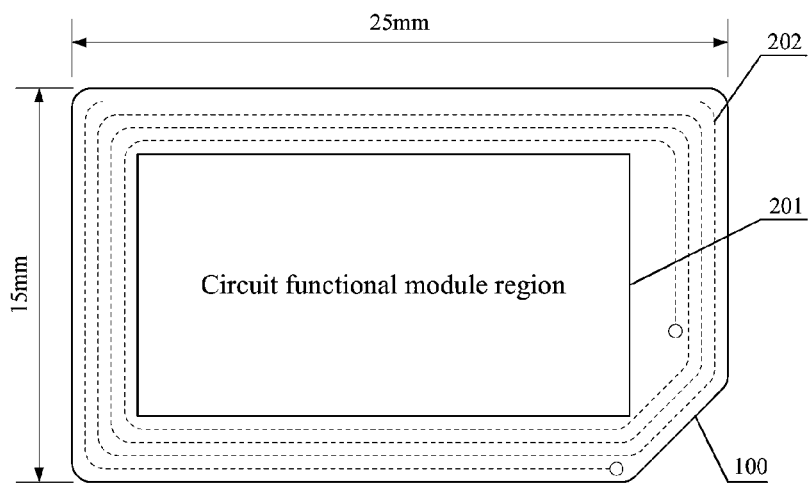
FIG. 4 illustrates a planar structural diagram of the RF SIM card according to the present invention.

FIG. 4 is a schematic view of a planar structure of the RF SIM card 100. As shown in FIG. 4, the RF SIM card 100 may include a circuit functional module region 201 and a coupling coil region 202. The circuit functional module region 201 includes hardware circuitry of the main controller 101a, the RF data transceiver module 102, the magnetic signal transmitting module 104, the magnetic signal receiving module 105, the SIM card microcontroller 106, and the SIM card interface module 107. The coupling coil region 202 may be a PCB coil printed around the card body of the RF SIM card 100. Further, the coupling coil 202 may be wound in a single layer or multi-layers. Based on the number of layers of the PCB of the RF SIM card 100, the number of turns of the coupling coil may be set in a range from 10 to 40 turns, with the outer-most round is approximately the outer dimensions of the RF SIM card 100, such as 25 mm by 15 mm.

Figure 5:
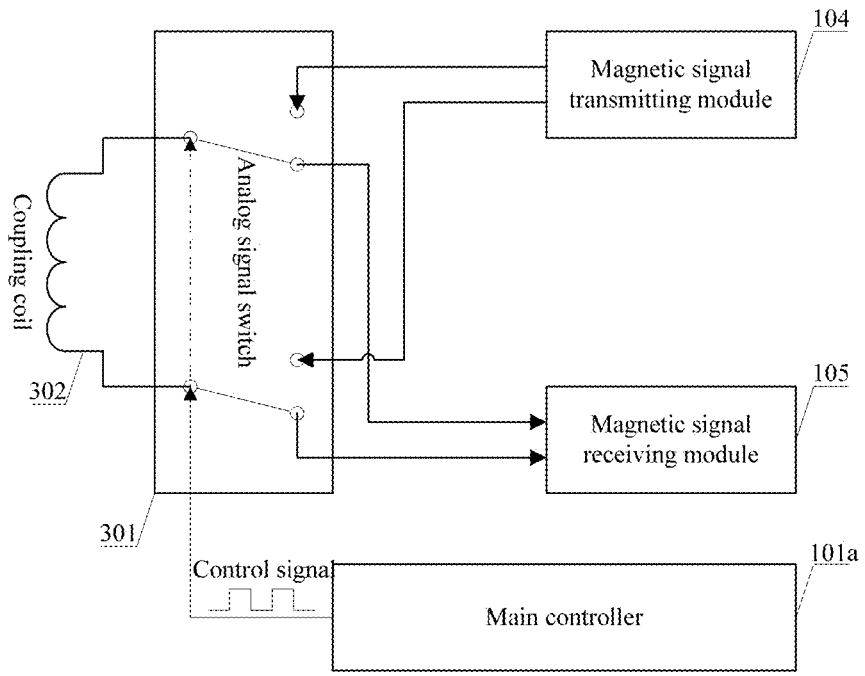
FIG. 5 illustrates an exemplary implementation where the low-frequency receiving channel and transmitting channel of the SIM card share a coupling coil and the low-frequency receiving channel and transmitting channel are switched by an analog switch.

FIG. 5 illustrates an exemplary implementation where the low-frequency receiving channel and transmitting channel of the SIM card 100 share a coupling coil 302 and the low-frequency receiving channel and transmitting channel are switched by an analog switch 301.

As shown in FIG. 5, the exemplary system includes the main controller 101a, the magnetic signal transmitting module 104, the magnetic signal receiving module 105, an analog signal switch 301, and the coupling coil 302. The main controller 101a provides a switching control signal, which is a square wave signal with alternating high and low cycles, whose period may be adjusted according to the real applications. The switching control signal controls the analog switch 301.

For example, when the switching control signal is high, the analog switch 301 is controlled to connect the magnetic signal transmitting module 104; when the control signal is low, the analog switch 301 selects the magnetic signal receiving module 105. Thus, the low-frequency receiving channel and transmitting channel can share the coupling coil 302, saving space and product cost. The analog switch 301 can be an SPDT or DPDT switch or any appropriate controllable switch.

Figure 6:
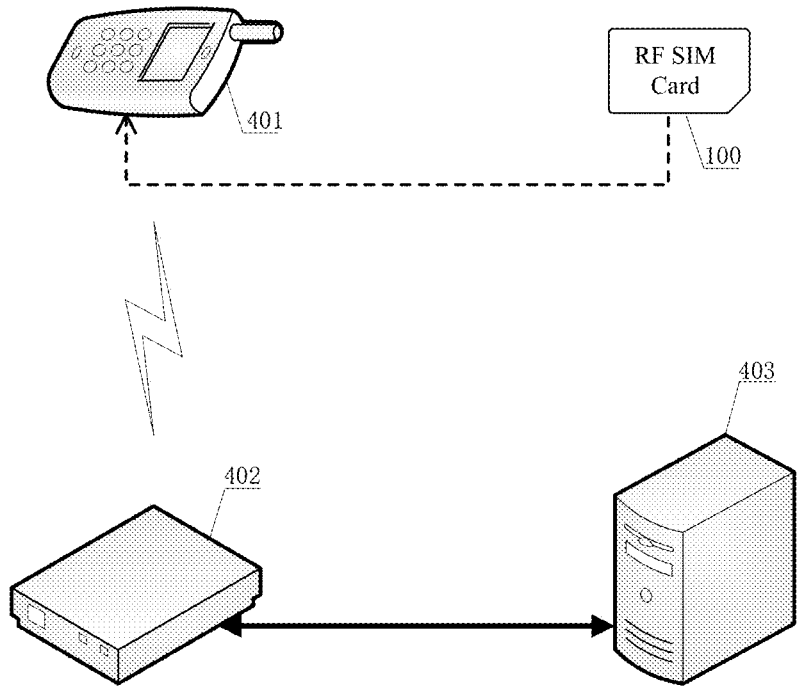
FIG. 6 illustrates a use scenario of an RF SIM card according to the present invention.

FIG. 6 illustrates an exemplary application scenario of the RF SIM card. As shown in FIG. 6, the RF SIM card 100 is embodied in a mobile communication terminal 401. The mobile communication terminal 401 and corresponding RF card reader 402 perform communication distance control and data exchange through bi-directional low-frequency channel and bi-directional RF channel between the terminal and the card reader. The RF card reader 402 then uploads the field data through corresponding wired data link to the backend server 403 for further processing.

Figure 7:
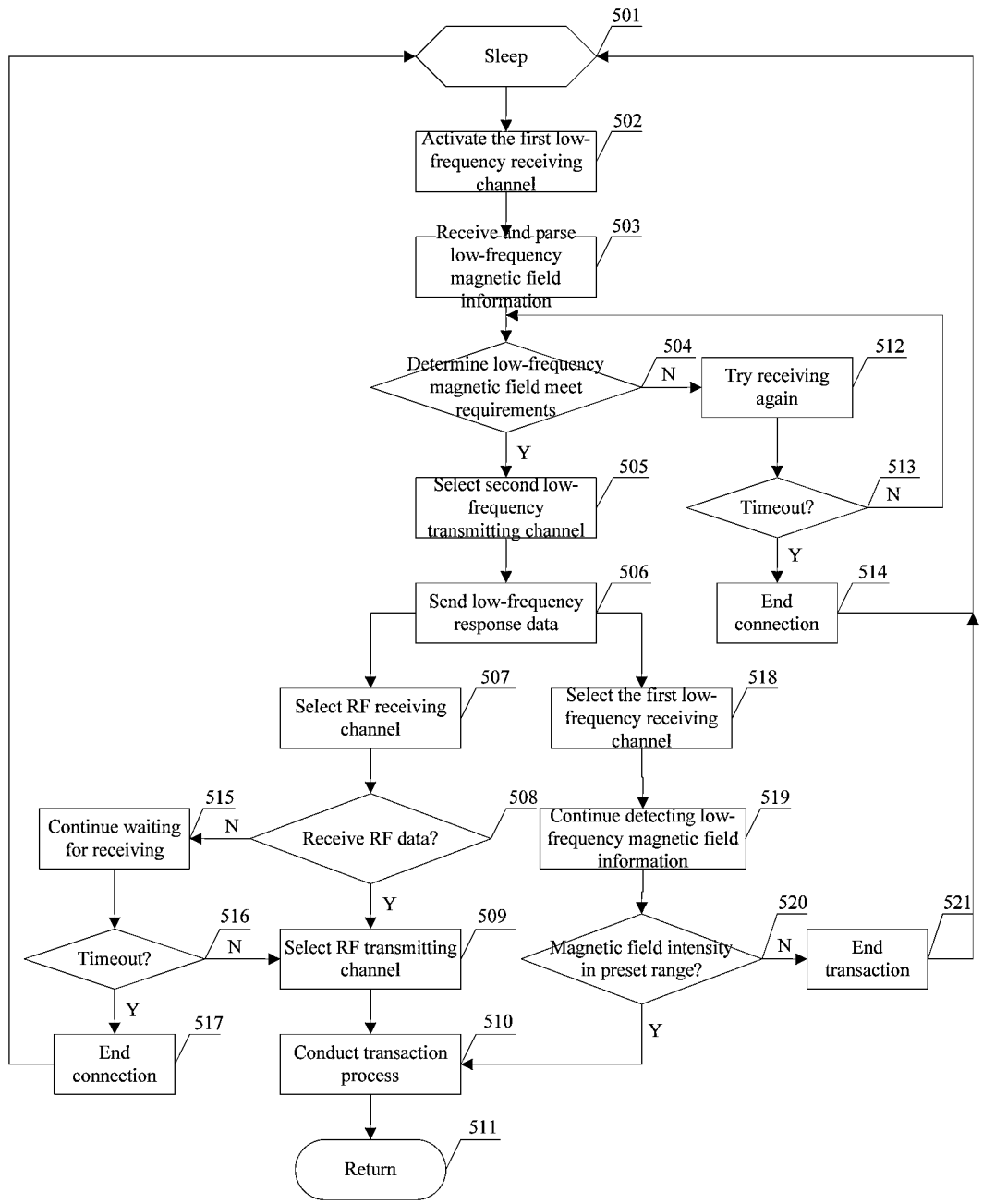
FIG. 7 is a flowchart of an application of the RF SIM card according to the present invention.

FIG. 7 illustrates another example of a low-frequency two-way radio communication and subsequent transaction execution based on the RF SIM card. As shown in FIG. 7, a transaction process is provided in mobile payment type applications using the RF SIM card. The transaction process may include the following steps.

Step 501, in order to reduce unnecessary power consumption, the RF SIM card by default is in a sleep mode in the absence of any transaction. When the mobile communication terminal equipped with the RF SIM card enters into a low-frequency magnetic field generated by the corresponding RF card reader, the process goes to Step 502. The sleep mode may refer to a state where the internal circuitry of the RF SIM card is in a standby mode, a power-down mode, or a low-power mode.

Step 502, the RF SIM card is activated by low-frequency magnetic field generated by the corresponding RF card reader, and opens the low-frequency magnetic signal reception channel and selects a receiving mode. The process proceeds to Step 503. The activating may refer to a state where the internal circuitry of the RF SIM card goes to a normal operation mode, which is also called wake-up.

Step 503, the RF SIM card receives the first low-frequency alternating magnetic field signal transmitted by the RF card reader through the low-frequency magnetic signal reception channel. The first low-frequency alternating magnetic field carries the ID of the RF card reader and a random number, etc., for a number of bytes in length. The RF SIM card analyzes the low-frequency magnetic field information, and the process proceeds to Step 504.

Step 504, the RF SIM card detects the strength of the first low-frequency alternating magnetic field signal, and compares the detected strength with a first preset threshold value used for distance control to determine whether the detected strength is within a distance range based on the preset threshold value. If the detected value does not meet the requirements of the preset threshold value, it indicates that the mobile terminal equipped with the RF SIM card is not within the communication distance range required by the RF card reader, and the process goes to Step 512.

On the other hand, if the detected value meets the requirements of the preset threshold value, it indicates that the mobile terminal equipped with the RF SIM card is within the communication distance range required by the RF card reader, and the process proceeds to step 505.

Step 505, the low-frequency RF SIM card opens the low-frequency magnetic signal transmission channel and selects a transmitting mode, ready to respond to the request of the RF card reader through the low-frequency magnetic signal transmission channel. The process proceeds to Step 506.

Step 506, the RF SIM card uses a certain encoding format, and a certain modulation format if necessary, to send corresponding low-frequency response data to the RF card reader through the low-frequency magnetic signal transmission channel. The response data is also referred to as the second low-frequency alternating magnetic field signal. The process proceeds to Step 507 and Step 518, respectively, where the RF channel of the RF SIM card performs Step 507, and the low-frequency magnetic signal channel of the RF SIM card performs Step 518.

The low-frequency response data is generated based on the low-frequency magnetic field information the RF SIM card receives from the RF card reader, and the low-frequency response data includes the ID of the RF SIM card, a random number, an RF communication frequency, and an RF communication address, etc., for a number of bytes in length.

Step 507, the RF SIM card selects to open the corresponding RF receiving channel and the frequency of the RF receiving channel and the communication address are the same as the RF communication address and frequency included in the low-frequency response data. The process proceeds to Step 508.

Step 508, the RF SIM card receives RF data from the RF card reader through the RF receiving channel in Step 507. If corresponding RF data is received, the process proceeds to Step 509. If corresponding RF data is not received, the process proceeds to Step 515.

Step 509, the SIM card selects to open the corresponding RF data transmission channel, and the frequency and address of the corresponding RF data transmission channel are determined based on the information in the RF data received by the RF SIM card in Step 508. The process then proceeds to Step 510.

Step 510, the RF SIM card enters into the RF data transceiver mode and exchange transaction data with the RF card reader through the process of the two-way RF transceiving channel, and the process then proceeds to Step 511.

Step 511, when the transaction between the RF SIM card and the RF card reader is completed, the RF SIM card goes back to the sleep mode, waiting for a next transaction.

Step 512, within certain time t1, the RF SIM card continues to try to receive the low-frequency magnetic field information (i.e., the first magnetic signal) emitted by the RF card reader, and the process then proceeds to Step 513.

Step 513, if the RF SIM card receives the low-frequency magnetic field information emitted by the RF card reader with the time t1 in step 512, the process returns to Step 504. If the RF SIM card does not receive the low-frequency magnetic field information emitted by the RF card reader with the time t1 in step 512, the process returns to Step 514.

Step 514, the mobile communication terminal equipped with the RF SIM card disconnects the connection between the RF SIM card and the RF card reader, without continuing the transaction, and the RF SIM card returns to the sleep mode.

Step 515, within a certain time t2, the RF SIM card continues to wait for receiving the RF data transmitted by the RF card reader over the RF receiving channel in Step 508, and the process proceeds to Step 516.

Step 516, if the RF SIM card receives the RF data transmitted by the RF card reader with the time t2 in step 515, the process returns to Step 509. If the RF SIM card does not receive the RF data transmitted by the RF card reader within the time t2 in step 515, the process returns to Step 517.

Step 517, the mobile communication terminal equipped with the RF SIM card disconnects the connection between the RF SIM card and the RF card reader, without continuing the transaction, and the RF SIM card returns to the sleep mode.

Step 518, the RF card reader continuously transmitting low-frequency magnetic field signals containing distance control information (i.e., the first low-frequency alternating magnetic field signal). The RF SIM card again switches the low-frequency channel back to the low-frequency magnetic signal receiving channel, selects the receiving mode to wait for receiving the low-frequency magnetic field signal. The process proceeds to Step 519.

Step 519, when the RF SIM card performs RF data exchange with the RF card reader through the RF channel, at the same time, the RF SIM card continuously detects low frequency magnetic information emitted by the RF card reader over the low-frequency magnetic signal receiving channel. The process proceeds to Step 520.

Step 520, the RF SIM card determines whether the low-frequency magnetic field intensity of the detected low-frequency magnetic field signal (i.e., the first low-frequency alternating magnetic field signal) is within the range required for distance control. If the first low-frequency alternating magnetic field signal strength meets the requirement, indicating that the communication distance between the mobile communication terminal equipped with the RF SIM card and the RF card reader are still within a valid range, the process then proceeds to Step 510. If the first low-frequency alternating magnetic field signal strength does not meet the requirement, indicating that the communication distance between the mobile communication terminal equipped with the RF SIM card and the RF card reader are beyond a valid range, the process then proceeds to Step 521.

Step 521, the mobile communication terminal equipped with the RF SIM card disconnects the connection between the RF SIM card and the RF card reader, without continuing the transaction, and the RF SIM card returns to the sleep mode.

The above method may also be applied by switching the roles of the RF SIM card and the RF card reader, with the RF card reader performs distance determination by receiving a second low-frequency alternating magnetic field signal emitted by the RF SIM card.

Thus, according to the disclosed embodiments, by detecting the one-way first alternating magnetic field signal from the RF SIM card by the card reader, the communication distance for card transactions can be effectively controlled. Further, for RF SIM cards with two-way low-frequency capability, two-way low frequency distance control can be realized by low-frequency magnetic signal receiving and transmission modules, the effective communication distance between the mobile communication terminal equipped with the RF SIM card and the RF card reader supporting the RF SIM card can be precisely controlled in a limited and reasonable range, overcoming the concern that the transaction distance is easily enlarged while using the RF SIM card with the one-way distance control. The user experience can be enhanced.

Embodiment Two

According to the disclosed embodiment, an RF card (e.g., an RF SIM card) transmits a first low-frequency alternating magnetic field signal through the low frequency channel in accordance with preset low-frequency transmission parameters, and the transmission frequency is frequency f. The card reader detects the magnetic field signal at each distance point and amplifies the signal into an electrical signal (e.g., a voltage signal or current signal) with constant amplitude corresponding to the distance. Further, a preconfigured first threshold value is used to determine whether the mobile terminal enters into a predetermined valid card transaction range (also called effective distance range, i.e., the range allowing card transactions). The preconfigured first threshold value is the same for all mobile terminals, without the need for calibration. When the mobile terminal enters into a valid card transaction range, the card reader obtains identification information IDc of the RF card from the low-frequency alternating magnetic field signal. The card reader and the RF card generate the same first RF communication address and first frequency, and the card reader sends its own identification information IDr to the RF card using the first RF communication address and first frequency. Further, the RF card and the card reader generate the same second RF communication address and second frequency based on the identification information IDc of the card reader for exchanging data information using an RF channel. Thus, the RF card reader and the RF card can be uniquely bond together by combining the low-frequency one-way communication and two-way RF communication and, after the binding, two-way high-speed communication with large data can be completed via the RF channel. Thus, the data communication distance (i.e., transaction distance) between the terminal having the RF SIM card (e.g., a mobile phone with an RF SIM card) and the RF card reader can be effectively controlled within a preset range, and no calibration is needed for the terminal. More specifically, the following steps are illustrated.

Step a1, the RF card transmits the first low-frequency alternating magnetic field signal.

More specifically, the RF card can transmit the first low-frequency alternating magnetic field signal through a low-frequency channel based on preset transmission parameters. The first low-frequency alternating magnetic field signal can carry identification information of the RF card. The preset transmission parameters may include the frequency of the first low-frequency alternating magnetic field signal, and the frequency is equal to or less than the maximum operating frequency f0 of the low-frequency channel. The identification information may be the identification code ID.

Figure 8:
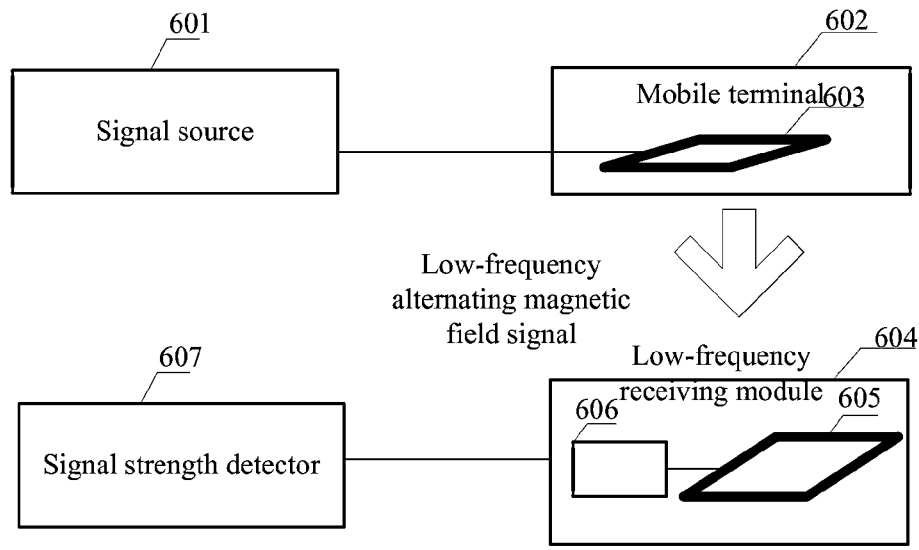
FIG. 8 illustrates a block diagram of a selection system to select the maximum operating frequency f0 of a low-frequency channel according to the present invention.

The lower the low-frequency alternating magnetic field frequency, the smaller the attenuation difference after penetrating mobile terminals. Accordingly, from the frequency selection system (as shown in FIG. 8), frequencies with sufficiently small difference can be selected to achieve distance control without calibration. Using a standard signal source, a built-in transmitter coil in each RF card mounted within various typical mobile terminals transmits a low-frequency alternating magnetic field signal. The card reader receives the low-frequency alternating magnetic field signal, adjust the transmission frequency until finding the frequency f0, so that the voltage received by the card reader (this voltage is the voltage signal with a constant amplitude corresponding to the distance from amplifying the low frequency alternating magnetic field signal) causes the difference of the field intensity coming out from different terminals and obstacles, having the same distance to the center point of the transmitter coil plane, substantially within a preset fluctuation range $\delta_T$. The frequency f0 and the frequency band lower than the frequency f0 belong to the frequency band of the low-frequency channel communication mode, and no calibration is needed for any terminal at that frequency. If the operating frequency (i.e., the frequency of the first low-frequency alternating magnetic field signal) is higher than f0, the system may need to be calibrated. In general, the more operating frequency higher than the f0, the more terminals need to be calibrated, and the more complexity of the calibration. The frequency selection may be performed one-time and, once selected, can be used without change.

FIG. 8 is a structural block diagram of a selection system for selecting the maximum operating frequency f0 of the low-frequency channel. As shown in FIG. 8, in one embodiment, the selection system for low-frequency channel maximum operating frequency f0 comprises: a transmission system containing a signal source 601 and various typical mobile terminal 602 (including transmitter coil 603 and various obstacles), a receiving system containing low-frequency receiving module 604 (including low-frequency receiver coil 605 and low-frequency receiving circuit 606), and a signal strength detector 607 (a voltmeter, an oscilloscope, a spectrometer, etc.).

The principle of detecting voltage and distance curve (voltage-distance curve) includes: the signal source 601 generates a sine wave signal with fixed amplitude and of frequency f, which is transmitted by the transmitter coil 603 in the mobile terminal 602, and the signal passes through or is diffracted through the typical mobile terminal and obstacles. The low-frequency receiver module 604 converts the received low-frequency signal and passes the signal to the signal strength detector 607 through a dedicated signal line, and the signal strength detector 607 detects the received voltage. By changing the distance of the mobile terminal, the low-frequency receiving module receives corresponding signals from the mobile terminal and obstacles, and the curve of the detection voltage changes with the distance can be obtained, i.e., the voltage-distance curve. The mobile terminal and obstacles can be changed to obtain curves of different mobile terminals, and the frequency f can also be changed to obtain different curves.

When the frequency of the low-frequency magnetic field signal is less than or equal to the frequency f0, the different mobile terminals with the radio card are within an effective communication distance range, and no calibration is needed. The frequency f0 can be determined by the following steps.

Step 101, determining the system distance control target (Din, Dv) based on the first low-frequency alternating magnetic field signal, where Din means that all terminals (with the RF card) within the range of 0-Din are ensured for card transaction, and Dv denotes the distance fluctuation range. If the distance is within Din~(Din+Dv), card transactions are allowed and, if the distance is greater than Din+Dv, card transactions are not allowed.

For example, (5 cm, 5 cm) means that all terminals within 5 cm are ensured for card transactions, all terminals within 5 cm~10 cm are allowed card transactions, and all terminals beyond 10 cm are not allowed card transactions. The distance control target may be determined by specific applications, and (0~Din+Dv) is called distance control range.

Step 102, determining the fluctuation range $\delta_R$ of the detected voltage caused by the card reader itself.

That is, the fluctuation of the induced voltage caused by the fluctuation on the parameters of the card reader low-frequency receiver circuit. The parameters include the receiving antenna deviation, amplifier gain deviation, filter deviation, comparator or AD deviation, temperature deviation, and noise, etc. The fluctuation range $\delta_R$ may be controlled by the card reader design and production processes. Because the working frequency of the low-frequency receiver circuit is substantially low, the fluctuation range $\delta_R$ can be controlled desiredly, such as less than 4 dB.

Step 103, determining the fluctuation range $\delta_C$ of the detected voltage caused by the RF card.

That is, the fluctuation of the low-frequency transmitting field intensity caused by the fluctuation on the parameters of the RF card low-frequency transmission circuit. The parameters include the driver circuit parameter deviation, transmitter coil deviation, temperature deviation, and noise, etc. The fluctuation range $\delta_C$ may be controlled by the RF card design and production processes. Because the operating frequency of the RF card low-frequency transmission circuit is substantially low, the fluctuation range $\delta_C$ can be controlled desiredly, such as less than 4 dB.

Step 104, determining the voltage-distance curve of various typical terminals and obstacles at the frequency f.

Before the Step 104, certain preparation work needs to be performed, i.e., selecting typical terminals and typical obstacles. Selection of typical terminals is primarily based on the amount of metal or conductive structures of a terminal. The more metal included, the more the attenuation. For example, typical terminals can be selected as terminals with plastic housing, with metal housing, with a thick metal shell, with a thin metal shell, with a large size, and with a small size, etc. The number of typical terminals is not limited, as long as the selected typical terminals substantially cover the attenuation characteristics of the low-frequency alternating magnetic field signal caused by terminals.

To avoid extraordinary deviation from any particular mobile terminal, the type of the mobile terminal may need to be confirmed in applications. Each type of mobile terminal for transaction applications may be tested to determine the attenuation characteristics of the type of mobile terminal. Typical obstacles may be selected as standard shapes with different materials, such as plastic, aluminum, copper, iron, stainless steel, and other common materials used in mobile terminals. The typical obstacles are placed between the card reader and the mobile terminal as an equivalent obstacle of mobile terminal attenuation characteristics for measuring attenuation effect. The typical terminal and obstacle may represent equivalent attenuation characteristics of a corresponding mobile terminal with respect to signal attenuation effects.

Step 105, based on the distance control target (Din, Dv), determining fluctuation range $\delta_A$ of the detection voltage by the card reader. The range $\delta_A$ equals to the difference between the voltage corresponding to the point Din on the voltage-distance curve with average field intensity attenuation curve slope and obtained from the voltage-distance curves of various typical terminals and obstacles and the voltage corresponding to the point (Din+Dv).

Figure 9:
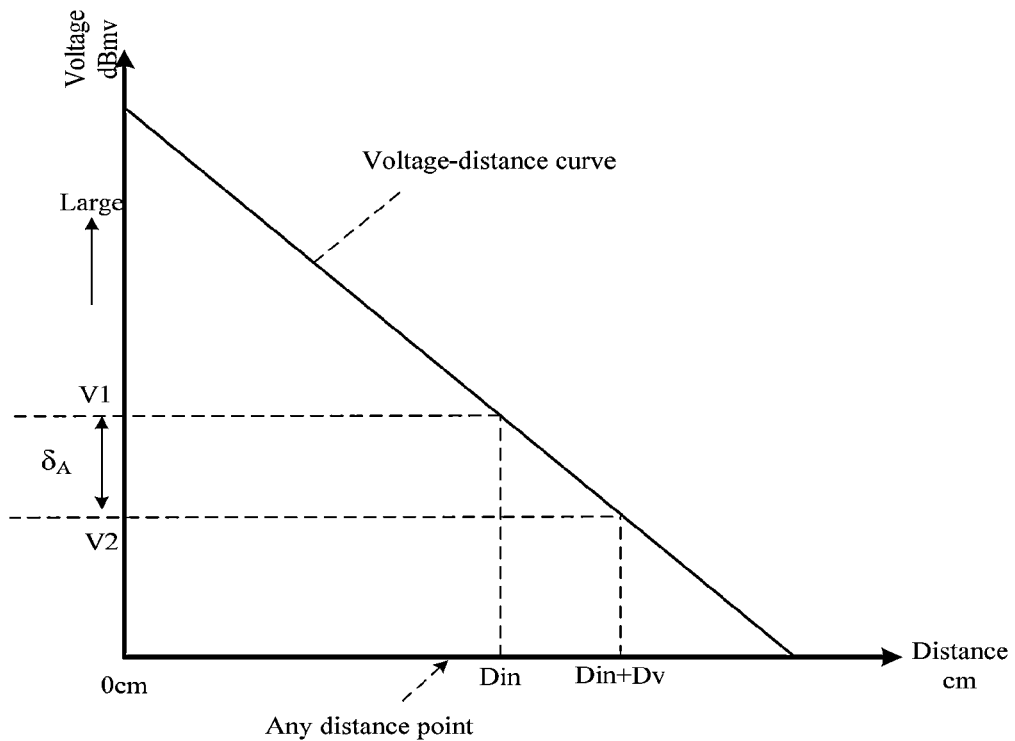
FIG. 9 illustrates the total received detection voltage fluctuation range $\delta_A$ determined by the distance control target (Din, Dv)

FIG. 9 illustrates the total received detection voltage fluctuation range $\delta_A$ determined by the distance control target (Din, Dv). As shown in FIG. 9, the point Din corresponds to voltage value V1, and the point (Din+Dv) corresponds to the voltage value V2, and $\delta_A$=V1-V2.

Step 106, determining the fluctuation range $\delta_T$ of the card reader detection voltage caused by the mobile terminal. The parameter $\delta_T$ represents the fluctuation range of the card reader detection voltage caused by the attenuation characteristics of the terminal, $\delta_T = \delta_A - \delta_R - \delta_C$.

Figure 10:
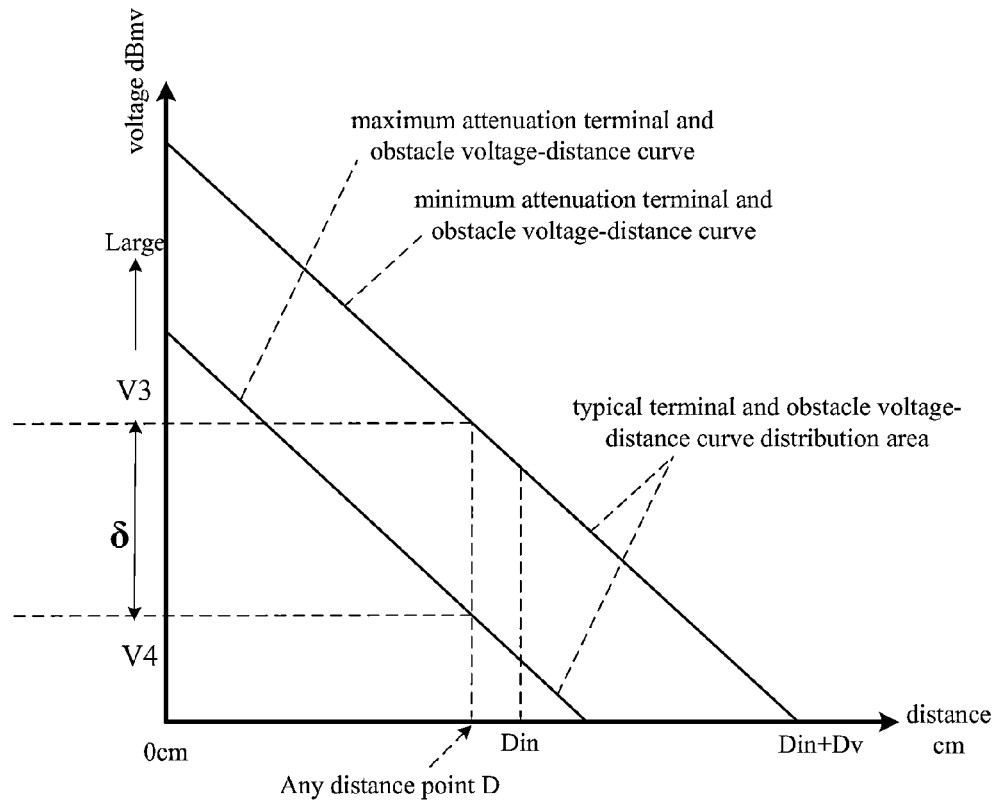
FIG. 10 illustrates voltage-distance curves and fluctuation range $\delta$ of a typical terminal and obstacle.

FIG. 10 illustrates a voltage-distance curves and fluctuation range $\delta$ of a typical terminal and obstacle. As shown in FIG. 10, the voltage-distance curve corresponding to the maximum attenuation terminal and obstacle is called the maximum attenuation curve, and voltage-distance curve corresponding to the minimum attenuation terminal and obstacle is called the minimum attenuation curve. The area surrounded by the maximum attenuation curve and the minimum attenuation curve is called the voltage-distance curve distribution area of the typical terminal and obstacle. Provided that the voltage corresponding to any D on the minimum attenuation curve is V3, and the voltage corresponding to any D on the maximum attenuation curve is V4, then $\delta$=V3-V4.

Step 107, calculating the maximum field intensity difference $\delta$ (also called the fluctuation range) emitted from various distances with the distance control range of various typical terminals and obstacles. If $\delta$ is greater than $\delta_T$, the frequency f is decreases and the method goes to Step 104. If δ is less than $δ_T$, the frequency f is increased and the method goes to Step 104. Further, if δ is equal to $δ_T$, the current frequency f is equal to the frequency f0.

Thus, in the case of limited distance control target, the maximum operating frequency f0 of the system's low-frequency channel can be determined. The low-frequency channel may use a modulation mode, or may use another mode to directly transmit baseband signal mode. In operation, the maximum main frequency component of the system is no greater than the frequency f0, and the distance control does not need to be calibrated.

In one embodiment, the communication frequency f of the low-frequency channel may be selected in such way as to avoid the environmental noise, especially the audio noise.

Figure 11:
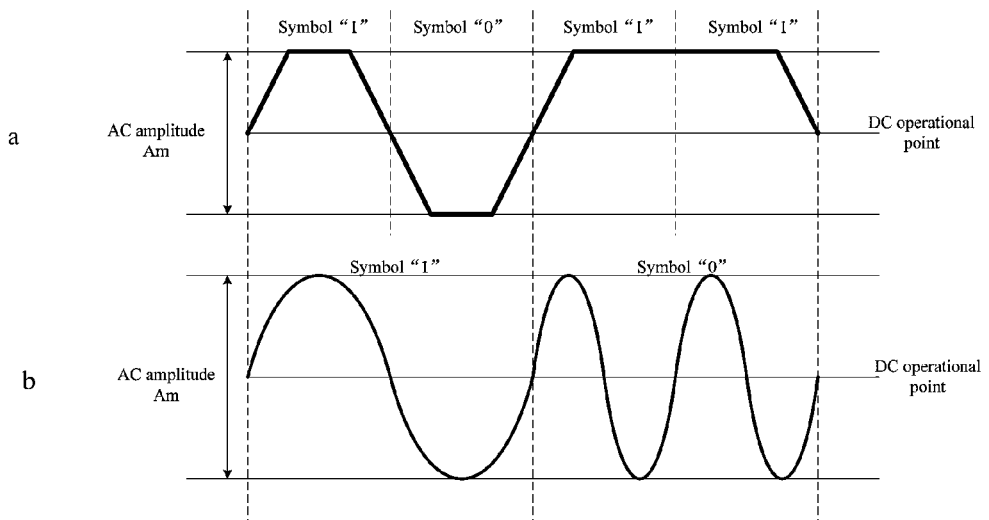
FIG. 11 illustrates detection voltage signal detected by the card reader for directly-transmitted baseband signal without modulation and the voltage waveform diagram of the detected voltage signal for a sine-wave FSK modulation.

Further, the transmission parameters of the low-frequency alternating magnetic field signal can also include modulation mode, coding mode, and transmission magnetic flux density (or magnetic induction intensity) Bc. The transmission parameters are selected to ensure that the signal detected and amplified by the card reader from the first low-frequency alternating magnetic field signal transmitted by the RF card at various distances is a voltage signal with constant amplitude and corresponding to the distance. FIG. 11 illustrates detection voltage signal detected by the card reader for directly-transmitted baseband signal without modulation and the voltage waveform diagram of the detected voltage signal for a sine-wave FSK modulation. In FIG. 11, 11(*a*) is the voltage waveform diagram of the received voltage signal for directly-transmitted baseband signal without modulation, and 11(*b*) a voltage waveform diagram of the received voltage signal for a sine-wave FSK modulation. As shown in FIG. 11, the detection voltage signal is a variable voltage signal containing demodulation information. The signal may be an AC voltage signal without any DC component, or may be a voltage signal having a DC component. The constant amplitude means that the maximum amplitude of the AC component in different transmission symbols keeps constant.

The modulation mode, coding mode, and transmission magnetic flux density Bc of the transmission parameters of the first low-frequency alternating magnetic field signal may be selected through the following Step a11 to Step a13.

Step a11, selecting any coding mode without an average DC component, such as Manchester, Differential Manchester, NRZ, etc.

Step a12, selecting no modulation or a carrier modulation mode without amplitude change. The carrier modulation mode can use any modulation method without amplitude change. For example, the carrier wave may be a sine wave carrier, a pulse carrier, or a triangle wave carrier, etc. The modulation may be on-off keying (OOK), phase shift keying or frequency shift keying (FSK), etc. In the no-modulation mode, the encoded baseband signal is directly driven by the driver circuit and transmitted by the transmitter coil.

Step a13, selecting the transmission magnetic flux density Bc of the low-frequency channel. Specifically, under a selected operating frequency that is less than f0, a selected modulation scheme and a selected coding mode, first selecting the magnetic detection and the amplification gain that are easy to achieve by the card reader, then detecting inherent noise voltage amplitude Vn of the detection voltage of the card reader when the RF card is not sending the first low-frequency alternating magnetic field signal. Further, detecting the detection voltage Vr of the card reader when the RF card is sending the first low-frequency alternating magnetic field signal using the selected modulation and coding. The transmission magnetic flux density Bc is selected such that Vr/Vn>SNR, where SNR is the signal-noise-ratio of the low-frequency signal of the card reader. In general SNR value may be selected as large as possible, as not to cause the transmission power of RF communication device to be too high. For example, the SNR may be selected as SNR=10. After the SNR is determined, Bc is also determined as described above.

Step b1, the card reader detects the first low-frequency alternating magnetic field signal.

Specifically, the RF card reader receives and detects the first low-frequency alternating magnetic field signal sent by the RF card at each distance through the low-frequency channel, and amplifies the first low-frequency alternating magnetic field signal into an electrical signal (a voltage signal or a current signal) with constant amplitude and corresponding to the distance. Further, based on a first preset threshold value, the card reader determines whether the terminal with the RF card enters into the effective card transaction range. When the terminal with the RF card enters the effective card transaction range, the card reader obtains the identification information IDc of the RF card carried in the first low-frequency alternating magnetic field signal. The first preset threshold value may be set the same for all terminals with the RF card.

If the first low-frequency alternating magnetic field signal is amplified into a voltage signal with constant amplitude and corresponding to the distance, the corresponding first preset threshold is the voltage threshold. The preset voltage threshold Vt can be set through the following Step 201 to Step 203.

Step 201, under the selected transmission parameters, measuring the voltage-distance curve obtained by the card reader from various typical terminals and obstacles. The transmission parameters include frequency of the low-frequency alternating magnetic field signal, modulation mode, coding mode, and transmission magnetic flux density Bc, etc.

Step 202, obtaining a reference voltage-distance curve, the reference voltage-distance curve is the middle value of the curves of the typical terminals and obstacles, the voltage magnitude from the upper boundary and the lower boundary of the curves the typical terminals and obstacles is $δ_T/2$, as shown in FIG. 10.

Figure 12:
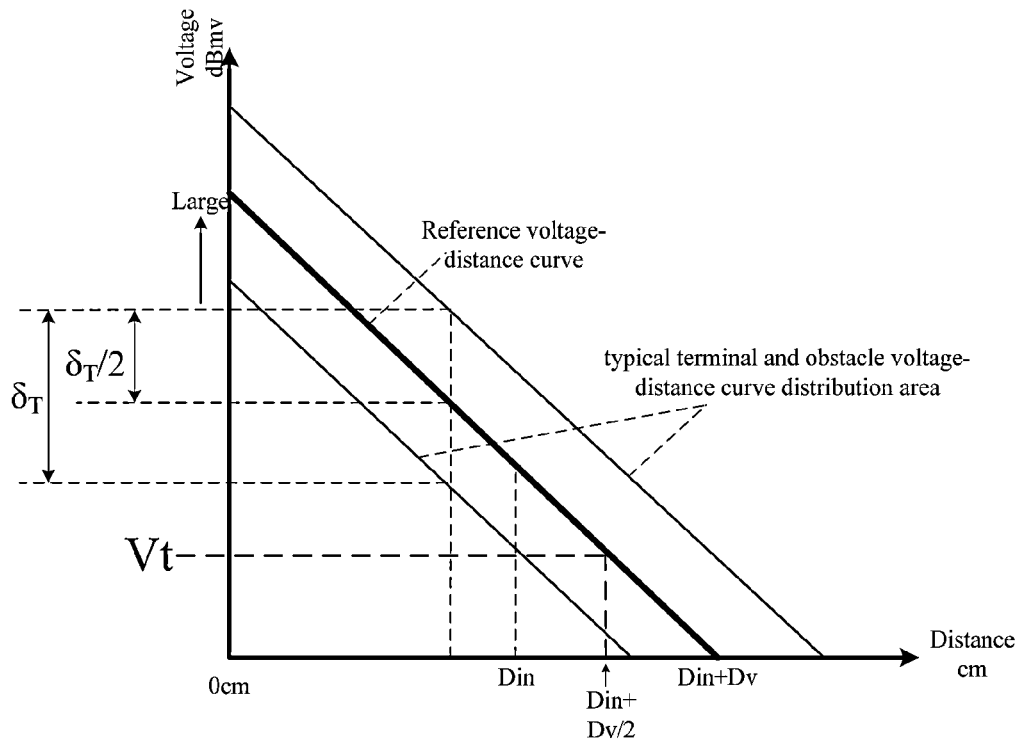
FIG. 12 illustrates a calculation method for a reference voltage-distance curve of the low-frequency channel.

Step 203, selecting the threshold value Vt of the detection voltage of the card reader, as shown in FIG. 12. The voltage value at the point (Din+Dv/2) on the reference voltage-distance curve is Vt.

If the voltage signal corresponding to the received low-frequency alternating magnetic field signal is greater than or equal to the preset threshold value Vt, it can be determined that terminal with the RF card enters the effective card transaction range.

Step c1, the card reader sends its own identification information IDr through the RF channel.

Specifically, if the electrical signal corresponding to the received first low-frequency alternating magnetic field signal is greater than or equal to the preset first threshold value, the terminal with the RF card enters the effective card transaction range, the card reader obtains the identification information IDc of the RF card from the received first low-frequency alternating magnetic field signal and, based on the identification information IDc of the RF card, communicate with the RF card to generate the same first RF communication address and first frequency. Further, the card reader sends its own identification information IDr to the RF card through the first RF communication address and first frequency.

Step d1, the RF card obtains the identification information IDr of the card reader, and exchange information with the card reader through the RF channel.

Specifically, the RF card obtains the identification information IDr of the card reader, the RF card and, based on the identification information IDr of the card reader, communicate with the card reader to generate the same second RF communication address and second frequency. The RF card and the card reader can subsequently exchange information using the second RF communication address and second frequency.

In certain embodiments, after confirming that the RF card enters the effective card transaction range by detecting the first low-frequency alternating magnetic field signal, the card reader can conduct card transactions with the RF card through the RF channel (or conduct data exchange). The RF channel address and frequency for the card transactions may be fixed address and frequency preconfigured for the RF card and the card reader and separately stored on the RF card and the card reader, or may be dynamic address and frequency calculated by the RF card and the card reader using the same algorithm. Other ways for setting the RF channel address and frequency may also be used. For example, the card reader obtains the identification information IDc of the RF card from the received first low-frequency alternating magnetic field signal and, based on the identification information IDc of the RF card, communicate with the RF card to generate the same first RF communication address and first frequency, and then start data exchange (or card transactions) using the first RF communication address and first frequency, without sending the identification information IDr of the card reader itself or generating the second RF communication address and second frequency for data exchange.

Thus, through the above steps, the card reader and the terminal with the RF card in a communication system can be uniquely bond, the communication distance can be effectively controlled within a predetermined range, and the mobile terminal does not need calibration.

Additionally, because the current required for the low-frequency transmission magnetic field intensity of the low-frequency channel is drawn from the mobile terminal, the current can be provided by the mobile terminal usually is limited to, for example, a maximum of 50 mA, the communication distance of the low-frequency channel will not be expanded too much even when the transmission parameters of the mobile terminal is tampered, and the effective communication distance can still be controlled within about Din~Din+Dv range.

Further, the frequency of the low-frequency alternating magnetic field signal may be in the low frequency band, very-low frequency band, or ultra-low frequency band. For example, the ultra-low frequency band may be in a range of approximately 300 Hz~3000 Hz, the very-low frequency band may be in a range of approximately 3 KHz~30 KHz, and the low frequency band may be in a range of approximately 30 KHz~300 KHz. In certain embodiments, the frequency of the low-frequency alternating magnetic field signal can be in a range of approximately 300 Hz~50 KHz, such as 10 KHz, 15 KHz, 20 KHz, 25 KHz or 30 KHz.

Thus, according to the disclosed embodiments, using a one-way detection of the first low-frequency alternating magnetic field signal sent by the RF card to the card reader, the communication distance for card transactions can be effectively controlled, improving the issue of uncontrollable communication distance problems and increasing the security of card transactions. Thus, using the disclosed communication method, the communication distance (i.e., the transaction distance) between a mobile terminal with an RF card (e.g., a mobile phone with an RF SIM card) and the card reader can be reliably controlled within a predetermined range, without the need to calibrate the terminal. Moreover, using the disclosed communication method, the insecure factors such as the card transaction distance exceeding the preconfigured card transaction distance due to maliciously tampering of the card reader can be avoided, enhancing the security of mobile payments and other transactions.

Figure 13:
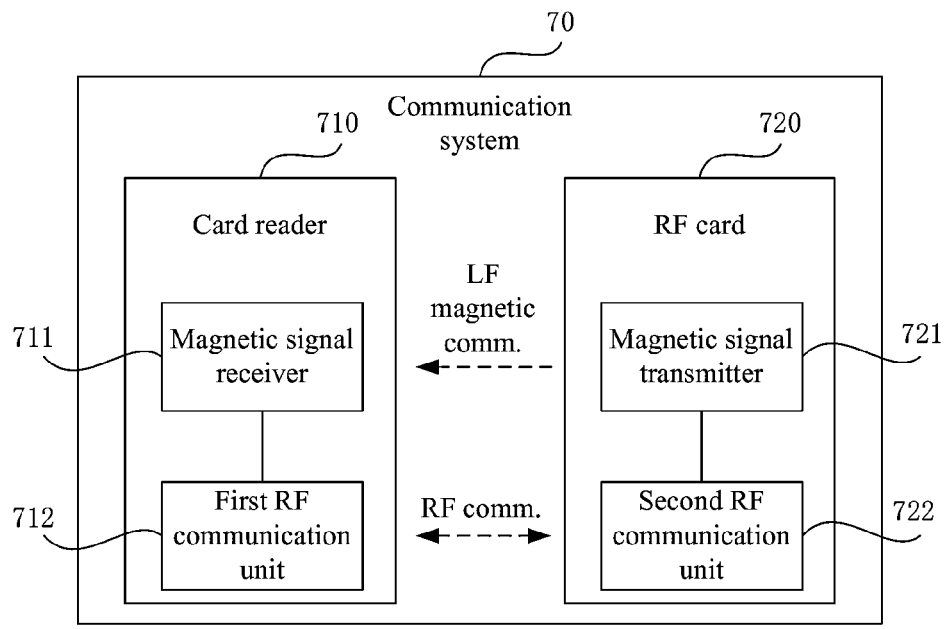
FIG. 13 illustrates a block diagram of an overall structure of a communication system.

FIG. 13 is a block diagram of an overall structure of a communication system according to disclosed embodiments. As shown in FIG. 13, in this embodiment, the communication system 70 includes a card reader 710 and an RF card 720. The card reader 710 and RF card 720 control the communication distance through the first low-frequency alternating magnetic field signal, and exchanges information through the RF channel.

The card reader 710 includes a magnetic signal receiver 711 and a first RF communication unit 712. The magnetic signal receiver 711 is configured to receive and demodulate the first low-frequency alternating magnetic field signal, and the first radio communication unit 712 is configured to exchange information with a second RF communication unit 722. The RF card 720 includes a magnetic signal transmitter 721 and the second RF communication unit 722. The magnetic signal transmitter 721 is configured to generate and transmit the first low-frequency alternating magnetic field signal, and the second RF communication unit 722 is configured to exchange information with the first RF communication unit 712.

Figure 14:
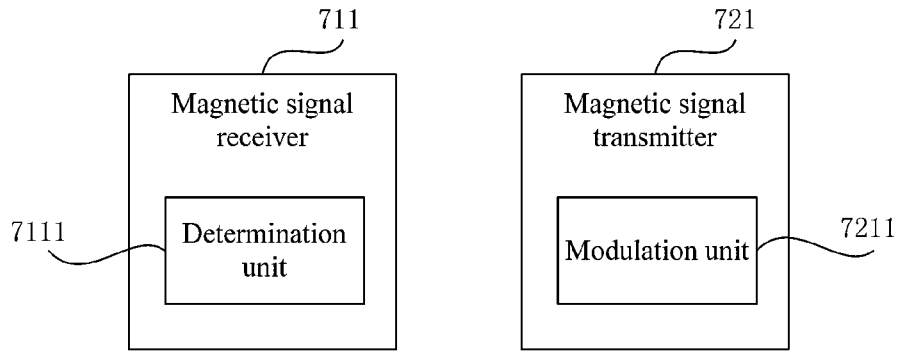
FIG. 14 illustrates a specific configuration of the magnetic signal receiver 711 and the magnetic signal transmitter 721.

FIG. 14 is a specific configuration of the magnetic signal receiver 711 and the magnetic signal transmitter 721. As shown in FIG. 14, the magnetic signal receiver 711 may comprise a determination unit 7111. The determination unit 7111 is configured to determine whether the card reader enters the preset effective card transaction range based on the first low-frequency alternating magnetic field signal detected by the card reader. Further, as shown in FIG. 14, the magnetic signal transmitter 721 may include a modulation unit 7211, and the modulation unit 7211 is configured to add the identification information of the RF card 720 into the first low-frequency alternating magnetic field signal.

Of course, the magnetic signal receiver may further include a magnetic signal receiving unit (not shown), and the magnetic signal transmitter may further include a signal transmitting unit (not shown) and the like, the detailed descriptions of which are omitted herein.

It should be noted that, those skilled in the art can understand that the multiple modules or units may be combined into one module or unit, and one module or unit can be further divided into multiple sub-modules or sub-units.

Figure 15:
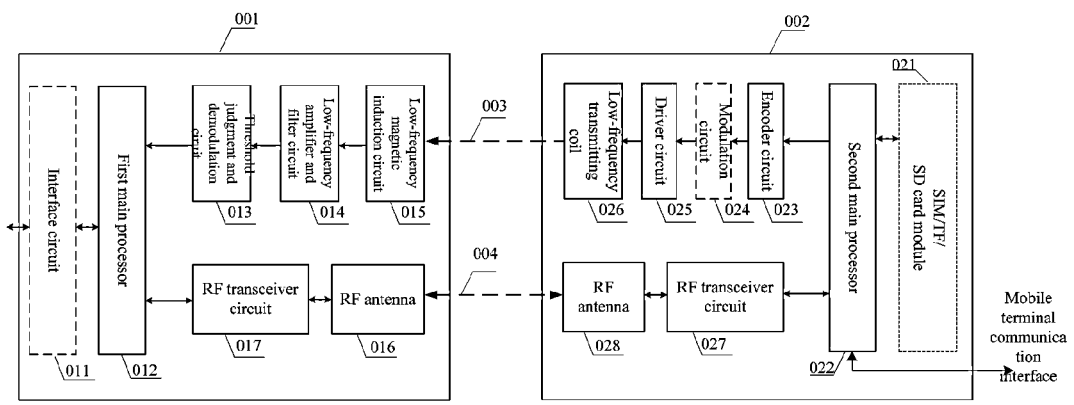
FIG. 15 illustrates a detailed structural diagram of a communication system.

FIG. 15 illustrates a detailed structural diagram of a communication system according to disclosed embodiments. As shown in FIG. 15, in this embodiment, the communication system includes a card reader 001 and an RF card 002.

The card reader 001 includes a low-frequency magnetic induction circuit 015, a low-frequency amplifying and filtering circuit 014, a threshold judgment and demodulation circuit 013, and a first main processor 012, etc. The low-frequency magnetic induction circuit 015, the low-frequency amplifying and filtering circuit 014, the threshold judgment and demodulation circuit 013 and first main processor 012 may be sequentially connected in series. The card reader 001 may also include an RF transceiver circuit 017 and an RF antenna 016. The RF antenna 016, the RF transceiver circuit 017, and the first main processor 012 may also be sequentially connected in series.

The RF card 002 includes a low-frequency transmitter coil 026, a drive circuit 025, an encoding circuit 023, and a second main processor 022. The low-frequency transmitter coil 026, the driver circuit 025, the second encoding circuit 023, and the main processor 022 may be sequentially connected in series. The RF card 002 may also include an RF transceiver circuit also 027 and an RF antenna 028. The RF antenna 028, the RF transceiver circuit 027, and the second main processor 022 may be sequentially connected in series. There may be a modulation circuit 024 provided between the drive circuit 025 and the encoding circuit 023, and the drive circuit 025, the modulation circuit 024, and the encoding circuit 023 may be sequentially connected in series.

In certain embodiments, the low-frequency transmitter coil may be a wire coil or a PCB coil. Further, the low-frequency transmitter coil may have more than 4 turns. The low-frequency magnetic induction coil circuit can be a PCB coil, a wire coil, a Hall device or a giant magnetoresistive device. In certain embodiments, the low-frequency magnetic induction coil circuit in the card reader may use a low-frequency receiver coil, and the low-frequency receiver coil may have 50-500 turns.

In certain embodiments, the maximum width of the sectional area surrounded by the low-frequency receiver coil is greater than the width of the cross-sectional area of the RF card. For example, the sectional area surrounded by the low-frequency receiver coil may include at least a circular cross-sectional area with a diameter of 3 cm or a square area of 3 cm×3 cm.

The implementation of the communication system is illustrated as follows.

(1), The communication frequency f0 of the low-frequency channel can be selected using previously-describe methods, the details of which are not repeated herein.

(2), The Process for Distance Control and Connection the RF Card to the Card Reader.

First, the card reader is in a low-frequency receiving state. The RF card can self-wakeup the low-frequency transmitter function at a preset fixed time period. When the RF card is in the wakeup state, the RF card transmits the first low-frequency alternating magnetic field signal at a frequency no higher than the selected frequency f0 using preconfigured transmission parameters. The first low-frequency alternating magnetic field signal carries a data frame based on modulated signal or direct baseband signal. The data frame contains a unique identifier IDc of the RF card (of course also other identification information that can uniquely identify the RF card). When the mobile terminal with the RF card is placed around the card reader, the first low-frequency alternating magnetic field signal penetrates the typical obstacles in the terminal and reaches the low-frequency detection end of the card reader. The card reader detects and amplifies the first low-frequency alternating magnetic field signal transmitted by the RF card at each distance point into a voltage signal of constant amplitude and corresponding to the distance point.

When the voltage value is lower than the preset threshold value Vt in the card reader, it indicates that the terminal does not enter into a valid card transaction range, and card transactions are not allowed. When the voltage amplitude is higher than the preset voltage threshold Vt of the card reader, it indicates that the terminal enters into the valid card transaction range, the card reader parses the information in the first low-frequency alternating magnetic field signal, obtains the identifier IDc of the RF card, and generates a first RF communication address and a first frequency based on the IDc information. The card reader then transmits its own identification information IDr using the first RF communication address and the first frequency.

The RF card obtains the identification information IDr of the card reader, and generates a second RF communication address and a second frequency based on the identification information IDr. The card reader and the RF card of the communication system can complete card transactions using the second RF communication address and the second frequency. Further, when a card transaction is initiated, the RF card is no longer in the self-wakeup state. Instead, the RF card continuously transmits the low-frequency magnetic field signal to ensure that the mobile terminal with the RF card and the card reader are always within the valid card transaction range. Thus, the RF card and the card reader can be uniquely bond, after which the communication process for data exchange using the RF channel is less likely to generate errors. That is, after the RF card is successfully bond with or connected to the card reader, the distance control process is completed, and a subsequent card transaction can be carried out on the RF channel until the end of the transaction.

(3), The Transaction Process.

The RF card and the card reader establish the unique and reliable communication link through the RF channel. Based on the communication link, the two sides can complete the authentication required by the transaction and other processes required by the transaction. All of these processes can be accomplished by a fast RF channel. Because the above described process can ensure that the connection can only be made within a predetermined distance range, the entire transaction process can also be communication limited within the predetermined distance range.

As shown in FIG. 15, the communication system consists of two parts: the card reader 001 and the RF card 002. The RF card 002 is placed inside a mobile terminal and interacts with the mobile terminal through terminal communication interfaces.

Card reader 001 may comprise the following modules: a first main processor 012, responsible for the card reader low frequency and high frequency control and processing other protocols, the first main processor 012 can connect to the external communication interface via the interface circuit 011 or directly; a low-frequency magnetic induction circuit 015 comprising a PCB coil, a wire coil, a giant magnetoresistive device, a Hall device, or other circuit elements capable of sensing magnetic field changes, responsible for inducing and converting the first low-frequency alternating magnetic field signal 003 into a first electrical signal; a low-frequency amplifier and filter circuit 014 responsible for amplifying the electrical signal detected by the low-frequency magnetic induction circuit and filtering out the noise component; a threshold judgment and demodulation circuit 013 responsible for determining the value of the low-frequency electrical signal with the noise component filtered out and comparing the value with the preset threshold value Vt. If the value exceeds the preset threshold value Vt, it indicates the RF card enters into a card transaction range. The card reader demodulates the electrical signal and obtains a coded signal sent by the encoding circuit 023 of the RF card. The demodulated coded signal is transmitted to the first host processor 102, and the first main processor 022 is responsible for decoding processing. The RF transceiver circuit 017 is responsible for completing RF two-way communication with the RF transceiver module of the RF card 002 through the RF antenna 016, transmitting and receiving RF signals 004.

The RF card 002 may comprise the following modules: a second main processor 022 responsible for controlling low-frequency and RF modules and processing other protocols and also responsible for communicating with the mobile terminal; a SIM/TF/SD card module 021 being internal SIM/TF/SD card module of the mobile terminal, the module type is determined by the specific type of the card; an encoding circuit 023, responsible for encoding the low-frequency frame bit by bit; a modulation circuit 024 responsible for modulating the symbol stream outputted by the encoding module against a carrier wave to generate a modulated signal to the drive circuit 025 or for directly sending the encoded signal to the drive circuit 025 if no modulation is used; the drive circuit 025, responsible for driving the low-frequency transmitter coil 026 to generate the first low-frequency alternating magnetic field signal 003; an RF transceiver circuit 027 responsible for completing RF two-way communication with the RF transceiver module of the card reader 001 through the RF antenna 028, transmitting and receiving RF signals 004.

The communication system achieves distance detection and control without calibration by determining the low-frequency communication threshold from the mobile terminal to the card reader. That is, the RF card 002 transmits the first low-frequency alternating magnetic field signal 003 in accordance with the preset transmission parameters, and the card reader 001 receives the magnetic field signal and converts it into a low-frequency detection voltage signal, and uses a preset threshold value Vt to determine whether the terminal enters the preset valid distance range. If the terminal enters the valid range, the card reader 001 obtains the identification information IDc of the RF card 002 included in the low-frequency alternating magnetic field signal and generate, together with the RF card 002, a first RF communication address and a first frequency based on the information IDc. Further, based on the first RF communication address and the first frequency, the card reader 001 sends its own identification information IDr. The RF card 002 receives the identification information IDr of the card reader 001 at the first RF communication address and the first frequency through the RF channel and, together with the card reader 001, generates a second RF communication address and a second frequency. The card reader 001 and the RF card 002 complete subsequent card transactions at the second RF communication address and the second frequency. By the one-way low-frequency alternating magnetic field signal detection from the RF card 002 to the card reader 001, the communication distance control between the RF card 002 to the card reader 001 can be completed. That is, the RF card 002 passes its identity information IDc to the card reader 001 through the low-frequency channel, and the card reader 001 feedback its own identification information IDr to the RF card 002 through the RF channel. Both sides using the same identification information for generating the same RF communication address and frequency, so as to realize the unique binding between the card reader 001 and the RF card 002. After the binding, the RF channel can be used to accomplish high-speed large data volume bi-directional communication through the RF channel.

The specific workflow of the communication system are illustrates in the followings.

(A) First, basic operation parameters of the system are selected, including the RF frequency, low-frequency channel communication frequency f, RF card transmission parameters, card reader receiving voltage threshold Vt, card reader receiving circuitry parameters, etc.

1. Selecting the RF Frequency

The RF communication frequency may be selected above 2400~2483 MH 2.4G ISM band, so as to achieve high-speed communication and good terminal penetration. Other frequency, such as 433 MHz, 900 MHz, 5 GHz, or the like, can also be used.

2. Selecting the Low-Frequency Channel Communication Frequency f

The method described above can be used to determine the communication frequency f of the system's low-frequency channel. For a typical GSM mobile terminal, to achieve a range of 0~15 cm distance control, with consideration on noise interference especially the audio interference, the frequency f may be selected between 20 KHZ and 50 KHz, such as 10 KHZ, 15 KHZ, 20 KHZ, 25 KHZ, or 0 KHZ, etc.

3. Selecting the RF Card Transmission Parameters

The transmission parameters include modulation mode, coding scheme and transmission magnetic induction intensity Bc.

Figure 16:
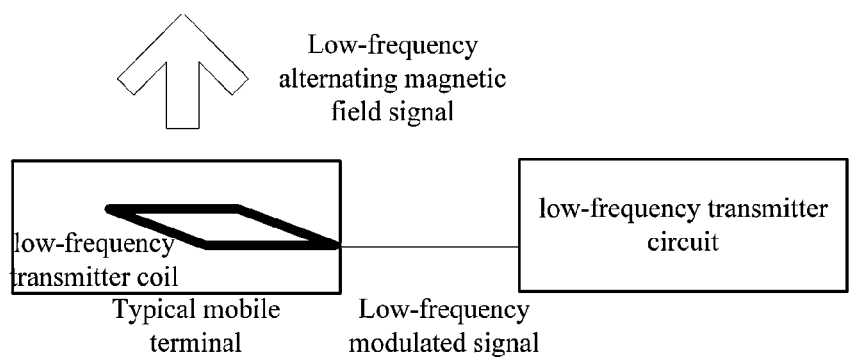
FIG. 16 illustrates a schematic diagram of the low-frequency transmitter part of the RF card.

FIG. 16 is a schematic diagram of the low-frequency transmitter part of the RF card. As shown in FIG. 16, the low-frequency transmitter portion of the RF card includes a low-frequency transmitter circuit and a mobile terminal equipped with the RF card having a built-in low-frequency transmitter coil. Referring to FIG. 15, the radio frequency transmitter circuit comprises a driving circuit 025, the modulation circuit 024, and the encoding circuit 023. The low-frequency modulated signal driven by the driving circuit 025 is outputted to the low-frequency transmitter coil 026.

The modulation circuit 024 can use the following modulation schemes:

(1) Carrier modulation: the baseband signal generated by the encoding circuit 023 is modulated by the modulation circuit 024 against the carrier, and the carrier may be a sine wave, a square wave, or a triangular wave, etc. The modulation can use On-off frequency shift keying (OOK), phase shift keying, frequency shift keying (FSK), etc. The modulated signal is loaded onto the low-frequency transmitter coil 026 through the driving circuit 025.

(2) No-carrier direct baseband transmission: the baseband signal generated by the encoding circuit 023 is loaded directly onto the low-frequency transmitter coil 026 through the drive circuit 025.

(3) Other modulations: because the distance control is based on the threshold, the modulation mode used in general less prefers amplitude modulation, other modulation schemes that can maintain the detection voltage amplitude of the RF card substantially constant can also be used.

Encoding circuit 023 can use the following encoding schemes:

(1) Manchester encoding: 1 bit is encoded as two symbols 01, bit 0 is encoded as 10.

(2) Differential Manchester encoding: two bit symbol sequences, 01 and 10, bit 1 is encoded differently from the previous symbol sequence, and bit 0 is encoded the same, or vice versa.

(3) Other encoding schemes: because the distance control is based on the threshold, the encoding may need to keep the average value of the low-frequency modulated signal, and the encoded sequence does not contain a DC component. Any encoding scheme resulting in zero average DC component can be used.

After selecting the modulation and coding schemes, the transmission magnetic induction intensity Bc can be determined using the method described previously. The parameter Bc can be adjusted by adjusting turns, diameter, and/or shape of the coil, and gain parameters of the driving circuit 205.

4. Selecting Card Reader Receiving Voltage Threshold Vt

The card reader receiving voltage threshold Vt can be selected using the method described previously.

5. Selecting the Card Reader Low-Frequency Receiving Circuitry Parameters

Referring to FIG. 15, the card reader low-frequency magnetic induction circuit 015 includes a winding-wire coil, a PCB coil, a Hall device, or a giant magnetoresistance device. Any such device with desired sensitivity can be selected in the low-frequency magnetic induction circuit.

The above parameters may only need to be selected once. After they are selected, no change might be required during operation.

(B) Second, the system operational flow after determining the operation parameters:

Step A100: distance detection and control process. The RF card 002 can self-wakeup the low-frequency transmitter function at a preset fixed time period. When the RF card is in the wakeup state, the second main processor 002 of the RF card 002 generates a data frame containing a unique identifier IDc of the RF card 002 and sends it to the encoding circuit 023 to be encoded. The encoded signal is modulated by the modulation circuit 024 and passed to the drive circuit 025 or is directly passed to the drive circuit 025 without modulation, the modulated voltage is sent to the low-frequency transmitter coil 026. Based on preconfigured frame format, modulation and coding schemes, and driving capability, the transmitter coil 027 transmits the first low-frequency alternating magnetic field signal 003 at the preset intensity Bc in accordance with the selected frame format and transmission parameters.

When the mobile terminal with the RF card 002 is placed around the card reader, the first low-frequency alternating magnetic field signal 003 penetrates the terminal and reaches the low-frequency detection end of the card reader 001. The low-frequency magnetic induction circuit 015 of the card reader 001 detects and amplifies the first low-frequency alternating magnetic field signal into an electrical signal. The electrical signal is amplified and filtered out noise component by the low-frequency amplifier circuit 014 to generate a low-frequency detection voltage. The threshold judgment and demodulation circuit 013 determines the magnitude of the voltage. When the voltage amplitude is less than the preset threshold value Vt, card transactions are not allowed. When voltage amplitude is greater than or equal to the preset threshold value Vt, it indicates that the terminal enters into the predetermined effective communication distance range of the card reader.

Figure 17:
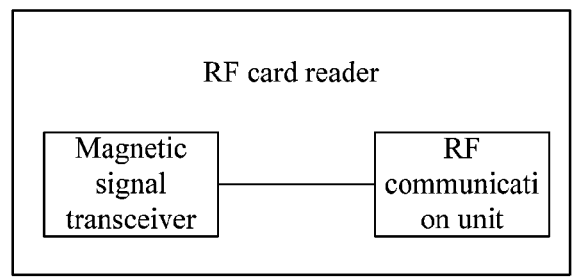
FIG. 17 illustrates a low-frequency data frame transmitted by the RF card.

The frame format in Step A100 can be defined as follows:

FIG. 17 illustrates a low-frequency data frame transmitted by the RF card. As shown in FIG. 17, the RF card low-frequency data frame includes the following.

Preamble: 8 bits, usually FFH, for frame synchronization.

Control field: eight bits, providing information for reading the frame, such as length, data type, etc., reserved bits can used for expansion.

IDc: N bits, the unique identifier of the RF card, specified by the control field, where N is a natural number.

CRC: the checksum for the control field and the IDc, CRC checksum or other format can be used.

The above-described frame format is only an example, any frame format containing the unique identifier of the RF card or the card reader can be used. The unique identifier can be a random number of sufficient length, the card reader may also be manually assigned a unique code, or other methods may be used to generate the unique identifier.

The unique identifier of the RF card in Step A100 may be a unique identifier pre-stored in the non-volatile memory (NVM) within the RF card, may be a random number with sufficient length internally generated by the RF card.

Step A200: in Step A100, the card reader determines that the detection voltage is greater than the preset threshold voltage Vt, which indicates that the card reader and the RF card reader enter into a valid card transaction distance range. The threshold judgment and demodulation circuit 013 parses the voltage signal to obtain IDc. The first main processor 012 of the card reader 001 and the second main processor 022 of the RF card 002 generate the same RF communication address and frequency based on the IDc information. Using this RF communication address and frequency, the card reader 001 transmits its own identification information IDr to the RF card 002 using the RF transceiver circuit 017 and through the RF antenna 016. The RF antenna 028 and RF transceiver circuit 027 of the RF card 002 receive the identification information IDr at the same RF communication address and frequency and pass to second main processor 022. The first main processor 012 and second main processor 022 generate a new RF communication address and frequency based on the IDr information. The system initiates card transactions at this new RF communication address and frequency. Further, when a card transaction is initiated, the RF card 002 is no longer in the self-wakeup state. Instead, the RF card continuously transmits the low-frequency magnetic field signal to ensure that the card reader 001 and the RF card 002 are always within the valid card transaction range. Thus, the above method can be used to control system communication distance, and the RF card and the card reader can be uniquely bond. The communication distance between the card reader 001 and the mobile terminal with the RF card 002 can be securely and effectively controlled without calibration.

The unique identifier IDr of the card reader in Step A200 can be pre-stored in the nonvolatile memory (NVM) of the card reader, or a random number with a sufficient length internally generated by the card reader.

Step A300: transaction process. The card reader 001 and the RF card 002 establish a reliable and unique communication link through the RF channel. Based on the link, the two sides can complete the authentication required by the transaction and other processes required by the transaction. All of these processes can be accomplished by a fast RF channel. Because Steps A100~A200 can ensure that the connection to the RF card 002 can only be made within a predetermined distance range, the entire transaction process can also be communication limited within the predetermined distance range. The transaction process may be a POS transaction process, the details are omitted herein.

The low-frequency signal detection circuit 015 of the card reader 001 may comprise a PCB coil, a wire coil, a GMR device, or a Hall device. Other sensing device may also be used, so long as the device is capable of converting the magnetic field into an electrical signal, and with desired magnetic induction sensitivity.

Thus, the disclosed communication system can use low-frequency alternating magnetic field to achieve distance detection and control, and to achieve one-way low-frequency communication from the RF card to the card reader. The RF channel can be used in combination with the low-frequency one-way communication to achieve reliable and unique binding with the terminal, and the RF channel can be used to achieve high-speed data communication between the card reader and the RF card. Certain characteristics include: (1) the mobile terminal does not need to be modified, only needs to replace the SIM/TF/SD card inside the mobile terminal and the reliable two-way distance communication can be achieved; (2) because the current provided by the RF card is limited, the communication distance of the low-frequency signal is limited, which can prevent the transmission power of the RF card being tampered or increased, and the communication distance can be effectively controlled within a predetermined range. In addition, the RF transceiver circuit is placed within the RF card to achieve two-way high-speed communication with the RF transceiver circuit with the card reader. Because the antenna of the RF circuit is very small, it can be easily integrated into the SIM/TF/SD card.

According to the disclosed embodiments, the frequency f is selected to be less than the frequency f0, no calibration is needed when the system operates at the frequency f, and the communication distance can be controlled safely and effectively. As an extension, frequency f may also be selected above the frequency f0, which may cause reduced performance, reduced distance control accuracy, and/or reduced communication success rate. However, such use does not conflict with the disclosed invention, and merely an extension with modified performance.

According to the disclosed embodiments, one-way detection of a low-frequency alternating magnetic field signal from the RF card to the card reader can be used to effectively control the communication distance, improving the problem of uncontrollable communication distance and improving the security of card transaction communication. Moreover, the insecure factors such as the card transaction distance exceeding the preconfigured card transaction distance due to maliciously tampering of the card reader can be avoided, enhancing the security of mobile payments and other transactions.

Embodiment Three

According to the disclosed embodiment, an RF card reader with low-frequency alternating magnetic field transmission and receiving functions and RF signal transmission and receiving functions is provided to control the distance of near-field communication between the RF card reader and the mobile terminal equipped with the RF card. The low-frequency alternating magnetic field can penetrate different terminals with small signal attenuation difference, the low-frequency transmission power of the mobile terminals is limited, the low-frequency receiving signal-noise-ratio (SNR) of the RF SIM card is limited, and the two-way low-frequency transmission distance is also limited. Thus, the two-way distance control between the RF card reader and the mobile terminal can be realized, and high-frequency RF can effectively penetrate the terminal to complete high-speed two-way communication to conduct transactions. Thus, the RF card reader and the RF card can be uniquely bond together by combining the low-frequency two-way communication and two-way RF communication and, after the binding, two-way high-speed communication with large data can be completed via the RF channel. Thus, the data communication distance (i.e., transaction distance) between the terminal having the RF card (e.g., a mobile phone with an RF SIM card) and the RF card reader can be effectively controlled within a preset distance range, and no calibration is needed for the terminals.

Figure 18:
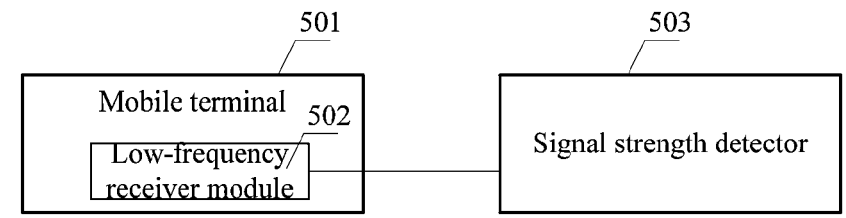
FIG. 18 illustrates a block diagram of an overall structure of an RF card reader.

FIG. 18 illustrates a block diagram of an overall structure of an RF card reader according to the disclosed embodiments. As shown in FIG. 18, in this embodiment, the RF card reader comprises a magnetic signal transceiver and an RF communication unit. The magnetic signal transceiver is configured to generate, transmit, and receive low-frequency alternating magnetic field signals. The RF communication unit is configured to exchange information through RF communication. Of course, the magnetic signal transceiver may further include a magnetic signal transmitter and a magnetic signal receiver.

The RF card reader can include a low-frequency radio transmitter module, a low-frequency receiver module, an RF transceiver module and a first main processor. The low-frequency transmitter module, the low-frequency receiver module, and the RF transceiver module may be connected to the first main processor respectively.

The low-frequency transmitter module, the low-frequency receiver module, and the RF transceiver module may include the following structures. The low frequency transmitter module includes a low-frequency transmitter coil, a driver circuit, and an encoding circuit. The low-frequency transmitter coil, the driver circuit, and the encoding circuit may be sequentially connected in series, and the encoding circuit may be connected to the first main processor. The low-frequency receiver module includes a low-frequency magnetic induction circuit, a low-frequency amplifier and filter circuit, and a low-frequency demodulation circuit. The low-frequency magnetic induction circuit, the low-frequency amplifier and filter circuit, and the low-frequency demodulation circuit may be sequentially connected in series, and the low-frequency demodulation circuit may be connected to the first main processor. The RF transceiver module includes an RF antenna and an RF transceiver circuit. The RF antenna and the radio transceiver circuit may be connected in series, and the RF transceiver circuit is connected to the first main processor. Further, a modulation circuit can also be provided between the driving circuit and the encoding circuit. The driving circuit may also include an adjusting circuit.

Among them, the low-frequency transmitter coil or coils can be wire coil or PCB coil. Preferably, the low-frequency transmitter coil can have more than 10 turns. More preferably, the low-frequency transmitter coil can have approximately 50 to 500 turns. In other embodiments, the low-frequency transmitter coil can be filled with a ferrite core or an iron core. The area enclosed by the low-frequency transmit coil may include at least a circular cross-sectional area with a diameter of 3 cm or a square area of 3 cm×3 cm. Preferably, the cross-sectional area surrounded by the low-frequency transmitter coil may be greater than 10 cm$^2$. More preferably, the cross-sectional area surrounded by the low-frequency transmitter coil may be 20 to 1000 cm$^2$.

The magnetic induction device used by the low-frequency magnetic induction circuit may be a wire coil, a PCB coil, a Hall device or a giant magnetoresistive device. Preferably, the magnetic induction device used by the low-frequency magnetic induction circuit is a wire coil or PCB coil. The PCB coil or wire coil may have more than 10 turns. More preferably, the PCB coil or wire coil can have approximately 50 to 500 turns. Preferably, when the magnetic induction device used by the low-frequency magnetic induction circuit is a wire coil or PCB coil, the area enclosed by the wire coil or PCB coil includes at least a circular cross-sectional area with a diameter of 3 cm or a square area of 3 cm×3 cm. Preferably, the cross-sectional area surrounded by the wire coil or PCB coil is greater than 10 cm$^2$. More preferably, the cross-sectional area surrounded by the wire coil or PCB coil may be 20 to 1000 cm$^2$. When the magnetic induction device used by the low-frequency magnetic induction circuit is a wire coil or PCB coil, the low-frequency magnetic induction circuit and the low-frequency transmitter coil can share the same coil.

The RF card reader may further include a local magnetic field intensity detecting device. The local magnetic field intensity detecting device may be an independent magnetic field detecting device, or may be the low-frequency receiver module in the RF card reader itself.

The communication system containing the RF card reader (the system includes the RF card reader and a mobile terminal equipped with an RF card) performs a communication method, including the following Steps a2, Step b2, Step c2, and Step d2, each of which is described in detail as follows.

Step a2, the RF card reader transmits a first low-frequency alternating magnetic field signal through a first low-frequency channel based on preset first transmission parameters. The first low-frequency alternating magnetic field signal can carry identification information of the RF card reader. The first transmission parameters may include the frequency of the first low-frequency alternating magnetic field signal, and the frequency is equal to or less than the maximum operating frequency f0 of the first low-frequency channel.

The identification information may be the identification code ID. It should be noted that the frequency of the first low-frequency alternating magnetic field signal is the frequency corresponding to 3 dB bandwidth upper frequency cut-off point of the low-frequency alternating magnetic field signal.

Figure 19:
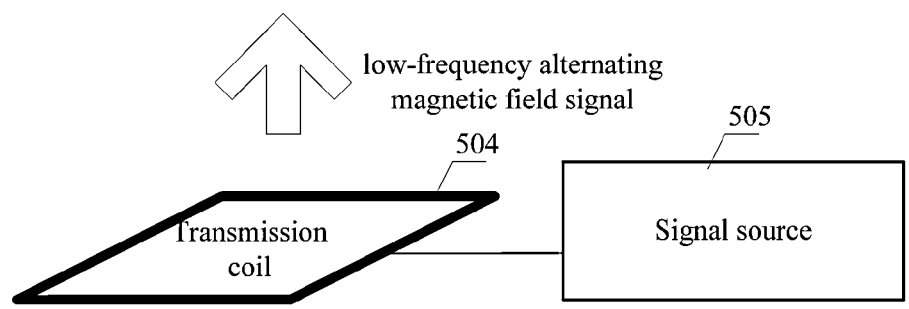
FIG. 19 illustrates a structural block diagram of a selection system for selecting the maximum operating frequency f0 of the first low-frequency channel.

The lower the low-frequency alternating magnetic field frequency, the smaller the attenuation difference after penetrating mobile terminals. Accordingly, from the frequency selection system (as shown in FIG. 19), frequencies with sufficiently small difference can be selected to achieve distance control without calibration. Using a standard signal source, a standard magnetic transmitter coil transmits a low-frequency alternating magnetic field signal. The RF card inside the typical terminal and obstacle receives the low-frequency alternating magnetic field signal, adjust the transmission frequency until finding the frequency f0, so that the voltage received by the RF card (this voltage is the voltage signal with a constant amplitude corresponding to the distance from amplifying the low frequency alternating magnetic field signal) causes the difference of the field intensity coming out from different terminals and obstacles, having the same distance to the center point of the transmitter coil plane, substantially within a preset fluctuation range $\delta_T$. The frequency f0 and the frequency band lower than the frequency f0 belong to the frequency band of the first low-frequency channel communication mode, and no calibration is needed for any terminal at that system. If the operating frequency (i.e., the frequency of the first low-frequency alternating magnetic field signal) is higher than f0, the system may need to be calibrated. In general, the more operating frequency higher than the f0, the more terminals need to be calibrated, and the more complexity of the calibration. The frequency selection may be performed one-time and, once selected, can be used without change.

FIG. 19 is a structural block diagram of a selection system for selecting the maximum operating frequency f0 of the first low-frequency channel. As shown in FIG. 19, in one embodiment, the selection system for the first low-frequency channel maximum operating frequency f0 comprises: a transmission system containing a signal source 505 and a low-frequency magnetic field transmitter coil 504, a receiving system containing a typical mobile terminal 501 and obstacles, and a signal strength detector 503 (a voltmeter, an oscilloscope, a spectrometer, etc.). A low-frequency receiver module 502 is disposed inside the mobile terminal 501. The signal source 505 may produce a variety of precise frequency, waveform and amplitude signals. The principle of selecting the frequency includes: the signal source 505 generates a sine wave signal with fixed amplitude and of frequency f, which is transmitted by the transmitter coil 504. The low-frequency receiver module 502 is disposed inside the selected typical mobile terminal 501 or obstacle, and passes the received low-frequency signal to the signal strength detector 503 via a dedicated signal line, and the signal strength detector 503 measures the received voltage. By changing the distance of the mobile terminal, the curve of the detection voltage changes with the distance can be obtained, i.e., the voltage-distance curves for the mobile terminal or obstacle at the frequency f. The mobile terminal and obstacles can be changed to obtain curves of different mobile terminals, and the frequency f can also be changed to obtain different curves.

Further, in Step a2, the maximum operating frequency f0 of the system's first low-frequency channel can be determined by the following steps.

Step 201, determining the system distance control target (Din, Dv) based on the first low-frequency alternating magnetic field signal, where Din means that all terminals (with the RF card) within the range of 0-Din are ensured for card transaction, and Dv denotes the distance fluctuation range. If the distance is within Din~(Din+Dv), card transactions are allowed and, if the distance is greater than Din+Dv, card transactions are not allowed.

For example, (5 cm, 5 cm) means that all terminals within 5 cm are ensured for card transactions, all terminals within 5 cm~10 cm are allowed card transactions, and all terminals beyond 10 cm are not allowed card transactions. The distance control target may be determined by specific applications, and (0~Din+Dv) is called distance control range.

Step 202, determining the fluctuation range $\delta_R$ of the detection voltage in the RF card that is caused by the RF card reader.

That is, the fluctuation of the induced voltage caused by the fluctuation on the parameters of the RF card reader low-frequency transmitter circuit. The parameters include transmission drive voltage fluctuation, coil parameter fluctuations, temperature impact, and so on. The fluctuation range $\delta_R$ may be controlled by the card reader design and production processes. Because the working frequency of the low-frequency transmitter circuit is substantially low, the fluctuation range $\delta_R$ can be controlled desiredly, such as less than 4 dB.

Step 203, determining the fluctuation range $\delta_C$ of the detection voltage caused by the RF card itself.

That is, the fluctuation of the final detection voltage output caused by the fluctuation on the parameters of the RF card low-frequency receiver circuit. The parameters include the receiving antenna deviation, amplifier gain deviation, filter deviation, comparator or AD deviation, temperature deviation, and noise, etc. The fluctuation range $\delta_C$ may be controlled by the RF card design and production processes. Because the operating frequency of the RF card low-frequency transmission circuit is substantially low, the fluctuation range $\delta_C$ can be controlled desiredly, such as less than 4 dB.

Step 204, determining the voltage-distance curve of various typical terminals and obstacles at the frequency f.

The frequency f may be in the low frequency band, very-low frequency band, or ultra-low frequency band. For example, the ultra-low frequency band may be in a range of approximately 300 Hz~3000 Hz, the very-low frequency band may be in a range of approximately 3 KHz~30 KHz, and the low frequency band may be in a range of approximately 30 KHz~300 KHz.

Before the Step 204, certain preparation work needs to be performed, i.e., selecting typical terminals and typical obstacles. Selection of typical terminals is primarily based on the amount of metal or conductive structures of a terminal. The more metal included, the more the attenuation. For example, typical terminals can be selected as terminals with plastic housing, with metal housing, with a thick metal shell, with a thin metal shell, with a large size, and with a small size, etc. The number of typical terminals is not limited, as long as the selected typical terminals substantially cover the attenuation characteristics of the low-frequency alternating magnetic field signal caused by terminals.

To avoid extraordinary deviation from any particular mobile terminal, the type of the mobile terminal may need to be confirmed in applications. Each type of mobile terminal for transaction applications may be tested to determine the attenuation characteristics of the type of mobile terminal.

Typical obstacles may be selected as standard shapes with different materials, such as plastic, aluminum, copper, iron, stainless steel, and other common materials used in mobile terminals. The typical obstacles are placed between the card reader and the mobile terminal as an equivalent obstacle of mobile terminal attenuation characteristics for measuring attenuation effect.

Step 205, based on the distance control target (Din, Dv), determining fluctuation range $\delta_A$ of the detection voltage by the RF card. The range $\delta_A$ equals to the difference between the voltage corresponding to the point Din on the voltage-distance curve with average field intensity attenuation curve slope and obtained from the voltage-distance curves of various typical terminals and obstacles and the voltage corresponding to the point (Din+Dv).

Figure 20:
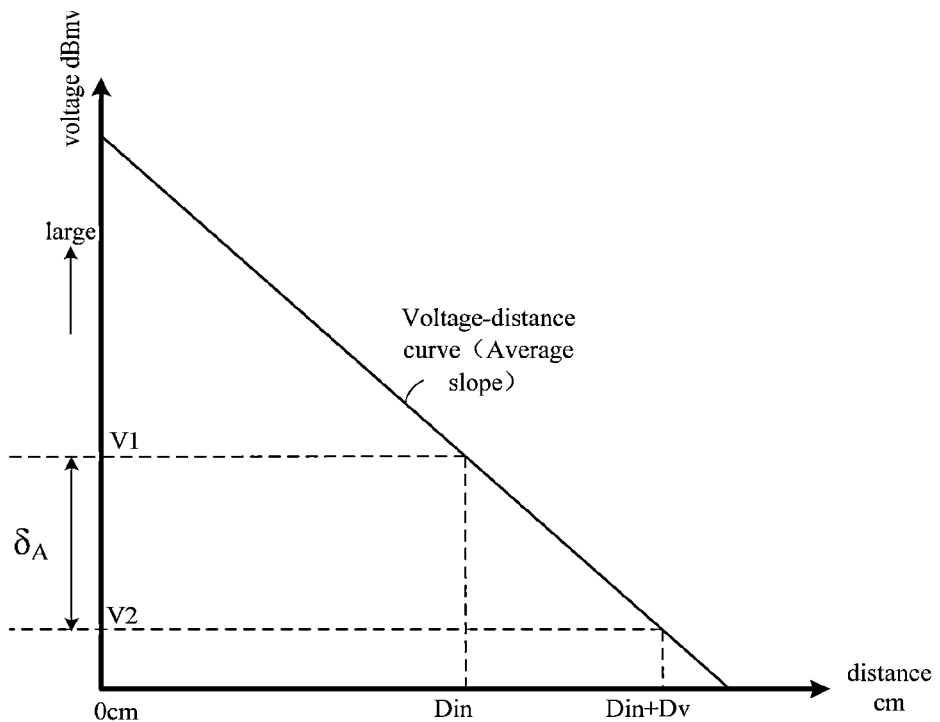
FIG. 20 illustrates the total received detection voltage fluctuation range $\delta_A$ determined by the distance control target (Din, Dv)

FIG. 20 illustrates the total received detection voltage fluctuation range $\delta_A$ determined by the distance control target (Din, Dv). As shown in FIG. 20, the point Din corresponds to voltage value V1, and the point (Din+Dv) corresponds to the voltage value V2, and $\delta_A$=V1−V2.

Step 206, determining the fluctuation range $\delta_T$ of the RF card detection voltage caused by the mobile terminal. The parameter $\delta_T$ represents the fluctuation range of the RF card detection voltage caused by the attenuation characteristics of the terminal, $\delta_T = \delta_A - \delta_R - \delta_C$.

Figure 21:
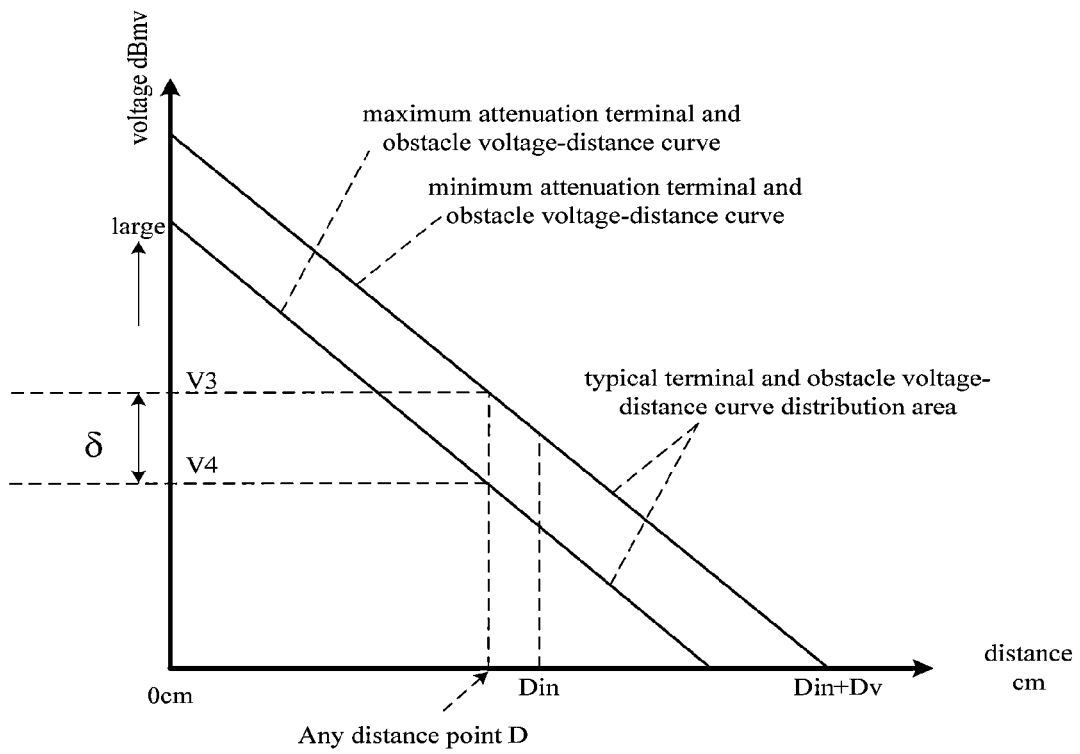
FIG. 21 illustrates voltage-distance curves and fluctuation range $\delta$ of a typical terminal and obstacle.

FIG. 21 illustrates a voltage-distance curves and fluctuation range $\delta$ of a typical terminal and obstacle. As shown in FIG. 21, the voltage-distance curve corresponding to the maximum attenuation terminal and obstacle is called the maximum attenuation curve, and voltage-distance curve corresponding to the minimum attenuation terminal and obstacle is called the minimum attenuation curve. The area surrounded by the maximum attenuation curve and the minimum attenuation curve is called the voltage-distance curve distribution area of the typical terminal and obstacle. Provided that the voltage corresponding to any D on the minimum attenuation curve is V3, and the voltage corresponding to any D on the maximum attenuation curve is V4, then $\delta$=V3−V4.

Step 207, calculating the maximum field intensity difference $\delta$ (also called the fluctuation range) at various distances with the distance control range of various typical terminals and obstacles. If $\delta$ is greater than $\delta_T$, the frequency f is decreased and the method goes to Step 204. If $\delta$ is less than $\delta_T$, the frequency f is increased and the method goes to Step 204. Further, if $\delta$ is equal to $\delta_T$, the current frequency f is equal to the frequency f0.

Thus, in the case of limited distance control target, the maximum operating frequency f0 of the system's first low-frequency channel can be determined. The first low-frequency channel may use a modulation mode, or may use another mode to directly transmit baseband signal mode. In operation, the maximum main frequency component of the system is no greater than the frequency f0, and the distance control does not need to be calibrated.

Figure 22:
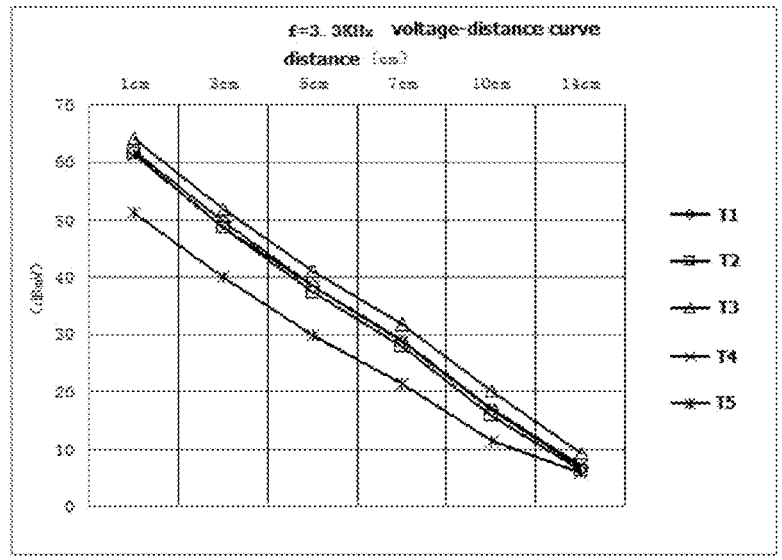
FIG. 22 illustrates five voltage-distance curves of five typical mobile terminals at frequency f of 3.3 KHz.

An example is used to illustrate the process of determining frequency f0. FIG. 22 shows 5 voltage-distance curves of 5 typical mobile terminals at frequency f of 3.3 KHz. As shown in FIG. 22, the system distance control target is (5 cm, 5 cm), the voltage fluctuation range of the system range at range 0~10 cm is about 40 dB, and the fluctuation of the detection voltage in the RF card caused by the RF card reader and the RF card is both 4 dB, i.e., $\delta_R = \delta_C = 4$ dB, $\delta_A = 20$ dB, $\delta_T = \delta_A - \delta_R - \delta_C = 12$ dB. Assuming the 5 terminals can be used to represent all terminals used in the system, the maximum fluctuation at each distance of the curves is approximately 12 dB.

Thus, the maximum frequency f0 of the system's first low-frequency channel may be determined as f0=3.3 KHz.

Figure 23:
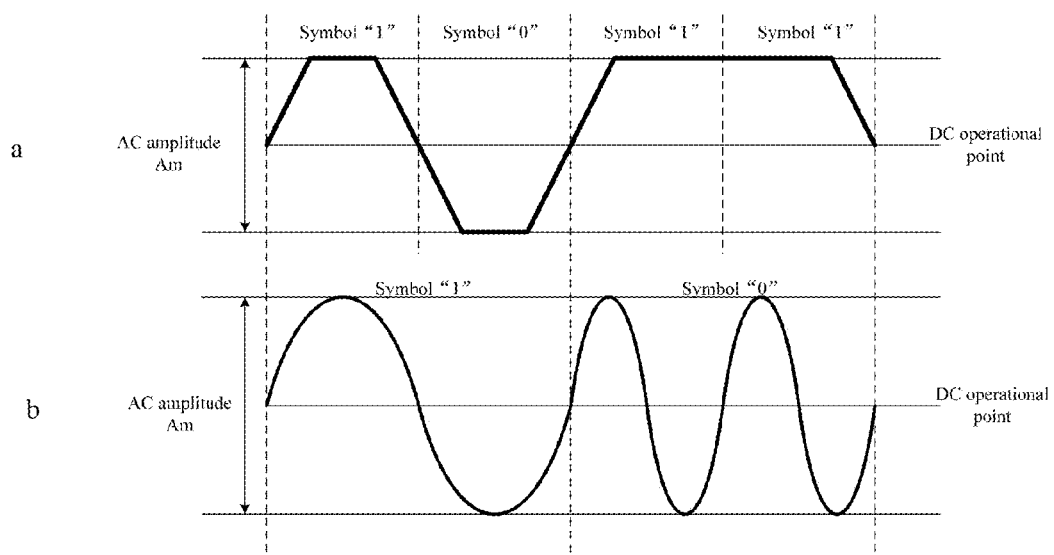
FIG. 23 illustrates a detection voltage signal detected by the RF card for directly-transmitted baseband signal without modulation and the voltage waveform diagram of the detected voltage signal for a sine-wave FSK modulation.

In Step a2, the first transmission parameters can also include modulation mode, coding mode, and transmission magnetic flux density Br. The first transmission parameters are selected to ensure that the signal detected and amplified by the RF card from the first low-frequency alternating magnetic field signal transmitted by the RF card reader at various distances is a voltage signal with constant amplitude and corresponding to the distance. FIG. 23 illustrates detection voltage signal detected by the RF card for directly-transmitted baseband signal without modulation and the voltage waveform diagram of the detected voltage signal for a sine-wave FSK modulation. In FIG. 23, 23(a) is the voltage waveform diagram of the received voltage signal for directly-transmitted baseband signal without modulation, and 23(b) a voltage waveform diagram of the received voltage signal for a sine-wave FSK modulation. As shown in FIG. 23, the detection voltage signal is a variable voltage signal containing demodulation information. The signal may be an AC voltage signal without any DC component, or may be a voltage signal having a DC component. The constant amplitude means that the maximum amplitude of the AC component in different transmission symbols keeps constant The modulation mode, coding mode, and transmission magnetic flux density Br of the first transmission parameters may be selected through the following Step a21 to Step a23.

Step a21, selecting any coding mode without an average DC component, such as Manchester, Differential Manchester, NRZ, etc.

Step a22, selecting no modulation or a carrier modulation mode without amplitude change. The carrier modulation mode can use any modulation method without amplitude change. For example, the carrier wave may be a sine wave carrier, a pulse carrier, or a triangle wave carrier, etc. The modulation may be on-off keying (OOK), phase shift keying or frequency shift keying (FSK), etc. In the no-modulation mode, the encoded baseband signal is directly driven by the driver circuit and transmitted by the transmitter coil.

Step a23, selecting the transmission magnetic flux density Br. Specifically, under a selected operating frequency that is less than f0, a selected modulation scheme and a selected coding mode, first selecting the typical mobile terminal and the magnetic detection and the amplification gain that are easy to achieve by the RF card inside the mobile terminal, then placing the mobile terminal with RF card at the farthest distance control target, i.e., distance Din+Dv, from the RF card reader. If the RF card uses magnetic induction circuit for detecting magnetic field intensity, such as a Hall device or a giant magnetoresistive device to receive the signal, the RF card reader transmits magnetic field signal having constant magnetic flux density (i.e., differential amplitude). Then, detecting inherent noise voltage amplitude Vn of the detection voltage of the RF card when the RF card reader is not sending the low-frequency alternating magnetic field signal. Further, detecting the detection voltage Vc of the RF card when the RF card reader is sending the low-frequency alternating magnetic field signal using the selected modulation and coding scheme. Thus, the transmission amplitude value Bgate or differential amplitude value B_RATEgate can be chosen, such that Vc/Vn>SNR, SNR is the Signal-to-noise-ratio of the RF card. In general SNR value may be selected as large as possible, as not to cause the transmission power of RF card reader to be too high. For example, the SNR may be selected as SNR=10. After the SNR is determined, Br is also determined as described above. According to the type of the magnetic induction circuit in the system, there can be two types of Br parameter values, the magnetic flux density threshold Bgate for the Hall device or the giant magnetoresistance device, and magnetic flux density change rate threshold B_RATEgate for a coil receiver system.

Step b2, the RF card receives and detects the low-frequency alternating magnetic field signal sent by the RF card reader at each distance through the first low-frequency channel, and amplifies the low-frequency alternating magnetic field signal into a voltage signal corresponding to the distance and with constant amplitude. Further, based on a preset voltage threshold value Vt, it can be determined whether the terminal with the RF card enters into the effective card transaction range. The voltage threshold value Vt may be set the same for all terminals with the RF card.

In Step b2, the preset voltage threshold Vt can be set through the following Step 301 to Step 303.

Step 301, under the selected transmission parameters, measuring the voltage-distance curve obtained by the card reader from various typical terminals and obstacles. The transmission parameters include frequency of the low-frequency alternating magnetic field signal, modulation mode, coding mode, and transmission magnetic flux density Br, etc.

Step 302, obtaining a reference voltage-distance curve, the reference voltage-distance curve is the middle value of the curves of the typical terminals and obstacles, the voltage magnitude from the upper boundary and the lower boundary of the curves the typical terminals and obstacles is $\delta_T/2$.

Step 303, selecting the threshold value Vt of the detection voltage of the RF card: the voltage value at the point (Din+ Dv/2) on the reference voltage-distance curve is Vt.

Step c2, if the voltage signal corresponding to the received low-frequency alternating magnetic field signal is greater than or equal to the preset voltage threshold Vt, the terminal with the RF card enters the effective card transaction range, the RF card obtains the identification information of the RF card reader from the received low-frequency alternating magnetic field signal and, based on the second transmission parameters, transmits second low-frequency alternating magnetic field signal through the second low-frequency channel. The second low-frequency alternating magnetic field signal carries the identification information of the RF card reader obtained by the RF card, and the identification information of the RF card itself. The second transmission parameters include the frequency of the second low-frequency alternating magnetic field signal. This frequency is equal to or less than the maximum operating frequency f0' of the system's second low-frequency channel, and f0' is the maximum operating frequency satisfying the target communication distance of Din~Din+Dv'.

In Step c2, the maximum operating frequency f0' of the communication system's second low-frequency channel can be determined similarly to the frequency f0. The difference is that the target communication distance range of the second low-frequency channel is Din~Din+Dv'. Further, to ensure that the communication in the second low-frequency channel can be successfully completed at the communication distance of the first low-frequency channel, the communication distance fluctuation Dv of the first low-frequency channel and the communication distance fluctuation Dv' of the second low-frequency channel have a relationship of Dv<Dv', detailed descriptions are omitted herein.

Before, Step c2, it needs to determine the corresponding relationship between the induction voltage corresponding to the low-frequency alternating magnetic field signal, transmitted by the mobile terminal with the RF card and detected by the RF card reader, and the distance.

Before selecting the communication frequency f' of the second low-frequency channel, it needs to determine that, under the second low-frequency channel communication mode, the change patterns of the voltage-distance curves of all the typical terminal and obstacles detected by the RF card reader, and the change patterns of voltage with respect to change of the frequency.

Figure 24:
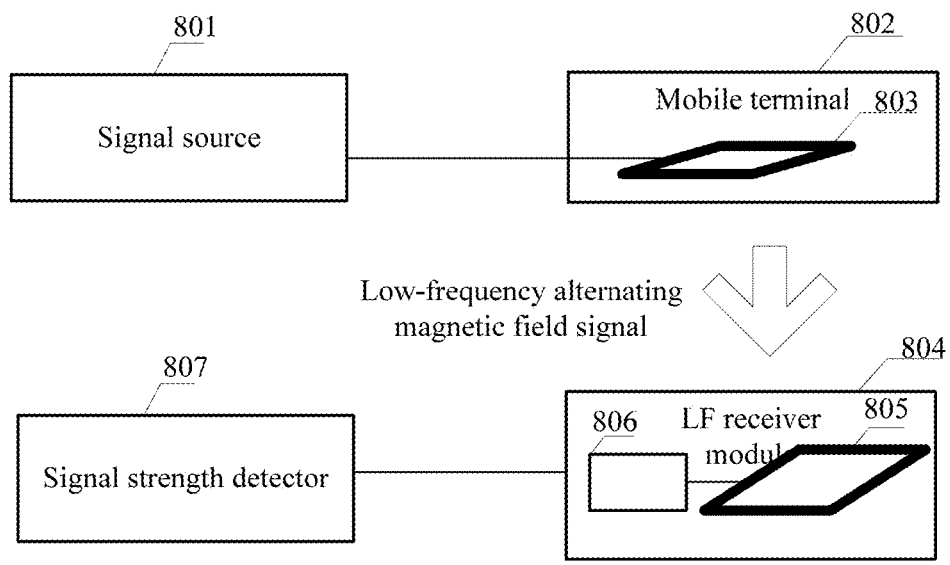
FIG. 24 illustrates a block diagram of a system for detecting the voltage-distance curves under the second low-frequency channel communication mode.

FIG. 24 is a block diagram of a system for detecting the voltage-distance curves under the second low-frequency channel communication mode. As shown in FIG. 24, the selection system comprises: a transmission system containing a signal source 801 and various typical mobile terminals 802 (including transmitter coil 803 and various obstacles), a receiving system containing low-frequency receiving module 804 (including low-frequency receiver coil 805 and low-frequency receiving circuit 806), and a signal strength detector 807 (a voltmeter, an oscilloscope, a spectrometer, etc.).

The principle of detecting voltage and distance curve (voltage-distance curve) includes: the signal source 801 generates a sine wave signal with a fixed amplitude and of frequency f', which is transmitted by the transmitter coil 803 in the mobile terminal 802, and the signal passes through or is diffracted through the typical mobile terminal and obstacles. The low-frequency receiver module 804 converts the received low-frequency signal and passes the signal to the signal strength detector 807 through a dedicated signal line, and the signal strength detector 807 detects the received voltage. By changing the distance of the mobile terminal, the low-frequency receiving module receives corresponding signals from the mobile terminal and obstacles, and the curve of the detection voltage changes with the distance can be obtained, i.e., the voltage-distance curve, under the frequency f'. The mobile terminal and obstacles can be changed to obtain curves of different mobile terminals, and the frequency f' can also be changed to obtain different curves.

Figure 25:
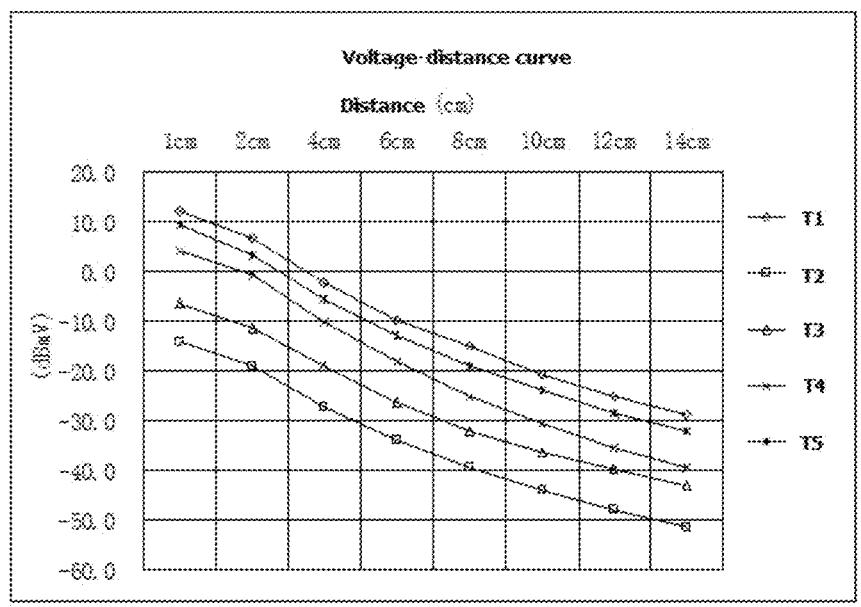
FIG. 25 illustrates voltage-distance curves detected by the system in FIG. 24.

FIG. 25 shows the voltage-distance curves detected by the system in FIG. 24. As shown in FIG. 25, under the second low-frequency channel communication mode, the voltage-distance curves have similar patterns to those under the first low-frequency channel communication mode, the voltage detected by the RF card reader decreases monotonically with the distance.

In Step c2, the relevant parameters of the low-frequency magnetic induction circuit, low-frequency amplifier circuit, and filter circuit in the low-frequency receiver module of the RF card reader can be determined as follows:

Step c201, under a selected operating frequency, a selected modulation scheme and a selected coding mode, first selecting the typical noise terminal and the magnetic detection and the amplification gain that are easy to achieve by the RF card reader.

Step c202, detecting inherent noise voltage amplitude Vn' of the detection voltage of the RF card reader when the RF card is not sending the first low-frequency alternating magnetic field signal.

Step c203, detecting the detection voltage Vr of the card reader when the RF card is sending the low-frequency alternating magnetic field signal using the selected modulation and coding and the selected transmission magnetic flux density; adjusting the parameters of the low-frequency magnetic induction circuit, low-frequency amplifier circuit, and filter circuit in the RF card reader, such that Vr/Vn'>SNR', where SNR' is the minimum signal-noise-ratio at which the RF card reader can perform decoding within the preset communication range. In this step, the adjustments of the parameters of the low-frequency magnetic induction circuit and the low-frequency amplifier and filter circuit are mainly to adjust the sensitivity of the low-frequency magnetic induction devices, such as the area and the number of turns of the low-frequency receiver coil, and the gain and the bandwidth of the low frequency of the low-frequency amplifier and filter circuit.

In Step c2, the second transmission parameters of the RF card also include the low-frequency coding mode, modulation mode, and low-frequency transmission magnetic flux density Bc, and the transmission parameters may be determined through the following Steps.

Step c211, selecting any coding mode without an average DC component, such as Manchester, Differential Manchester, NRZ, etc.

Step c212, selecting no modulation or a carrier modulation mode without amplitude change. The carrier modulation mode can use any modulation method without amplitude change. For example, the carrier wave may be a sine wave carrier, a pulse carrier, or a triangle wave carrier, etc. The modulation may be on-off keying (OOK), phase shift keying or frequency shift keying (FSK), etc. In the no-modulation mode, the encoded baseband signal is directly driven by the driver circuit and transmitted by the transmitter coil.

Step c213, selecting the transmission magnetic flux density Bc of the second low-frequency channel. Specifically, under a selected operating frequency that is less than f0, a selected modulation scheme and a selected coding mode, first selecting the typical noise terminal and the magnetic detection and the amplification gain that are easy to achieve by the RF card reader; then detecting inherent noise voltage amplitude Vn' of the detection voltage of the RF card reader when the mobile terminal is not sending the low-frequency alternating magnetic field signal. Further, detecting the detection voltage Vr of the RF card reader when the mobile terminal is sending the low-frequency alternating magnetic field signal using the selected modulation and coding mode. The transmission magnetic flux density Bc is selected such that Vr/Vn'>SNR', where SNR' is the signal-noise-ratio of the low-frequency signal of the RF card reader. In general SNR' value may be selected as large as possible, as not to cause the transmission power of RF communication device to be too high. For example, the SNR' may be selected as SNR'=10. After the SNR' is determined, Bc is also determined as described above.

Step d2, after receiving the second low-frequency alternating magnetic field signal, the RF card reader obtains the identification information carried by the signal, and compares the identification information of the RF card reader in the second low-frequency alternating magnetic field signal with its own identification information. If they are the same, the RF card reader combines its own identification information and the identification information of the RF card, which can be used for the RF communication address and channel parameters of the RF communication to conduct card transaction with the terminal equipped with the RF card.

As used herein, card transaction not only refers to any electronic payment, but also refers to any other communications process using RF channels, such as recharging, consuming, and identity authentication, etc. That is, the card transaction refers the communication conducted through the RF channels, especially the short-range or near-field communication over RF channels.

Thus, through the above Steps of a2, b2, c2, and d2, secure and effective control of the communication distance can be realized by using the two-way low-frequency magnetic field detection techniques, and no terminal calibration is needed.

In the disclosed embodiments, the frequency of the low-frequency alternating magnetic field signal may be in the low frequency band, very-low frequency band, or ultra-low frequency band. For example, the ultra-low frequency band may be in a range of approximately 300 Hz 3000 Hz, the very-low frequency band may be in a range of approximately 3 KHz~30 KHz, and the low frequency band may be in a range of approximately 30 KHz~300 KHz. In certain embodiments, the frequency of the low-frequency alternating magnetic field signal can be in a range of approximately 300 Hz~50 KHz, such as 10 KHz, 15 KHz, 20 KHz, 25 KHz or 30 KHz. For example, the frequency of the first low-frequency alternating magnetic field signal can be approximately 500 Hz, 1 KHz, 1.5 KHz, 2 KHz, 2.5 KHz, 3 KHz, 4 KHz, 5 KHz, 10 KHz, 20 KHz or 30 KHz; and the frequency of the second low-frequency alternating magnetic field signal can be approximately 10 KHZ, 20 KHZ, 25 KHZ, 30 KHZ, 35 KHZ, or 40 KHZ.

Thus, according to the disclosed embodiments, an RF card reader and a method for communication distance control between the RF card reader and the mobile terminal with the RF card is provided. The method uses the two-way low-frequency magnetic field communication and two-way high-speed RF communication, avoiding the antenna problem and the terminal signal attenuation difference problem caused by only using the 13.56 MHz frequency for two-way communication and distance control in NFC systems. This method can also prevent the RF card reader being tampered, such as increasing the low-frequency RF transmission power or RF receiver sensitivity of the RF card reader, to impact user experience and effectiveness on the card transactions. According to the disclosed embodiments, the RF card reader uses the first low-frequency channel to send its unique identification IDr (i.e., the aforementioned identification information) to the RF card, and the RF card uses the second low-frequency channel to send its unique identification IDc appended to the identification IDr to the RF card reader. The RF card reader determines the correctness returned IDr, and achieves a unique binding between the RF card and the RF card reader. After the binding, the RF card and the RF card reader can perform high-speed communication of large amount of data using the two-way RF channel, until the completion of the card transaction.

The implementation of the communication system is illustrated as follows.

(1), The communication frequency f0 of the first low-frequency channel can be selected using previously-describe methods, the details of which are not repeated herein.

(2), the Process for Distance Control and Connection the RF Card to the Card Reader.

The card reader switches back and forth between a low-frequency transmitting state and a low-frequency receiving state at a fixed period. When in the transmitting state, the RF card reader transmits the first low-frequency alternating magnetic field signal at a frequency no higher than the selected frequency f0 using preconfigured transmission parameters and based on the distance control target. The first low-frequency alternating magnetic field signal carries a data frame based on modulated signal or direct baseband signal. The data frame contains a unique identifier IDr of the RF card reader (of course can also be other identification information). When the mobile terminal with the RF card is placed around the card reader, the low-frequency alternating magnetic field signal penetrates the mobile terminal and reaches the RF card. The RF card detects and amplifies the low-frequency alternating magnetic field signal at each distance point into a voltage signal of constant amplitude and corresponding to the distance point.

When the voltage value is lower than the preset threshold value in the RF card, it indicates that the terminal does not enter into a valid card transaction range, and card transactions are not allowed. When the voltage amplitude is higher than the preset voltage threshold of the RF card, it indicates that the terminal enters into the valid card transaction range, the RF card parses the information in the magnetic field signal and obtains the identifier IDr of the RF card reader. The RF card then sends the second low-frequency alternating magnetic field signal carries a data frame based on modulated signal or direct baseband signal. The data frame contains the unique identifier IDr of the RF card reader and a unique identifier IDc of the RF card. The RF card reader parses the magnetic field signal and obtains the IDr and the IDc, and compares with the received IDr and its own IDr. If the received IDr is the same as its own IDr, it indicates that the terminal enters into the valid card transaction range. The RF card reader combines the IDr and the IDc to generate the RF communication address and initiate card transaction. Further, when a card transaction is initiated, the RF card reader is no longer switching between the low-frequency transmitting state and the low-frequency receiving state periodically. Instead, the RF card reader continuously transmits the low-frequency magnetic field signal to ensure that the mobile terminal with the RF card and the RF card reader are always within the valid card transaction range. Thus, the RF card and the RF card reader can be uniquely bond, with both sides using the unique combined address (IDr, IDc) to identify each other. After the binding, the communication process for data exchange using the RF channel is less likely to generate errors. That is, after the RF card is successfully bond with or connected to the card reader, the distance control process is completed, and a subsequent card transaction can be carried out on the RF channel until the end of the transaction.

(3), the Transaction Process.

The RF card and the RF card reader establish the unique and reliable communication link through the RF channel. Based on the communication link, the two sides can complete the authentication required by the transaction and other processes required by the transaction. All of these processes can be accomplished by a fast RF channel. Because the above described process can ensure that the connection can only be made within a predetermined distance range, the entire transaction process can also be communication limited within the predetermined distance range.

Figures 26, 27, 28:
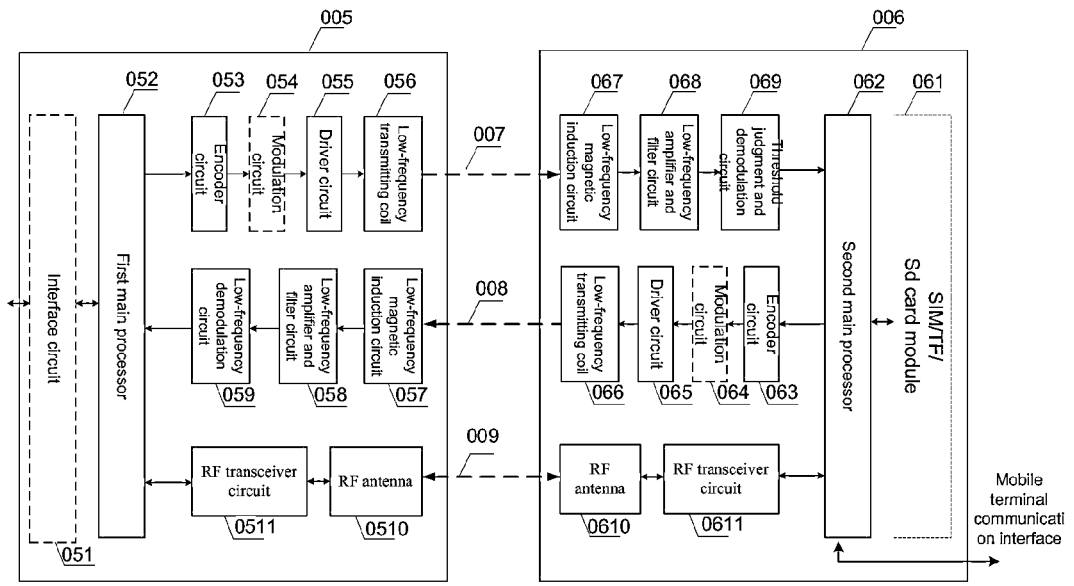
FIG. 26 illustrates a diagram of an exemplary communication system.
FIG. 27 illustrates a low-frequency data frame transmitted by the RF card reader.
FIG. 28 illustrates a low-frequency data frame transmitted by the RF card.

FIG. 26 shows an exemplary communication system according to disclosed embodiments. As shown in FIG. 26, the communication system consists of two parts: the card reader 005 and the RF card 006. The RF card 006 is placed inside a mobile terminal and interacts with the mobile terminal through terminal communication interfaces.

As shown in FIG. 26, the RF card reader 005 may comprise the following modules: a first main processor 052, responsible for the card reader low frequency and high frequency control and processing other protocols, the first main processor 052 can connect to the external communication interface via the interface circuit 051 or directly; an encoding circuit 053 responsible for coding the low-frequency frame data bit by bit; a modulation circuit 054 responsible for modulating the symbol stream outputted by the encoding circuit against a carrier wave to generate a modulated signal to the drive circuit 055 or for directly sending the encoded signal to the drive circuit 025 if no modulation is used; a drive circuit 055, responsible for driving the low-frequency transmitter coil 056 to generate the low-frequency alternating magnetic field signal 007; a low-frequency magnetic induction circuit 056 comprising a PCB coil, a wire coil, a giant magnetoresistive device, a Hall device, or other circuit elements capable of sensing magnetic field changes, responsible for inducing and converting the low-frequency alternating magnetic field signal 008 into an electrical signal; a low-frequency amplifier and filter circuit 058 responsible for amplifying the electrical signal detected by the low-frequency magnetic induction circuit and filtering out the noise component; a demodulation circuit 059 responsible for demodulating the low-frequency signal with the noise component filtered out to generate the encoded signal transmitted by the encoding circuit 063 of the RF card 006, and sending the demodulated encoded signal to the first main processor 052. The first main processor 052 is responsible for decoding processing. An RF transceiver circuit 0511 is responsible for completing RF two-way communication with the RF transceiver module of the RF card 006 through the RF antenna 0510.

As shown in FIG. 26, the RF card 006 may comprise the following modules: a second main processor 062 responsible for controlling low-frequency and RF modules and processing other protocols and also responsible for communicating with the mobile terminal; an SIM/TF/SD card module 061 being internal SIM/TF/SD card module of the mobile terminal, the module type is determined by the specific type of the card; a low-frequency magnetic induction circuit 067 comprising a PCB coil, a wire coil, a giant magnetoresistive device, a Hall device, or other circuit elements capable of sensing magnetic field changes, responsible for inducing and converting the low-frequency alternating magnetic field signal 007 into an electrical signal; a low-frequency amplifier and filter circuit 068 responsible for amplifying the electrical signal detected by the low-frequency magnetic induction circuit into a low-frequency detection voltage signal; a threshold judgment and demodulation circuit 069 responsible for comparing the value of the low-frequency detection voltage signal the value with the preset threshold value. If the value does not reach the threshold, demodulation is not performed and any card transaction is not allowed. If the value reaches the preset threshold value, the demodulation is performed and the demodulated signal is sent to the second main processor 062. The RF card 006 also includes an encoding circuit 063, responsible for encoding a low-frequency frame bit by bit; a modulation circuit 064 responsible for modulating the symbol stream outputted by the encoding circuit against a carrier wave to generate a demodulated signal to the drive circuit 065 or for directly sending the encoded signal to the drive circuit 065 if no modulation is used; the drive circuit 065, responsible for driving the low-frequency transmitter coil 066 to generate the low-frequency alternating magnetic field signal 008; and an RF transceiver circuit 0611 responsible for completing RF two-way communication with the RF transceiver module of the card reader 005 through the RF antenna 0610.

The communication system achieves distance detection and control without calibration by determining the low-frequency communication threshold from the mobile terminal to the card reader and the low-frequency communication distance limitation from the mobile terminal to the RF card reader. That is, the RF card reader 005 transmits the first low-frequency alternating magnetic field signal 007 in accordance with the preset transmission parameters, and the RF card 006 receives the magnetic field signal and converts it into a low-frequency detection voltage signal, and uses a preset threshold value to determine whether the terminal enters the preset valid distance range set by the RF card reader 005. After entering the valid distance range, the RF card 006 transmits the second low-frequency alternating magnetic field signal 008 to the RF card reader 005. The RF card reader 005 receives the magnetic field signal and analyzes the data in the received signal. If the data is legitimate, it indicates that the RF card reader 005 and the RF card 006 enter into the valid card transaction range set by the system. Before the RF card reader receives the low-frequency magnetic field signal, the relevant parameters of its low-frequency receiver module can be adjusted such that the signal-to-noise-ratio of the RF card reader is greater than the minimum signal-to-noise-ratio SNR' at which the RF card reader can still perform decoding.

Thus, the unique binding between the RF card reader 005 and the RF card 006 is realized by using the combination of the two-way low-frequency communication and two-way RF communication. That is, the RF card reader 005 uses the first low-frequency channel to send its unique identification IDr to the RF card 006, and the RF card 006 uses the second low-frequency channel to send its unique identification IDc appended to the identification IDr to the RF card reader 005. The RF card reader 005 determines the correctness returned IDr, and achieves a unique binding between the RF card 006 and the RF card reader 005. After the binding, the RF card 006 and the RF card reader 005 can perform two-way high-speed communication of large amount of data using the RF channel.

The operational flow of the communication system associated with the RF card reader is illustrated as follows.

Step A010: distance detection and control process. The first main processor 052 of the RF card reader 005 generates a data frame containing a unique identifier IDr of the RF card reader 005 and sends it to the encoding circuit 053 to be encoded. The encoded signal is modulated by the modulation circuit 054 and passed to the drive circuit 055 or is directly passed to the drive circuit 055 without modulation, the modulated voltage is sent to the low-frequency transmitter coil 056. Based on preconfigured frame format, modulation and coding schemes, and driving capability, the transmitter coil 056 transmits the first low-frequency alternating magnetic field signal 007 at the preset intensity Bc in accordance with the selected frame format and transmission parameters.

When the mobile terminal is placed around the RF card reader 005, the first low-frequency alternating magnetic field signal 007 penetrates the terminal and reaches the RF card 006. The low-frequency magnetic induction circuit 067 of the RF card 005 detects the low-frequency magnetic field signal into an electrical signal. The electrical signal is amplified and filtered out noise component by the low-frequency amplifier circuit 068 to generate a low-frequency detection voltage. When the detection voltage is less than the preset receiving threshold value, card transactions are not allowed. When the detection voltage is greater than or equal to the preset receiving threshold value, it indicates that the terminal enters into the predetermined effective communication distance range of the RF card reader 005. The threshold judgment and demodulation circuit 069 parses the detection voltage signal to obtain IDr and to send it to the second main processor 062.

The second main processor 062 composes a data frame including the unique identification IDc of the RF card 006 and the unique identification IDr of the RF card reader 005 and sends the frame to the encoding circuit 063. The encoded signal is modulated by the modulation circuit 064 and passed to the drive circuit 065, or is directly passed to the drive circuit 065 if no modulation is used. The drive circuit 065 drives the low-frequency transmitter coil 066 to transmit the low-frequency alternating magnetic field signal 008 based on preconfigured frame format, modulation and coding mode, and transmission magnetic field intensity.

The low-frequency magnetic induction circuit 056 of the RF card reader 005 detects the low-frequency magnetic signal into an electrical signal, which is then amplified and filtered out the noise component by the low-frequency amplifier and filter circuit 058 to a low-frequency detection voltage. The relevant parameters of the low-frequency magnetic induction circuit 056 and the low-frequency amplifier and filter circuit 058 can be adjusted such that the receiving signal-to-noise-ratio of the RF card reader 005 is greater than the minimum signal-to-noise-ratio SNR' at which the RF card reader can still perform decoding. The voltage signal is processed by the demodulation circuit 059 to obtain the original encoded signal sent by the RF card 006, which is send to the first main processor 052 for decoding processing. After decoding, the IDr and the IDc is obtained, the first main processor 052 determines whether the received IDr and its own IDr are the same. If the received IDr and its own IDr are not the same, card transactions are not allowed. If the received IDr and its own IDr are the same, it indicates that the RF card reader and the RF card enter into the preconfigured valid card transaction range.

The frame format in Step A010 can be defined as follows:

FIG. 27 illustrates a low-frequency data frame transmitted by the RF card reader. As shown in FIG. 27, the RF card reader low-frequency data frame includes the following.

Preamble: 8 bits, usually FFH, for frame synchronization.

Control field: eight bits, providing information for reading the frame, such as length, data type, etc., reserved bits can used for expansion.

IDr: N bits, the unique identifier of the RF card reader, specified by the control field, where N is a natural number.

CRC: the checksum for the control field and the IDc, CRC checksum or other format can be used.

FIG. 28 illustrates a low-frequency data frame transmitted by the RF card. As shown in FIG. 28, the RF card low-frequency data frame includes the following.

Preamble: 8 bits, usually FFH, for frame synchronization.

Control field: eight bits, providing information for reading the frame, such as length, data type, etc., reserved bits can used for expansion.

IDr+IDc: N bits, the unique identifier of the RF card reader and the unique identifier of the RF card, specified by the control field, where N is a natural number.

CRC: the checksum for the control field and the IDr+IDc, CRC checksum or other format can be used.

The above-described frame formats are only examples, any frame format containing the unique identifier of the RF card and/or the unique identifier of the RF card reader can be used. The unique identifier can be a random number of sufficient length, the card reader may also be manually assigned a unique code, or other methods may be used to generate the unique identifier.

Step A020: as described in Step A010, after the RF card reader determines that the received IDr information and its own IDr information are consistent, it indicates that the RF card reader and the RF card enter a valid card transaction range preconfigured by the system. The first main processor 202 set the combination of the IDr and IDc as the RF communications address, so that the RF card with identification IDc and the RF card reader with identification IDr can be uniquely bond together, using the combination address (IDr, IDc) to uniquely identify each other. After the binding, the communication process over the RF channel is less likely to generate errors. After the RF card is successfully connected to or bond to the RF card reader, the distance control process is completed, and the subsequent card transaction process can be carried out on the RF channel.

The unique identifier IDc of the RF card in Step A020 can be a unique identifier pre-stored in the nonvolatile memory (NVM) of the RF card, or a random number with a sufficient length internally generated by the RF card.

Step A030: transaction process. The card reader 005 and the RF card 006 establish a reliable and unique communication link through the RF channel. Based on the link, the two sides can complete the authentication required by the transaction and other processes required by the transaction. All of these processes can be accomplished by a fast RF channel. Because Steps A010~A020 can ensure that the connection to the RF card 006 can only be made within a predetermined distance range, the entire transaction process can also be communication limited within the predetermined distance range. The transaction process may be a POS transaction process, the details are omitted herein.

The low-frequency signal detection circuit 057 and 067 of the RF card reader 005 and the RF card 006 may each comprise a PCB coil, a wire coil, a GMR device, or a Hall device. Other sensing device may also be used, so long as the device is capable of converting the magnetic field into an electrical signal. The low-frequency signal detection circuit 067 of the RF card 006 needs to be disposed within the card, and the low-frequency signal detection circuit 057 of the RF card reader 005 should have higher magnetic induction sensitivity.

Thus, the disclosed communication system can use low-frequency alternating magnetic field to achieve distance detection and control, and to achieve two-way low-frequency communication between the RF card reader to the RF card. The RF channel can be used in combination with the low-frequency two-way communication to achieve reliable and unique binding, and the RF channel can be used to achieve high-speed data communication between the RF card reader and the RF card. Certain characteristics include: (1) the mobile terminal does not need to be modified, only needs to replace the SIM/TF/SD card inside the mobile terminal and the reliable two-way distance communication can be achieved; (2) because the current provided by the RF card is limited, the communication distance of the low-frequency signal is limited, which can prevent the transmission power of the RF card being tampered or increased, and the communication distance can be effectively controlled within a predetermined range. In addition, the RF transceiver circuit is placed within the RF card to achieve two-way high-speed communication with the RF transceiver circuit with the card reader. Because the antenna of the RF circuit is very small, it can be easily integrated into the SIM/TF/SD card.

According to the disclosed embodiments, after selecting the frequency f, the low-frequency transmission magnetic flux density Br of the RF card reader, and the minimum receiving signal-to-noise-ratio SNR' of the RF card reader, the RF card reader used in the above system can perform effectively distance control on the mobile terminal equipped with the RF card and complete the card transaction. As an extension, frequency f may also be selected above the frequency f0 or the minimum receiving signal-to-noise-ratio of the RF card reader is less than SNR', which may cause reduced performance, reduced distance control accuracy, and/or reduced communication success rate. However, such use does not conflict with the disclosed invention, and merely an extension with modified performance.

Figure 29:
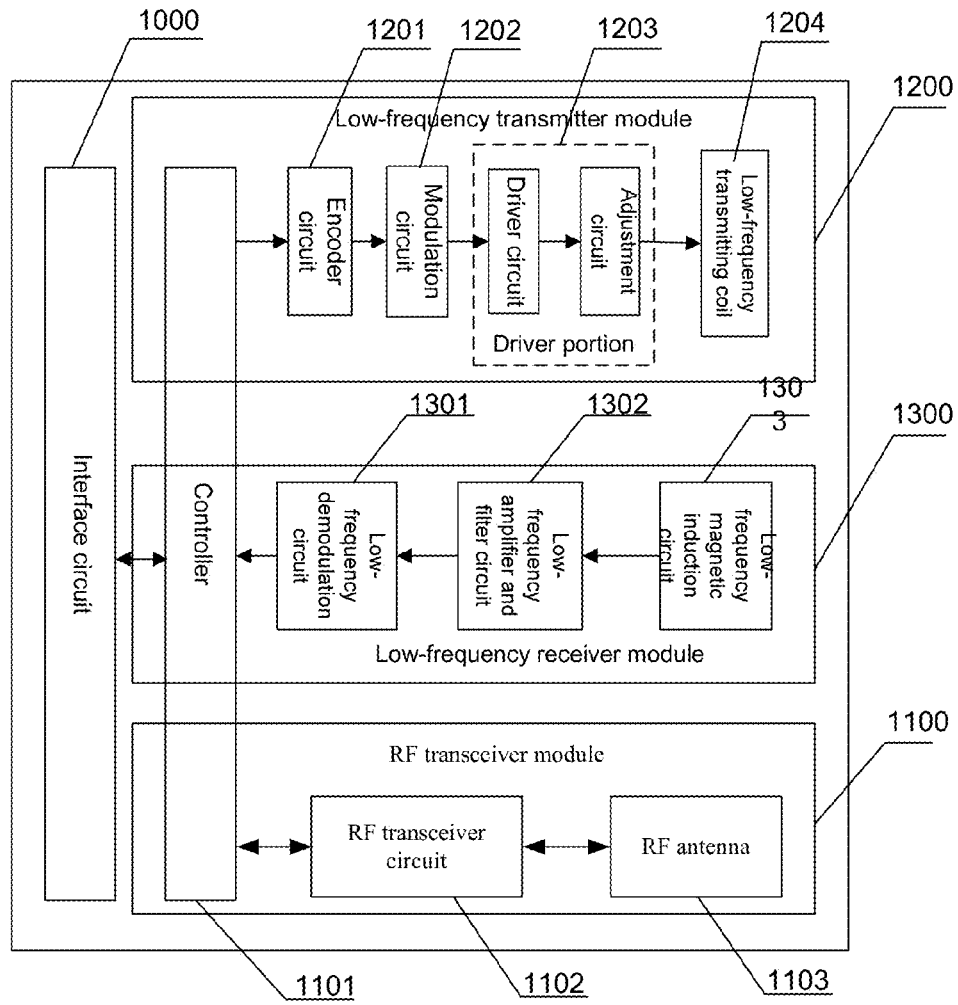
FIG. 29 illustrates a structural diagram of an RF reader.

FIG. 29 illustrates another structural diagram of the RF card reader. As shown in FIG. 29, the RF card reader includes four parts, an interface circuit 1000, an RF transceiver module 1100, a low-frequency transmitter module 1200, and a low-frequency receiver module 1300. The interface circuit 1000 is configured to interface with an upper-level controller for interface communication; the RF transceiver module 1100 includes a RF transceiver circuit 1102, an RF antenna 1103, and a main controller 1101; the low-frequency transmitter module 1200 includes a coding circuit 1201, a modulation circuit 1202, a drive section 1203, a low-frequency transmitter coil 1204, and the main controller 1101; the low-frequency receiver module 1300 includes a low-frequency magnetic induction circuit 1301, a low-frequency amplifier and filter circuit 1302, a low-frequency demodulation circuit 1303, and the main controller 1101. The RF transceiver module 1100, the low-frequency transmitter module 1200, and the low-frequency receiver module 1300 can share the same main controller. The drive section 1203 includes a drive circuit and an adjusting circuit. Thus, the RF card reader in FIG. 29 is similar to the RF card reader in the communication system shown in FIG. 26. However, in FIG. 29, the main controller 1101 replaces the first main processor 052 in the FIG. 26.

The low-frequency transmitter module is operated at a predetermined frequency less than the highest frequency f0 of the first low-frequency channel of the system. The selection of the parameters of the low-frequency magnetic induction circuit in the low-frequency receiver module and low-frequency amplifier and filter circuit is made such that their signal-to-noise-ratio is greater than the minimum decodable signal-to-noise-ratio SNR'. The RF card reader transmits the first low-frequency alternating magnetic field signal having a preconfigured constant amplitude or differential amplitude. The amplitude of the low-frequency alternating magnetic field signal corresponding to the preset physical communication distance, and the deviation of the amplitude of the low-frequency alternating magnetic field signal is less than the preset fluctuation value $\delta_R$. The details of the amplitude and the physical distance are described previously and are omitted herein.

The low-frequency transmitter coil 1204 is configured to transmit low-frequency magnetic field signal, and may mainly include a wire coil or a PCB coil.

The main controller 1101 is responsible for controlling the entire RF card reader, including the low-frequency transmitter module 1200, the low-frequency receiver module 1300, and the RF transceiver module 1100.

The transceiver circuit 1102 is configured to transmit and receive RF signals. The frequency of the RF communication may be primarily in the UHF frequency band, especially 2400 Mhz~2483 MHz band. Other frequency bands, such as 433 MHz, 900 MHz, and 5 GHz, etc., may also be used.

The RF antenna 1103 is responsible radiating and receiving the RF energy; the encoder circuit 1201 is used to perform certain encoding processing on the low-frequency magnetic field signal; the modulation circuit 1203 is used to modulate the encoded signal on a carrier wave; the drive section 1203 includes a drive circuit and an adjustment circuit where the drive circuit is mainly responsible for amplifying the low-frequency magnetic field signal I and enhancing its driving ability, and the adjustment circuit is mainly responsible for adjusting the deviation of the low-frequency magnetic field signal strength. The driver circuit can include DAC (Digital-to-Analog Converter) and operational amplifiers (op amp) for generating and amplifying square waves, sine waves, triangle waves, etc., or can include circuitry comprising resistors, capacitors, and op amps for generating and amplifying square waves, sine waves, triangle waves, etc. The adjustment circuit can adjust the output voltage of the driving circuit or adjust the resistance of the load.

The low-frequency magnetic induction circuit 1303 is responsible for inducing and converting the second low-frequency alternating magnetic field signal transmitted by the mobile terminal with the RF card through the second low-frequency channel into an electrical signal. The maximum operating frequency of the signal is f0'. The frequency f0' can be determined similarly to the previous descriptions, just with different target range of the communication distance. The communication distance target range of the second low-frequency channel is Din~Din+Dv' (Dv'>Dv). Further, the low-frequency magnetic induction circuit may comprise a PCB coil, a wire coil, Hall device, or a giant magnetoresistive device.

The low-frequency amplifier and filter circuit 1302 is responsible for amplifying the electrical signal detected by the low-frequency magnetic induction circuit and filtering out the noise component, so as to obtain a maximum low-frequency receiving signal-to-noise-ratio. The amplifier circuit can comprise various op amps and resistors, and the filter circuit may comprise The low-frequency circuit 1302 is responsible for amplifying and filtering the low-frequency electrical signal to the magnetic sensor circuit for receiving the pre-amplification and filtering of noise so as to obtain the maximum signal to noise ratio of the received frequency, amplified by a variety of circuits can be put into operation, resistors, the filter circuit may be a passive filter formed by resistors and capacitors composed or an active filter formed by resistors, capacitors, and op amps.

The demodulation circuit 1301 is responsible for demodulation process of the low-frequency amplified signal. The demodulation circuit may be an analysis circuit processing a baseband signal without modulation and mainly comprises comparators and resistors, or the demodulation circuit may be a signal demodulation circuit processing modulated signals corresponding to the modulation format used by the RF card. The demodulation format can be selected as one of the on-off keying (OOK), phase Shift keying (PSK), or frequency shift keying (FSK), etc.

Figure 34:
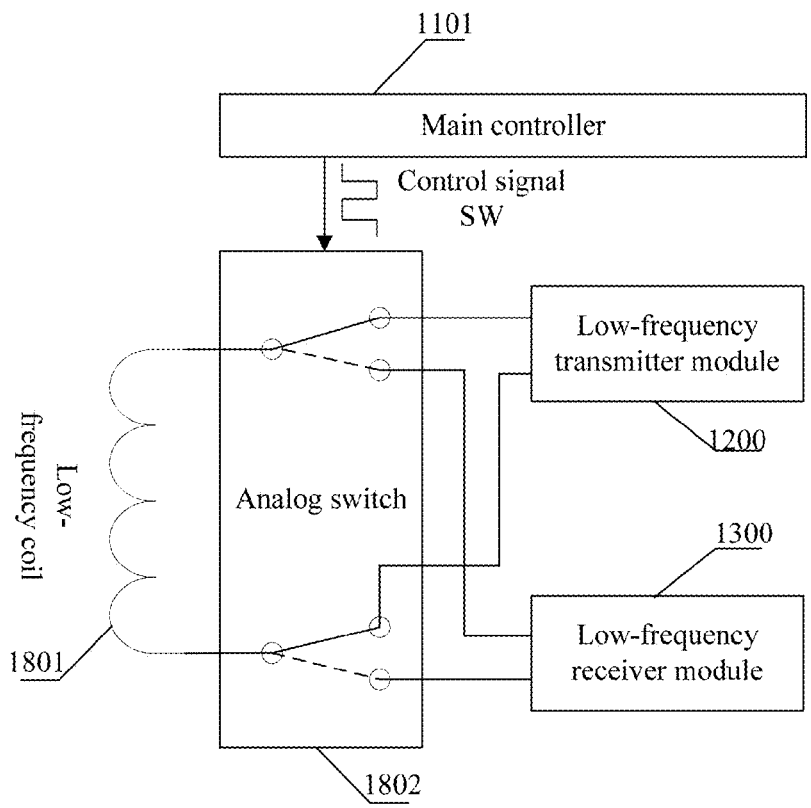
FIG. 34 illustrates a configuration using an analog switch to switch operation when the low-frequency receiver coil and the low-frequency transmitter coil share the same coil.

When selecting low-frequency coil for the low-frequency magnetic induction circuit in the RF card reader, the low-frequency receiver coil and the low-frequency transmitter coil can share the same coil. FIG. 34 shows an exemplary coil sharing mode.

As shown in FIG. 34, the system comprises the main controller 1101, the low-frequency transmitter module 1200, the low-frequency receiver module 1300, the low-frequency coil 1801, and an analog switch 1802. The main controller 1101 provides a control signal SW, which is a square wave signal with alternating high and low cycles, whose period may be adjusted according to the real applications. The control signal SW controls the analog switch.

For example, when the control signal is high, the analog switch is controlled to connect the low-frequency transmitting module; when the control signal is low, the analog switch selects the low-frequency receiving module. Thus, the low-frequency receiver coil and the low-frequency transmitter coil can share the same coil, saving space and product cost. The analog switch can be an SPDT or DPDT switch or any appropriate controllable switch.

To ensure the consistency among the RF card readers in mass production, a system for adjusting the deviation of the RF card readers may be established. The system detects and adjusts the deviation or errors of each RF card reader to ensure the consistency of each RF card reader, and to ensure the card transaction distance is controllable.

Figure 33:
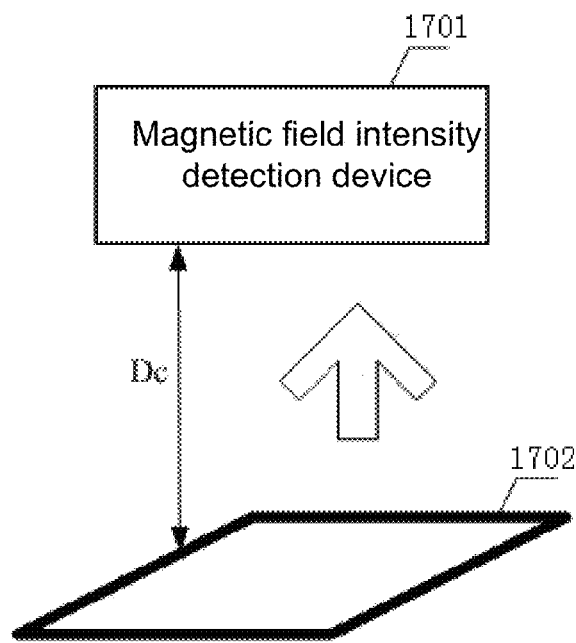
FIG. 33 illustrates an exemplary RF card reader error correction system.

FIG. 33 shows an exemplary RF card reader error correction system. The RF card reader error correction system includes RF card reader to be corrected 1702, and magnetic field intensity detection device 1701 positioned above the RF card reader to be corrected at a predetermined height Dc.

Based on the error correction system shown in FIG. 33, an RF card reader error correction process can include the following steps:

Step 1, setting the measurement target Hs and error range He of the magnetic field intensity detection device. Under the standard magnetic field intensity detection device, the error correction magnetic field intensity range of the correcting RF card reader is [Hs−He, Hs+He], where He<$\delta_R$, $\delta_R$ is the default error value, the smaller the He, the greater the system margin.

Step 2, during RF card reader testing, the RF card reader to be corrected is transmitting low-frequency magnetic field signal, the magnetic field intensity detection device determines the magnetic field intensity of the received low-frequency magnetic field signal, and adjust the transmitting adjustment circuit on the RF card reader to be corrected, such that the magnetic field intensity of the corrected RF card reader is within the error correction magnetic field intensity range of [Hs−He, Hs+He].

The error correction system may be a separate system, or may be within the low-frequency receiver module of the RF card reader, so as to realize the self-error-correction function of the RF card reader.

FIG. 29 shows an exemplary RF card reader, and the error correction method is described in the followings:

Step 10, set the radio frequency reader low frequency receiver module measuring error range goals Hs and He, the field intensity in the error correction low frequency range of the RF receiver module under the reader to [Hs−He, Hs+He], where He<$\delta_R$, the smaller the He, the greater the system margin. The low-frequency receiver module, as shown in FIG. 29, comprises sequentially connected the controller 1101, the demodulation circuit 1301, the low-frequency amplifying and filtering circuit 1302, and the receiver coil 1303. The principle for detecting the magnetic field intensity is to use the high voltage and low voltage ratio detected by the demodulation circuit to determine the corresponding field intensity.

Step 20, during RF card reader testing, the low-frequency transmitter coil of the RF card reader transmits low-frequency magnetic field signal, the low-frequency receiver module determines the magnetic field intensity of the received low-frequency magnetic field signal, and adjust the transmitting adjustment circuit on the RF card reader, such that the magnetic field intensity of the RF card reader is within the configured error correction magnetic field intensity range of [Hs−He, Hs+He].

The RF card reader can also detect whether there is interference RF device around the RF card reader and send alarms if there is. Specifically, the RF interfering device detection method can include the followings: when working with a legitimate RF card, searching whether there is any low-frequency signal or RF signal; performing decoding processing on the detected low-frequency signal or RF signal; determining whether the information carried in the low-frequency signal or RF signal contains only the identification code of the legitimate RF device. If yes, it indicates that there is no interfering RF device nearby, otherwise there is nearby interfering RF device. Further, the RF card reader can detect the signal strength of the received low-frequency signal or RF signal and, based on the signal strength of the received low-frequency signal or RF signal, determine the distance between itself and the interfering RF device. If the nearby interfering RF device is within the preset safe distance, an alarm can be sent out.

Further, according to the disclosed embodiments, a distance control method based on low-frequency alternating magnetic field may also be provided using the above RF card reader. The low-frequency-alternating-magnetic-field distance control method can include the following steps.

Step A, switching back and forth between a low-frequency transmitting state and a low-frequency receiving state. When in the transmitting state, the low-frequency transmitter module transmits the first low-frequency alternating magnetic field signal through the first low-frequency channel according to first transmission parameters. The first low-frequency alternating magnetic field signal carries a unique identifier IDr of the RF card reader. The first transmission parameters include the highest frequency f0 of the first low-frequency channel, encoding mode, modulation mode, and constant field intensity parameter. When being switched back to the receiving state, the low-frequency receiver module receives the second low-frequency alternating magnetic field signal from the RF card, the RF card is disposed within the mobile terminal.

The switching between the low-frequency transmitting state and the low-frequency receiving state can be performed at a preset time period.

In Step A, the frequency of the first low-frequency alternating magnetic field signal is equal to or less than the highest frequency f0 of the first low-frequency channel. The highest frequency f0 of the first low-frequency channel may be selected as followings.

The lower the low-frequency alternating magnetic field frequency, the smaller the attenuation difference after penetrating mobile terminals. Accordingly, from the frequency selection system, frequencies with sufficiently small difference can be selected to achieve distance control without calibration. Using a standard signal source, a standard transmitter coil transmits a low-frequency alternating magnetic field, the alternating magnetic field is received within various typical mobile terminals and obstacles. The transmission frequency is adjusted until the frequency f0 is found, so that the voltage received by the RF card causes the difference of the field intensity of different terminals and obstacles substantially within a preset fluctuation range $\delta_T$. This frequency and the frequency band lower than the frequency belong to the frequency band of the first low-frequency channel. If the frequency is higher than f0, the system may need to be calibrated. In general, the more frequency higher than the f0, the more terminals need to be calibrated, and the more complexity the calibration. The frequency selection may be performed one-time and, once selected, can be used without change.

In Step A, in addition to frequency, other predetermined transmission parameters of the first low-frequency alternating magnetic field signal can be selected as follows.

Step A1: selecting the field intensity constant mode (i.e., constant field intensity parameter), the field intensity constant mode includes peak field intensity constant amplitude and differential field intensity constant amplitude. Step A2 can be performed to select the peak field intensity constant amplitude, while Step A3 can be performed to select the differential field intensity constant amplitude, the deviation of the constant field intensity parameter is less that the preset deviation $\delta_R$.

Figure 30:
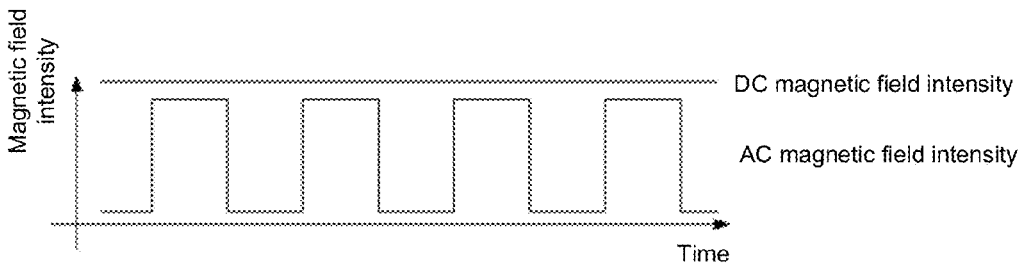
FIG. 30 illustrates typical forms of the DC and AC magnetic field with peak field intensity constant amplitude.

The typical form of the DC or AC magnetic field with peak field intensity constant amplitude is shown in FIG. 30, which may be a DC magnetic field or may be a square wave or sine wave magnetic field.

Figure 31:
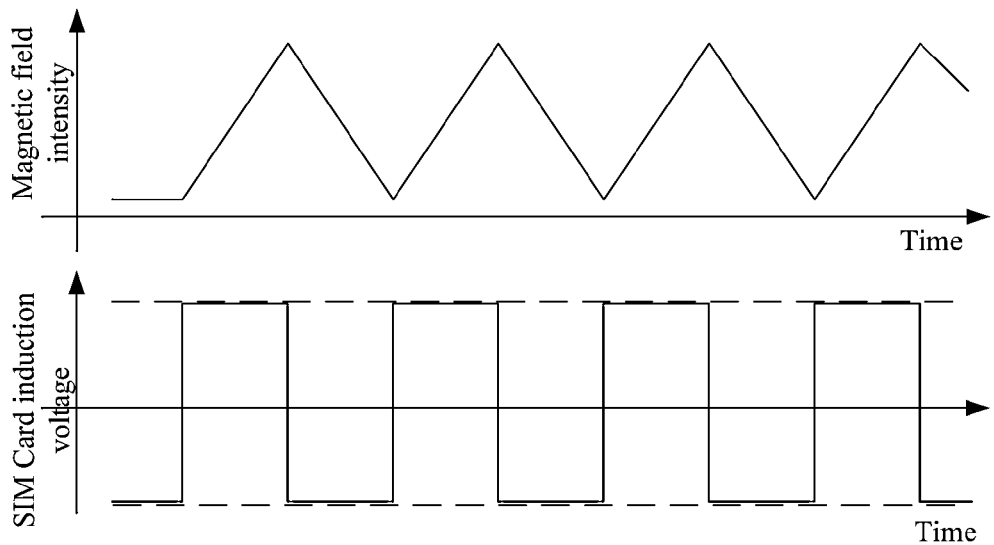
FIG. 31 illustrates a typical low-frequency AC magnetic field with differential field intensity constant amplitude.

A low-frequency AC magnetic field with differential field intensity constant amplitude is a low-frequency AC magnetic field with a constant maximum magnetic field change rate, and its typical form is shown in FIG. 31. As shown in FIG. 31, under the transmission condition of a typical triangular-wave magnetic field with differential field intensity constant amplitude, when the low-frequency magnetic induction device in the RF card uses coils, such as an SIM card coil, the induced voltage is a square wave form.

The constant field intensity transmitted by the RF card reader can be used as reference field intensity for distance detection. Because the low-frequency magnetic field changes with changing distances, the field intensity decays quickly and monotonously. Thus, the low-frequency field intensity, which changes with changing distances, around the RF card reader changes can be used to measure the distance. By precisely controlling the deviation $\delta_R$ of the transmission field intensity of each RF card reader, the precision for measuring distance using the RF card reader can be controlled. The typical $\delta_R$ is within the range of 4 dB, i.e., the $\delta_R$ is typically less than 4 dB.

Step A2: with peak field intensity constant amplitude, selecting encoding mode, modulation format, and the driving voltage waveform; determining the target value of the low-frequency magnetic field intensity, thereby selecting the magnitude of the driving voltage, the adjustment parameters, the low-frequency transmitter coil resistance, the number of turns of the low-frequency transmitter coil. Measuring the low-frequency magnetic field intensity under the selected parameters to determine whether the deviation from the target value of the low-frequency magnetic field intensity is within $\delta_R$. If yes, the selection of transmission parameters is complete. Otherwise, readjusting the parameters of the drive circuit and the low-frequency transmitter coil, until the deviation between the measured low-frequency magnetic field intensity and the target value of the low-frequency magnetic field intensity is within $\delta_R$.

Figure 32:
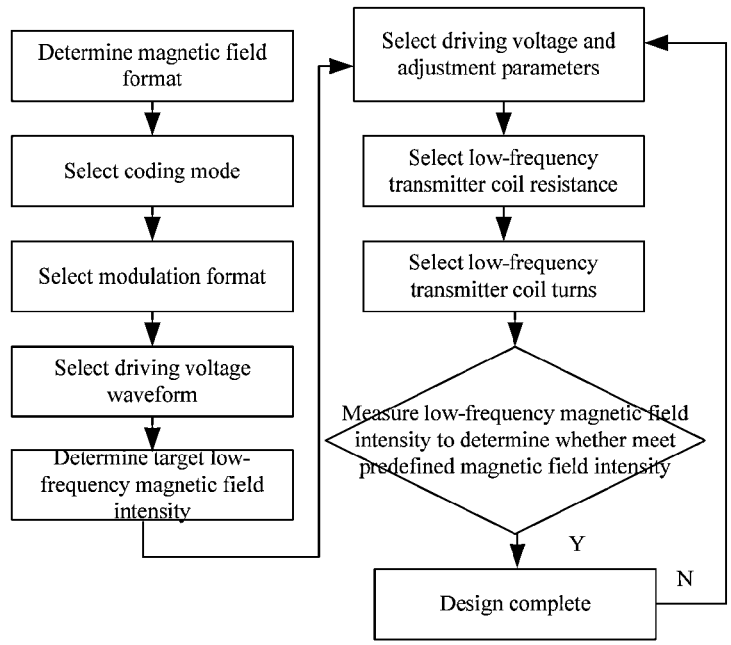
FIG. 32 illustrates a flowchart of a selection process for the transmission parameters.

The selection process for the transmission parameters is shown in FIG. 32. In Step A2, detailed selection can include the follows.

Encoding mode selection: under the condition of peak field intensity constant amplitude, no specific requirement is needed for encoding. The selection of encoding mode can be a one-time operation and no need to change during operation once selected.

Modulation mode selection: under the condition of peak field intensity constant amplitude, the modulation may be selected from constant envelope modulation schemes such as FSK and PSK, etc. The selection of modulation mode can be a one-time operation and no need to change during operation once selected.

Driving voltage waveform selection: under the condition of peak field intensity constant amplitude, the driving voltage waveform preferably is a square wave driving voltage waveform. The selection of driving voltage waveform can be a one-time operation and no need to change during operation once selected.

Target low-frequency magnetic field intensity selection: the target low-frequency magnetic field intensity can be determined based on specific RF card reader applications. If it is a medium-long distance application, higher magnetic field intensity may be required; if it is a close distance application, lower magnetic field intensity may be required.

Driving voltage amplitude selection: after selecting the target low-frequency magnetic field intensity, appropriate drive voltage amplitude can then be selected. The driving voltage amplitude can be more than 60% of the full amplitude of the output voltage of the drive circuit.

Adjustment parameters selection: the output voltage of the drive circuit or the resistance of the load can be adjusted, so that the low-frequency magnetic field matches the preconfigured field intensity value.

Transmitter coil parameters selection: the transmitter coil can be a wire coil or a PCB coil. The cross-sectional area of the low-frequency transmitter coil may be greater than that of a mobile terminal, such that the SIM card in any different mobile terminal can be placed with the low-frequency transmitter coil to ensure the stability and convenience of the card transactions. The area of the low-frequency transmitter coil (i.e., the area circulated by the coil) may be greater than 10 $cm^2$. For example, the cross-sectional area surrounded by the low-frequency transmitter coil may be greater than 10 $cm^2$.

Further, for the low-frequency transmitter coil, with the same amount of magnetic flux, the number of turns needed is inversely proportional with the driving voltage needed. The low-frequency transmitter coil can have more than 10 turns. For example, the low-frequency transmitter coil can have approximately 50 to 500 turns. The resistance of the low-frequency transmitter coil may be greater than 10 ohms and, further, the resistance of the low-frequency transmitter coil can be approximately 50 to 500 ohms.

After selecting the above parameters, the low-frequency magnetic field intensity is measured to determine whether its deviation from the target value of the low-frequency magnetic field intensity is within $\delta_R$. If yes, the selection of transmission parameters is complete. Otherwise, the parameters of the drive circuit and the low-frequency transmitter coil are readjusted.

Step A3: with the differential field intensity constant amplitude, selecting encoding mode, modulation format, and the driving voltage waveform; determining the target value of the low-frequency magnetic field intensity, thereby selecting the magnitude of the driving voltage, the adjustment parameters, the low-frequency transmitter coil resistance, the number of turns of the low-frequency transmitter coil. Measuring the low-frequency magnetic field intensity under the selected parameters to determine whether the deviation from the target value of the low-frequency magnetic field intensity is within $\delta_R$. If yes, the selection of transmission parameters is complete. Otherwise, readjusting the parameters of the drive circuit and the low-frequency transmitter coil, until the deviation between the measured low-frequency magnetic field intensity and the target value of the low-frequency magnetic field intensity is within $\delta_R$.

In Step A3, detailed selections can include the follows.

Encoding mode selection: under the condition of differential field intensity constant amplitude, the coding mode may be Manchester or NRZ, etc. The selection of encoding mode can be a one-time operation and no need to change during operation once selected.

Modulation mode selection: under the condition of differential field intensity constant amplitude, the modulation may be selected from constant envelope modulation schemes such as FSK and PSK, etc. The selection of modulation mode can be a one-time operation and no need to change during operation once selected.

Driving voltage waveform selection: under the condition of differential field intensity constant amplitude, the driving voltage waveform preferably is a triangular wave driving voltage waveform. The selection of driving voltage waveform can be a one-time operation and no need to change during operation once selected.

Other steps may be similar to those described in Step A2 under the condition of peak field intensity constant amplitude, and detailed descriptions are omitted.

Step B, parsing the second low-frequency alternating magnetic field signal to obtain the identification code IDr of the RF card reader and the identification code IDc of the RF card; comparing the IDr obtained from the second low-frequency alternating magnetic field signal and the IDr in the transmitted first low-frequency alternating magnetic field signal to determine whether they are the same. If yes, it can be determined that the RF card reader is within the predetermined distance range.

In Step B, the RF card reader receives the second low-frequency alternating magnetic analytical signal by the low-frequency receiver module. The receiving parameters of the low-frequency receiver in the RF card reader may include device selection of the magnetic induction circuit, the gain of the amplifier circuit and the bandwidth of the filter circuit, which may be determined as follows.

Step B1, under the selected operating frequency, modulation scheme, and coding mode of the RF card, first selecting the typical noise terminal and the magnetic detection and the amplification gain that are easy to achieve by the RF card reader.

Step B2, detecting inherent noise voltage amplitude Vn' of the detection voltage of the RF card reader when the mobile terminal is not sending the low-frequency alternating magnetic field signal.

Step B3, at the preset farthest communication distance Din+Dv, measuring the detection voltage Vr of the card reader, after amplifying and filtering, when individual typical mobile terminals and obstacles is sending the low-frequency alternating magnetic field signal using the selected modulation and coding mode and the selected transmission magnetic flux density; adjusting the parameters of the low-frequency magnetic induction circuit, low-frequency amplifier and filter circuit in the RF card reader, such that Vr/Vn'>SNR', where SNR' is the minimum signal-noise-ratio at which the RF card reader can perform decoding within the preset communication range. For example, the SNR' may be selected as SNR'=10.

The following examples illustrate the method for determining the number of turns of the low-frequency receiver coil, the gain of the low-frequency amplifier circuit, and the bandwidth of the filter circuit in the low-frequency receiver module of the RF card reader in the Step B.

Step B11, with predetermined area of the low-frequency receiver coil, selecting the number of turns in the coil. The RF card transmits a magnetic field signal with a fixed field intensity and at a fixed distance, and the corresponding low-frequency receiving signal-to-noise-ratio of the RF card reader is measured, so that the signal-to-noise-ratio is greater than SNR'. The test system configuration may refer to FIG. 2.

Step B12, in the test system configuration shown in FIG. 2, introducing a noise source, especially an acoustic noise source. The noise has constant amplitude. The gain of the amplifier circuit, and the bandwidth of the filter circuit is selected such that the receiving signal-to-noise-ratio of the RF card reader is greater than SNR'.

After determining that the RF card reader is within a preset distance range, the RF card reader can use a combination address (IDr, IDc) as the RF communication address and channel parameters of the RF communication, and conduct card transactions with the mobile terminal over the RF channel until the completion of the transaction. At the same time, the low-frequency transmitter module of the RF card reader continuously transmits low-frequency alternating magnetic field signals with preconfigured transmission parameters.

The frequency range of the first low-frequency alternating magnetic field signal can be approximately 0-100 KHz and, further, the frequency range of the first low-frequency alternating magnetic field signal can be approximately 0-10 KHz. The frequency range of the second low-frequency alternating magnetic field signal can be approximately 0-100 KHz and, further, the frequency range of the second low-frequency alternating magnetic field signal can be approximately 10-50 KHZ.

Embodiment Four

According to the disclosed embodiments, as used herein, a terminal refers a terminal equipped with a second RF device, such as a mobile terminal; and a distance refers the distance between a first RF device and the second RF device, i.e., the distance between the first RF device and the terminal equipped with the second RF device.

In certain embodiments, with respect to the distance control problems for performing card transactions between the second RF device (especially the RF card inside the terminal, such as an RF SIM card) and the first RF device, there provides a communication system including a first RF device capable of transmitting and receiving low-frequency alternating magnetic field signals and transmitting and receiving RF signals, and a corresponding second RF device capable of transmitting and receiving low-frequency alternating magnetic field signals and transmitting and receiving RF signals. Communication methods of the communication system are also provided. According to the disclosed embodiments, low-frequency alternating magnetic field signal can penetrate different terminals with small signal attenuation difference, and the current can be provided by the second RF device limited. Without affecting the operation of the mobile terminal, the feature that the low-frequency two-way communication distance is limited can be used for two-way distance control and limit, while high-frequency RF can effectively penetrate the terminal to complete the high-speed tow-way communication for transactions.

According to the disclosed embodiments, detections of low-frequency alternating magnetic field signals from the first RF device to the mobile terminal (equipped with the second RF device) and of low-frequency alternating magnetic field signals from the mobile terminal to the first RF device can be used to achieve two-way distance control. More specifically, the first RF device transmits the first low-frequency alternating magnetic field signal in accordance with first preset transmission parameters through the first low-frequency channel. The frequency of the first low-frequency alternating magnetic field signal is f. The second RF device detects the magnetic field signal at each distance point and amplifies the signal into an electrical signal (e.g., a voltage signal or current signal) with constant amplitude corresponding to the distance. Further, a preconfigured threshold value is used to determine whether the mobile terminal enters into a predetermined valid card transaction range (also called effective distance range, i.e., the range allowing card transactions). The preconfigured first threshold value is the same for all mobile terminals, without the need for calibration. When the mobile terminal enters into a valid card transaction range, the second RF device transmits second low-frequency alternating magnetic field signal at a preset frequency f' according to the second transmission parameters and through the second low-frequency channel. Only after the first RF device correctly parses the second low-frequency alternating magnetic field signal and determines that the second RF device is legitimate, RF communication and card transaction can begin. Thus, the two-way low-frequency control can be achieved, as well as two-way distance control and limiting. Thus, the first RF device and the second RF device can be uniquely bond together by combining the low-frequency two-way communication and two-way RF communication and, after the binding, two-way high-speed communication with large data can be completed via the RF channel. Thus, the data communication distance (i.e., transaction distance) between the terminal having the second RF device (e.g., a mobile phone with an RF SIM card) and the first RF device can be effectively controlled within a preset distance range, and no calibration is needed for the terminals.

The disclosed communication methods may be applicable on any communication system including at least a first RF device and the at least one second RF device. The communication method may comprise Steps a4, Step b4, Step c4, Step d4, and Step e4 (Note: the step numbers are used only for convenience, do not have any particular meaning or indicate any particular order of the steps), which are described in the followings.

Step a4, the first RF device transmits a first low-frequency alternating magnetic field signal.

Specifically, the first RF device transmits a first low-frequency alternating magnetic field signal through a first low-frequency channel based on first preset transmission parameters. The first low-frequency alternating magnetic field signal can carry identification information of the first RF device. The first transmission parameters may include the frequency of the first low-frequency alternating magnetic field signal, and the frequency is equal to or less than the maximum operating frequency f0 of the first low-frequency channel in the system.

The identification information may be the identification code ID.

Figure 35:
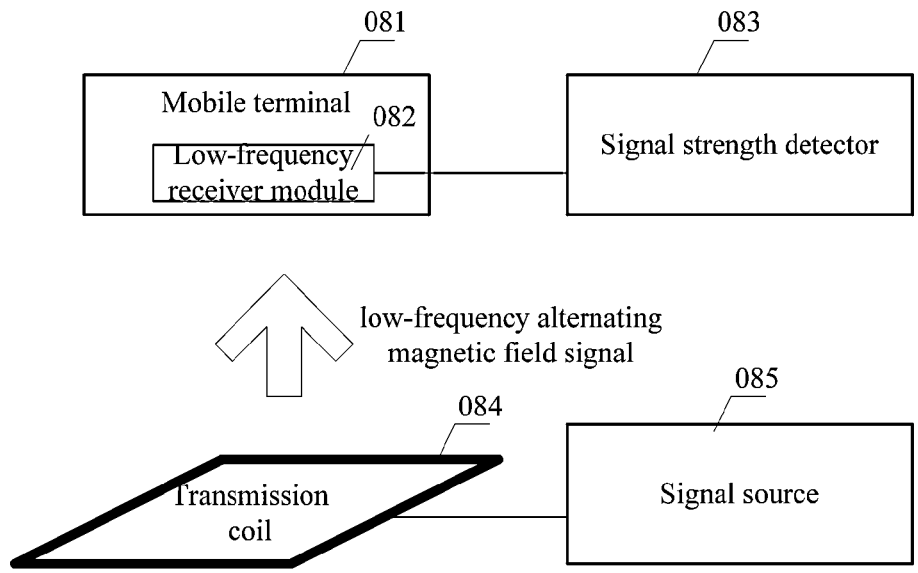
FIG. 35 illustrates a structural block diagram of a selection system for selecting the maximum operating frequency f0 of the first low-frequency channel.

The lower the low-frequency alternating magnetic field frequency, the smaller the attenuation difference after penetrating mobile terminals. Accordingly, from the frequency selection system (as shown in FIG. 35), frequencies with sufficiently small difference can be selected to achieve distance control without calibration. Using a standard signal source, a standard magnetic transmitter coil transmits a low-frequency alternating magnetic field signal. The second RF device inside the typical terminal and obstacle receives the low-frequency alternating magnetic field signal, adjust the transmission frequency until finding the frequency f0, so that the voltage received by the first RF device (this voltage is the voltage signal with a constant amplitude corresponding to the distance from amplifying the low frequency alternating magnetic field signal) causes the difference of the field intensity coming out from different terminals and obstacles, having the same distance to the center point of the transmitter coil plane, substantially within a preset fluctuation range $\delta_T$. The frequency f0 and the frequency band lower than the frequency f0 belong to the frequency band of the first low-frequency channel communication mode, and no calibration is needed for any terminal at that system. If the operating frequency (i.e., the frequency of the first low-frequency alternating magnetic field signal) is higher than f0, the system may need to be calibrated. In general, the more operating frequency higher than the f0, the more terminals need to be calibrated, and the more complexity of the calibration. The frequency selection may be performed one-time and, once selected, can be used without change.

FIG. 35 is a structural block diagram of a selection system for selecting the maximum operating frequency f0 of the first low-frequency channel. As shown in FIG. 35, in one embodiment, the selection system for the first low-frequency channel maximum operating frequency f0 comprises: a transmission system containing a signal source 085 and a low-frequency magnetic field transmitter coil 084, a receiving system containing a typical mobile terminal 081 and obstacles, and a signal strength detector 083 (a voltmeter, an oscilloscope, a spectrometer, etc.). A low-frequency receiver module 082 is disposed inside the mobile terminal 081. The signal source 085 may produce a variety of precise frequency, waveform and amplitude signals. The principle of selecting the frequency includes: the signal source 085 generates a sine wave signal with fixed amplitude and of frequency f, which is transmitted by the transmitter coil 084. The low-frequency receiver module 082 is disposed inside the selected typical mobile terminal 081 or obstacle, and passes the received low-frequency signal to the signal strength detector 083 via a dedicated signal line, and the signal strength detector 083 measures the received voltage. By changing the distance of the mobile terminal, the curve of the detection voltage changes with the distance can be obtained, i.e., the voltage-distance curves for the mobile terminal or obstacle at the frequency f. The mobile terminal and obstacles can be changed to obtain curves of different mobile terminals, and the frequency f can also be changed to obtain different curves.

When the frequency f of the first low-frequency alternating magnetic field signal is less than frequency f0, different mobile terminals having the second RF device are within the valid communication distance range, and no calibration is needed. Further, the maximum operating frequency f0 of the system's first low-frequency channel can be determined by the following steps.

Step 401, determining the system distance control target (Din, Dv) based on the first low-frequency alternating magnetic field signal, where Din means that all terminals (with the second RF device) within the range of 0-Din are ensured for card transaction, and Dv denotes the distance fluctuation range. If the distance is within Din~(Din+Dv), card transactions are allowed and, if the distance is greater than Din+Dv, card transactions are not allowed.

For example, (5 cm, 5 cm) means that all terminals within 5 cm are ensured for card transactions, all terminals within 5 cm~10 cm are allowed card transactions, and all terminals beyond 10 cm are not allowed card transactions. The distance control target may be determined by specific applications, and (0~Din+Dv) is called distance control range.

Step 402, determining the fluctuation range $\delta_R$ of the detection voltage in the second RF device that is caused by the first RF device.

That is, the fluctuation on the parameters of the low-frequency transmitter circuit in the First RF device causes the fluctuation of the transmission field intensity, causing the fluctuation of the detection voltage in the second RF device. The parameters include transmission drive voltage fluctuation, coil parameter fluctuations, temperature impact, and so on. The fluctuation range $\delta_R$ may be controlled by the card reader design and production processes. Because the working frequency of the low-frequency transmitter circuit is substantially low, the fluctuation range $\delta_R$ can be controlled desiredly, such as less than 4 dB.

Step 403, determining the fluctuation range $\delta_C$ of the detection voltage caused by the second RF device itself.

That is, the fluctuation of the final detection voltage output caused by the fluctuation on the parameters of the low-frequency receiver circuit in the second RF device. The parameters include the receiving antenna deviation, amplifier gain deviation, filter deviation, comparator or AD deviation, temperature deviation, and noise, etc. The fluctuation range $\delta_C$ may be controlled by the RF card design and production processes. Because the operating frequency of the RF card low-frequency transmission circuit is substantially low, the fluctuation range $\delta_C$ can be controlled desiredly, such as less than 4 dB.

Step 404, determining the voltage-distance curve of various typical terminals and obstacles at the frequency f.

Before the Step 404, certain preparation work needs to be performed, i.e., selecting typical terminals and typical obstacles. Selection of typical terminals is primarily based on the amount of metal or conductive structures of a terminal. The more metal included, the more the attenuation. For example, typical terminals can be selected as terminals with plastic housing, with metal housing, with a thick metal shell, with a thin metal shell, with a large size, and with a small size, etc. The number of typical terminals is not limited, as long as the selected typical terminals substantially cover the attenuation characteristics of the low-frequency alternating magnetic field signal caused by terminals.

To avoid extraordinary deviation from any particular mobile terminal, the type of the mobile terminal may need to be confirmed in applications. Each type of mobile terminal for transaction applications may be tested to determine the attenuation characteristics of the type of mobile terminal. Typical obstacles may be selected as standard shapes with different materials, such as plastic, aluminum, copper, iron, stainless steel, and other common materials used in mobile terminals. The typical obstacles are placed between the first RF device and the second RF device as an equivalent obstacle of mobile terminal attenuation characteristics for measuring attenuation effect.

Step 405, based on the distance control target (Din, Dv), determining fluctuation range $\delta_A$ of the detection voltage by the second RF device. The range $\delta_A$ equals to the difference between the voltage corresponding to the point Din on the voltage-distance curve with average field intensity attenuation curve slope and obtained from the voltage-distance curves of various typical terminals and obstacles and the voltage corresponding to the point (Din+Dv).

Figure 36:
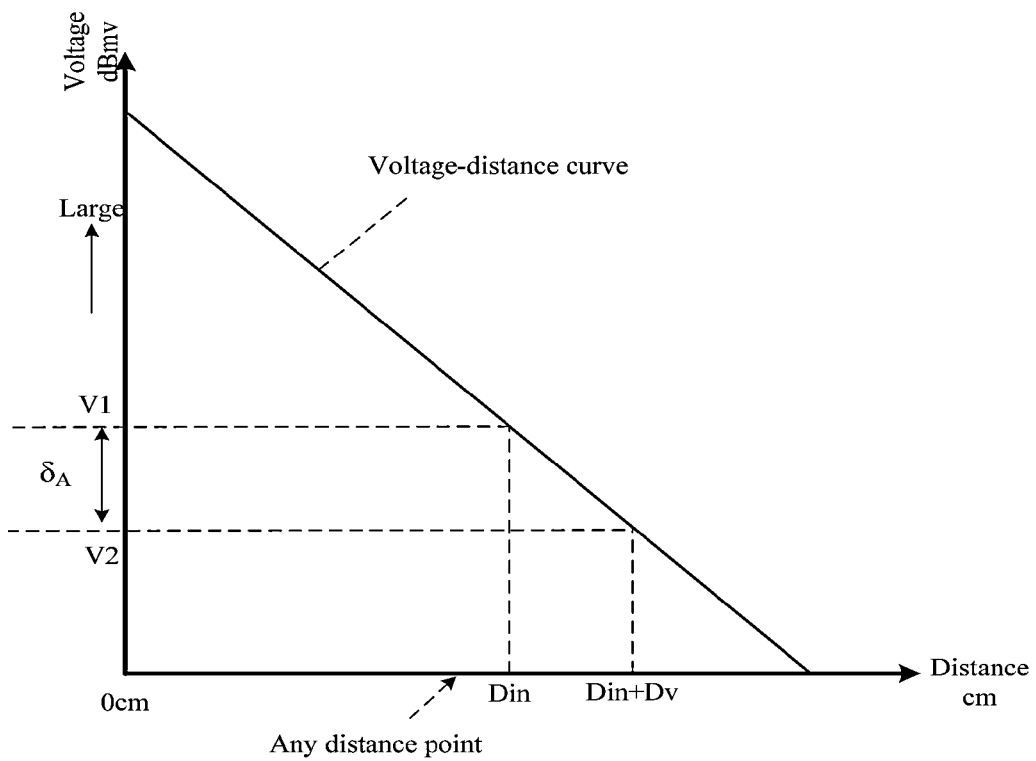
FIG. 36 illustrates the total received detection voltage fluctuation range $\delta_A$ determined by the distance control target (Din, Dv)

FIG. 36 illustrates the total received detection voltage fluctuation range $\delta_A$ determined by the distance control target (Din, Dv). As shown in FIG. 36, the point Din corresponds to voltage value V1, and the point (Din+Dv) corresponds to the voltage value V2, and $\delta_A$=V1-V2.

Step 406, determining the fluctuation range $\delta_T$ of the detection voltage of the second RF device caused by the mobile terminal. The parameter $\delta_T$ represents the fluctuation range of the detection voltage of the second RF device caused by the attenuation characteristics of the terminal, $\delta_T=\delta_A-\delta_R-\delta_C$.

Figure 37:
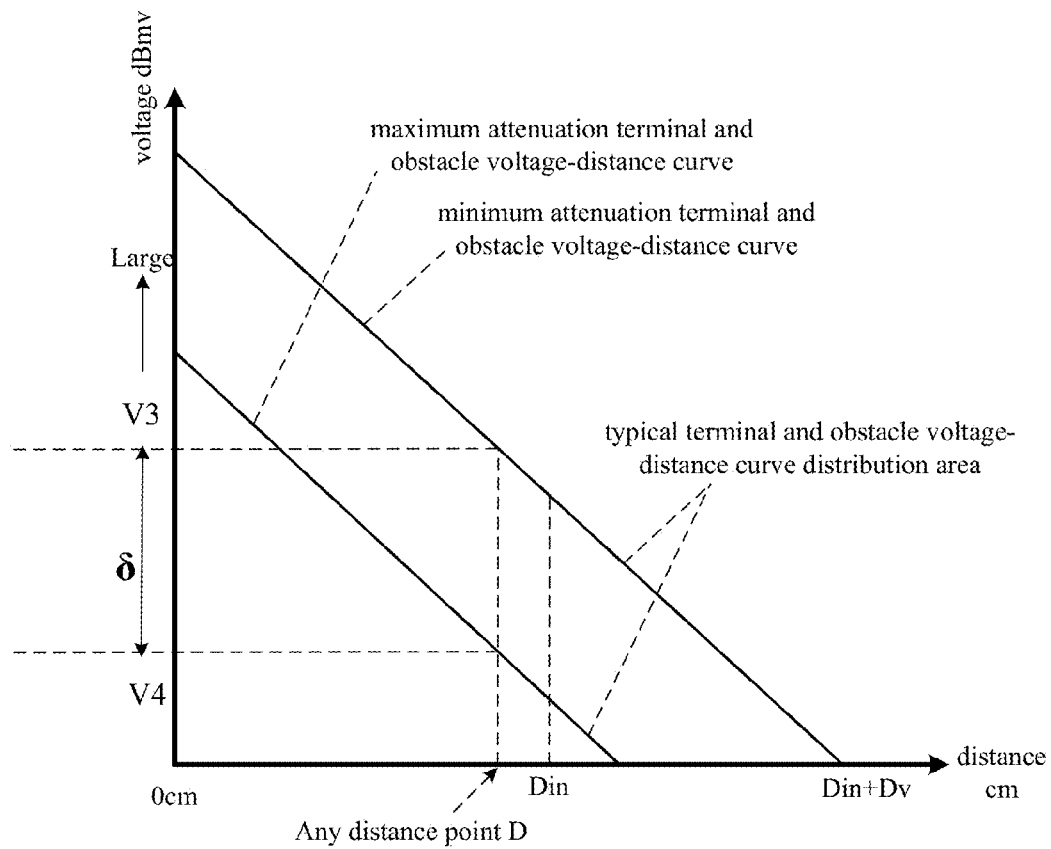
FIG. 37 illustrates voltage-distance curves and fluctuation range $\delta$ of a typical terminal and obstacle.

FIG. 37 illustrates a voltage-distance curves and fluctuation range $\delta$ of a typical terminal and obstacle. As shown in FIG. 37, the voltage-distance curve corresponding to the maximum attenuation terminal and obstacle is called the maximum attenuation curve, and voltage-distance curve corresponding to the minimum attenuation terminal and obstacle is called the minimum attenuation curve. The area surrounded by the maximum attenuation curve and the minimum attenuation curve is called the voltage-distance curve distribution area of the typical terminal and obstacle. Provided that the voltage corresponding to any D on the minimum attenuation curve is V3, and the voltage corresponding to any D on the maximum attenuation curve is V4, then $\delta$=V3-V4.

Step 407, calculating the maximum field intensity difference $\delta$ (also called the fluctuation range) at various distances with the distance control range of various typical terminals and obstacles. If $\delta$ is greater than $\delta_T$, the frequency f is decreased and the method goes to Step 404. If $\delta$ is less than $\delta_T$, the frequency f is increased and the method goes to Step 404. Further, if $\delta$ is equal to $\delta_T$, the current frequency f is equal to the frequency f0.

Thus, in the case of limited distance control target, the maximum operating frequency f0 of the system's first low-frequency channel can be determined. The first low-frequency channel may use a modulation mode, or may use another mode to directly transmit baseband signal mode. In operation, when the maximum main frequency component of the system is no greater than the frequency f0, and the distance control does not need to be calibrated.

Figure 38:
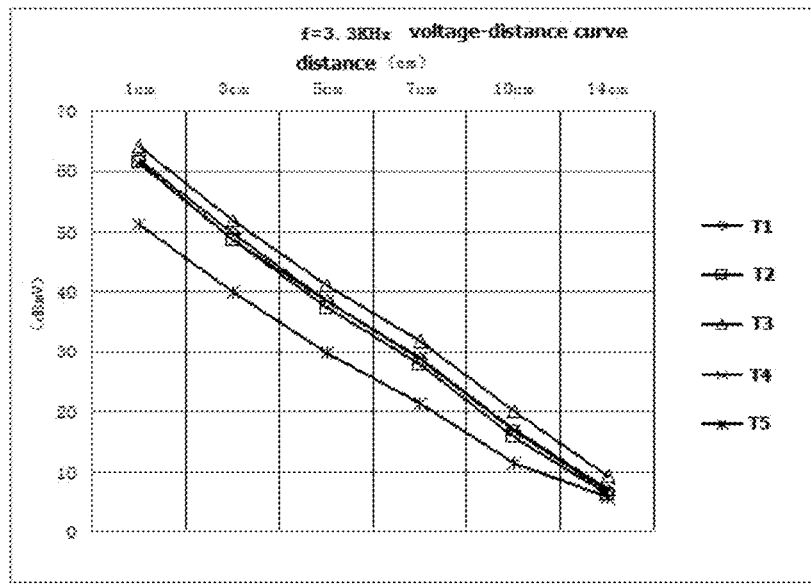
FIG. 38 illustrates five voltage-distance curves of five typical mobile terminals at frequency f of 3.3 KHz.

An example is used to illustrate the process of determining frequency f0. FIG. 38 shows 5 voltage-distance curves of 5 typical mobile terminals at frequency f of 3.3 KHz. As shown in FIG. 38, the system distance control target is (5 cm, 5 cm), the voltage fluctuation range of the system range at range 0~10 cm is about 40 dB, and the fluctuation of the detection voltage in the second RF device caused by the First RF device and the second RF device is both 4 dB, i.e., $\delta_R=\delta_C=4$ dB, $\delta_A=20$ dB, $\delta_T=\delta_A-\delta_R-\delta_C=12$ dB. Assuming the 5 terminals can be used to represent all terminals used in the system, the maximum fluctuation at each distance of the curves is approximately 12 dB. Thus, the maximum frequency f0 of the system's first low-frequency channel may be determined as f0=3.3 KHz.

Figure 39:
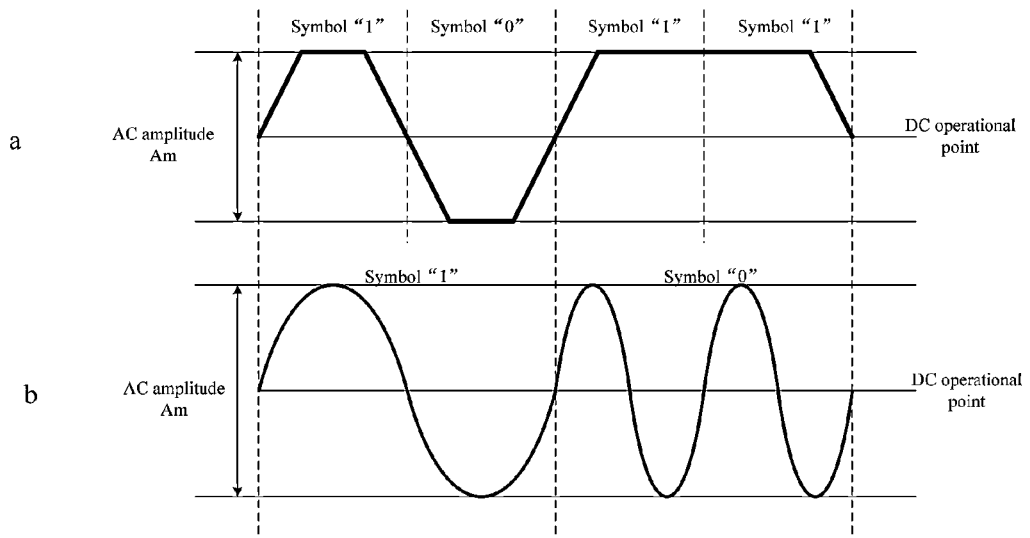
FIG. 39 illustrates a detection voltage signal detected by the second RF device for directly-transmitted baseband signal without modulation and the voltage waveform diagram of the detected voltage signal for a sine-wave FSK modulation.

Further, the first transmission parameters can also include modulation mode, coding mode, and transmission magnetic flux density Br. The first transmission parameters are selected to ensure that the signal detected and amplified by the second RF device from the first low-frequency alternating magnetic field signal transmitted by the first RF device at various distances is a voltage signal with constant amplitude and corresponding to the distance. FIG. 39 illustrates detection voltage signal detected by the second device for directly-transmitted baseband signal without modulation and the voltage waveform diagram of the detected voltage signal for a sine-wave FSK modulation. In FIG. 39, 39(*a*) is the voltage waveform diagram of the received voltage signal for directly-transmitted baseband signal without modulation, and 39(*b*) a voltage waveform diagram of the received voltage signal for a sine-wave FSK modulation. As shown in FIG. 39, the detection voltage signal is a variable voltage signal containing demodulation information. The signal may be an AC voltage signal without any DC component, or may be a voltage signal having a DC component. The constant amplitude means that the maximum amplitude of the AC component in different transmission symbols keeps constant The modulation mode, coding mode, and transmission magnetic flux density Br of the first transmission parameters may be selected through the following Step a41 to Step a43.

Step a41, selecting any coding mode without an average DC component, such as Manchester, Differential Manchester, NRZ, etc.

Step a42, selecting no modulation or a carrier modulation mode without amplitude change. The carrier modulation mode can use any modulation method without amplitude change. For example, the carrier wave may be a sine wave carrier, a pulse carrier, or a triangle wave carrier, etc. The modulation may be on-off keying (OOK), phase shift keying or frequency shift keying (FSK), etc. In the no-modulation mode, the encoded baseband signal is directly driven by the driver circuit and transmitted by the transmitter coil.

Step a43, selecting the transmission magnetic flux density Br. Specifically, under a selected operating frequency that is less than f0, a selected modulation scheme and a selected coding mode, first selecting the typical mobile terminal and the magnetic detection and the amplification gain that are easy to achieve by the second RF device inside the mobile terminal, then detecting inherent noise voltage amplitude Vn of the detection voltage of the second RF device when the first RF device is not sending the low-frequency alternating magnetic field signal. Further, detecting the detection voltage Vc of the second RF device when the first RF device is sending the low-frequency alternating magnetic field signal using the selected modulation and coding scheme, and selecting the transmission magnetic flux density Br such that such that Vc/Vn>SNR, where SNR is the signal-to-noise-ratio of the second RF device. In general SNR value may be selected as large as possible, as not to cause the transmission power of the second RF device to be too high. For example, the SNR may be selected as SNR=10. After the SNR is determined, Br is also determined as described above.

Step b4, the second RF device detects the first low-frequency alternating magnetic field signal.

More specifically, the second RF device receives and detects the first low-frequency alternating magnetic field signal sent by the first RF device at each distance through the first low-frequency channel, and amplifies the first low-frequency alternating magnetic field signal into an electrical signal corresponding to the distance and with constant amplitude. Further, based on a preset threshold value, it can be determined whether the terminal with the second RF device enters into the effective card transaction range. The threshold value may be set the same for all terminals with the second RF device.

If the first low-frequency alternating magnetic field signal is amplified into a voltage signal corresponding to the distance and with constant amplitude, the corresponding threshold value is a voltage threshold value. The preset voltage threshold Vt can be set through the following Step 601 to Step 603.

Step 601, under the selected transmission parameters, measuring the voltage-distance curve obtained from various typical terminals and obstacles. The transmission parameters include frequency of the low-frequency alternating magnetic field signal, modulation mode, coding mode, and transmission magnetic flux density Br, etc.

Figure 40:
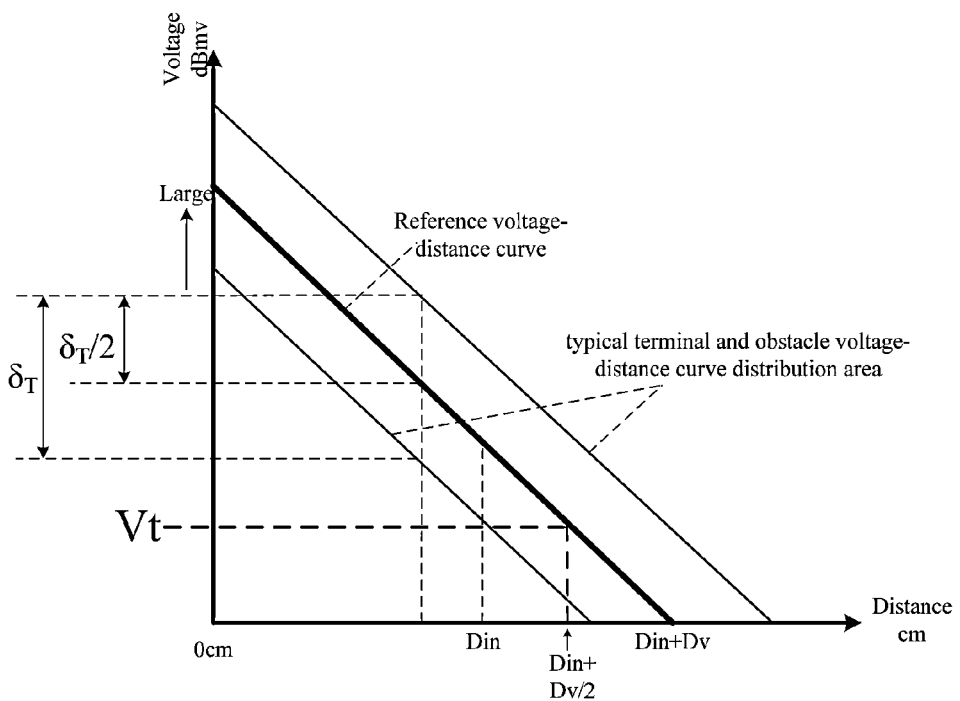
FIG. 40 illustrates a calculation method of a reference voltage-distance curve under the first low-frequency channel communication mode.

Step 602, obtaining a reference voltage-distance curve, the reference voltage-distance curve is the middle value of the curves of the typical terminals and obstacles, the voltage magnitude from the upper boundary and the lower boundary of the curves the typical terminals and obstacles is $\delta_T/2$, as shown in FIG. 40.

Step 603, selecting the threshold value Vt of the detection voltage of the second RF device: the voltage value at the point (Din+Dv/2) on the reference voltage-distance curve is Vt.

When the voltage signal corresponding to the received first low-frequency alternating magnetic field signal is greater than or equal to the preset voltage threshold Vt, it can be determined that the terminal equipped with the second RF device enters the effective card transaction range.

Step c4, the second RF device transmits a second low-frequency alternating magnetic field signal.

Specifically, if the voltage signal corresponding to the received first low-frequency alternating magnetic field signal is greater than or equal to the preset voltage threshold Vt, the terminal with the second RF device enters the effective card transaction range, the second RF device obtains the identification information of the first RF device from the received first low-frequency alternating magnetic field signal and, based on the second transmission parameters, transmits the second low-frequency alternating magnetic field signal through the second low-frequency channel. The second low-frequency alternating magnetic field signal carries the identification information of the first RF device obtained by the second RF device, and the identification information of the second RF device itself. The second transmission parameters include the frequency of the second low-frequency alternating magnetic field signal. This frequency is equal to or less than the maximum operating frequency f0' of the system's second low-frequency channel, and f0' is the maximum operating frequency satisfying the target communication distance of Din~Din+Dv'.

Before selecting the communication frequency f' of the second low-frequency channel, it needs to determine that, under the second low-frequency channel communication mode, the change patterns of the voltage-distance curves of all the typical terminal and obstacles detected by the first RF device, and the change patterns of voltage with respect to change of the frequency.

Figure 41:
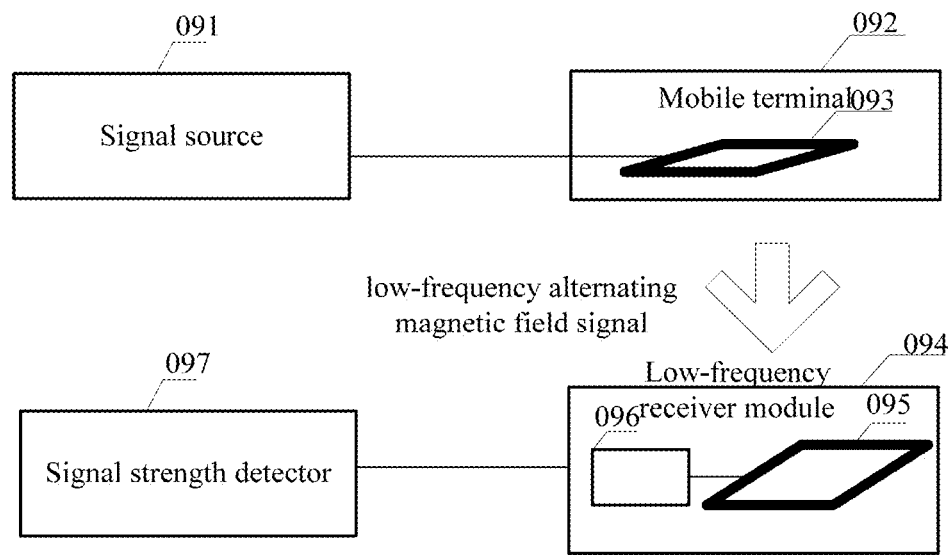
FIG. 41 illustrates a block diagram of a system for detecting the voltage-distance curves under the second low-frequency channel communication mode.

FIG. 41 is a block diagram of a system for detecting the voltage-distance curves under the second low-frequency channel communication mode. As shown in FIG. 41, the selection system comprises: a transmission system containing a signal source 091 and various typical mobile terminals 092 (including transmitter coil 093 and various obstacles), a receiving system containing low-frequency receiving module 094 (including low-frequency receiver coil 095 and low-frequency receiving circuit 096), and a signal strength detector 097 (a voltmeter, an oscilloscope, a spectrometer, etc.).

The principle of detecting voltage and distance curve (voltage-distance curve) includes: the signal source 091 generates a sine wave signal with a fixed amplitude and of frequency f', which is transmitted by the transmitter coil 093 in the mobile terminal 092, and the signal passes through or is diffracted through the typical mobile terminal and obstacles. The low-frequency receiver module 094 converts the received low-frequency signal and passes the signal to the signal strength detector 097 through a dedicated signal line, and the signal strength detector 097 detects the received voltage. By changing the distance of the mobile terminal, the low-frequency receiving module receives corresponding signals from the mobile terminal and obstacles, and the curve of the detection voltage changes with the distance can be obtained, i.e., the voltage-distance curve, under the frequency f'. The mobile terminal and obstacles can be changed to obtain curves of different mobile terminals, and the frequency f' can also be changed to obtain different curves.

Figure 42:
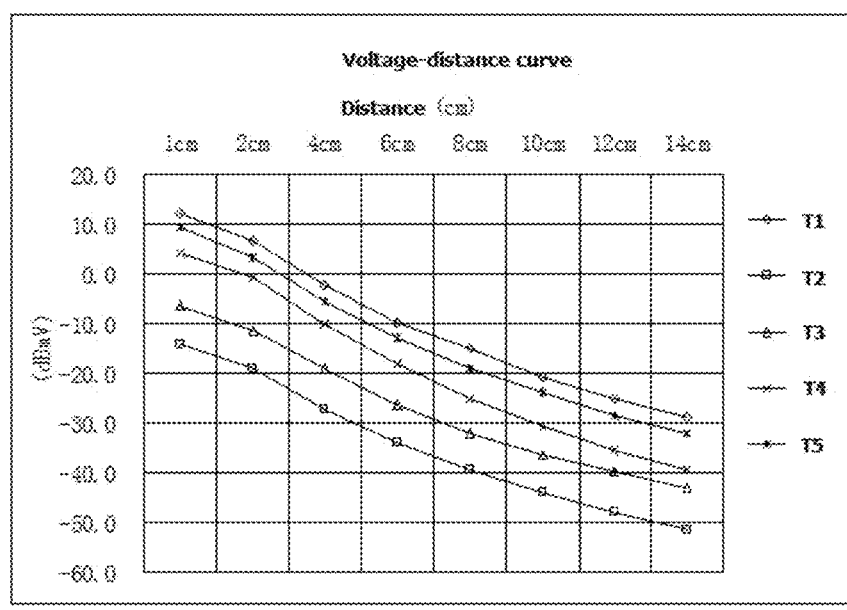
FIG. 42 illustrates the voltage-distance curves detected by the system in FIG. 41.

FIG. 42 shows the voltage-distance curves detected by the system in FIG. 41. As shown in FIG. 42, under the second low-frequency channel communication mode, the voltage-distance curves have similar patterns to those under the first low-frequency channel communication mode, the voltage detected by the first RF device decreases monotonically with the distance.

When the frequency of the second low-frequency magnetic field signal is less than or equal to the frequency f0', different mobile terminals equipped with the second RF device are within the valid communication distance range, and no calibration is needed. The maximum operating frequency f0' of the second low-frequency channel can determine by the following steps.

Step 701, determining the system distance control target (Din, Dv') based on the second low-frequency alternating magnetic field signal, where Din means that all terminals (with the second RF device) within the range of 0-Din are ensured for card transaction, and Dv' denotes the distance fluctuation range of the second low-frequency channel. If the distance is within Din~(Din+Dv'), card transactions are allowed and, if the distance is greater than Din+Dv, card transactions are not allowed.

Step 702, determining the fluctuation range $\delta_R'$ of the detection voltage in the first RF device that is caused by the second RF device.

Step 703, determining the fluctuation range $\delta_C'$ of the detection voltage caused by the first RF device itself.

Step 704, determining the voltage-distance curves of various typical terminals and obstacles at the frequency f'.

Step 705, based on the distance control target (Din, Dv'), determining fluctuation range $\delta_A'$ of the detection voltage by the first RF device. The range $\delta_A'$ equals to the difference between the voltage corresponding to the point Din on the voltage-distance curve with average field intensity attenuation curve slope and obtained from the voltage-distance curves of various typical terminals and obstacles and the voltage corresponding to the point (Din+Dv').

Figure 43:
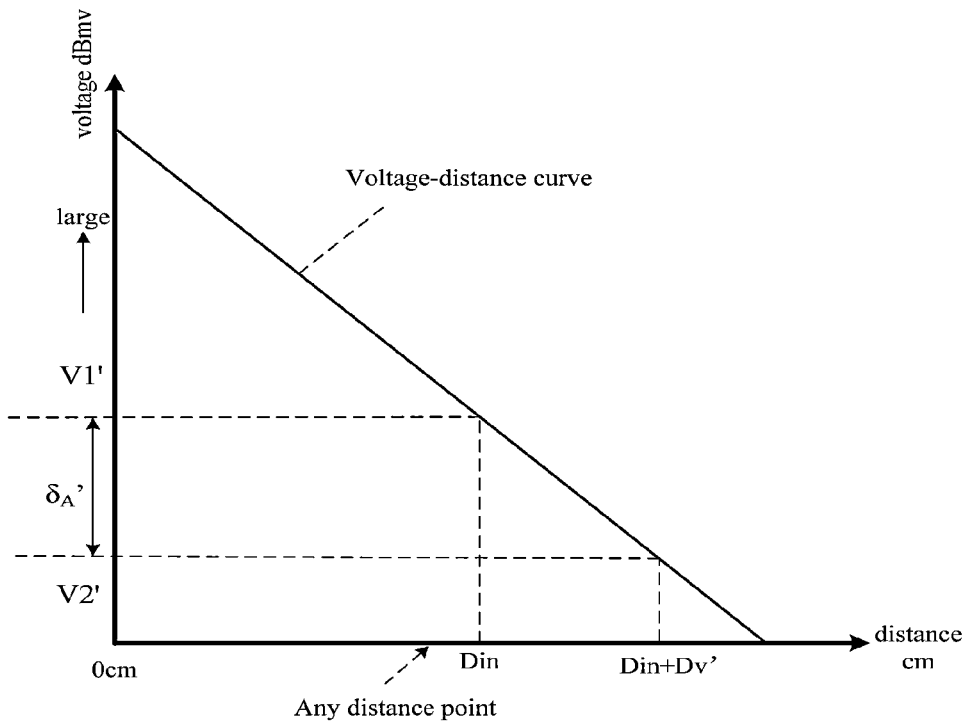
FIG. 43 illustrates a corresponding relationship between the total distance fluctuation range of the system and the total received detection voltage fluctuation range of the first RF device under the second low-frequency channel communication mode.
Figure 44:
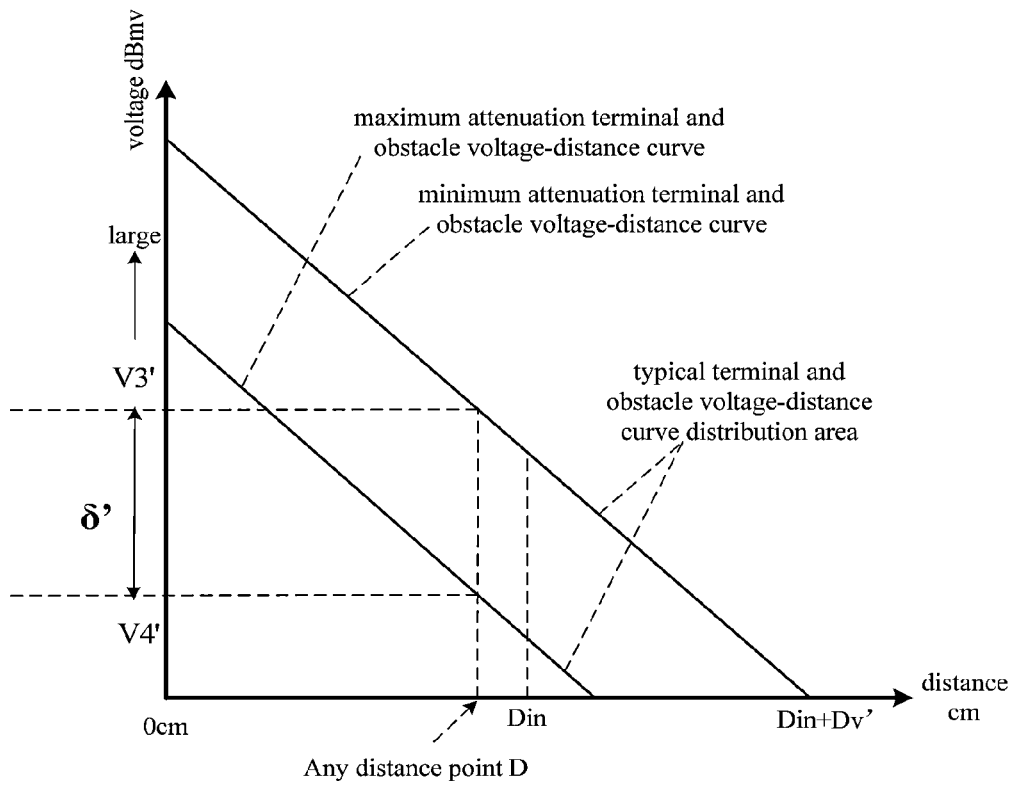
FIG. 44 illustrates a voltage-distance curves and fluctuation range δ' of a typical terminal and obstacle under the second low-frequency channel communication mode.

FIG. 43 illustrates the total received detection voltage fluctuation range $\delta_A'$ determined by the distance control target (Din, Dv) for the second low-frequency channel. As shown in FIG. 44, the point Din corresponds to voltage value VP, and the point (Din+Dv') corresponds to the voltage value V2', and $\delta_A' = V1' - V2'$.

Step 706, determining the fluctuation range $\delta_T'$ of the detection voltage of the second RF device caused by the mobile terminal. The parameter $\delta_T'$ represents the fluctuation range of the detection voltage of the second RF device caused by the attenuation characteristics of the terminal, $\delta_T' = \delta_A' - \delta_R' - \delta_C'$.

FIG. 44 illustrates a voltage-distance curves and fluctuation range $\delta'$ of a typical terminal and obstacle for the second low-frequency channel. As shown in FIG. 44, the voltage-distance curve corresponding to the maximum attenuation terminal and obstacle is called the maximum attenuation curve, and voltage-distance curve corresponding to the minimum attenuation terminal and obstacle is called the minimum attenuation curve. The area surrounded by the maximum attenuation curve and the minimum attenuation curve is called the voltage-distance curve distribution area of the typical terminal and obstacle. Provided that the voltage corresponding to any D on the minimum attenuation curve is V3', and the voltage corresponding to any D on the maximum attenuation curve is V4', then $\delta' = V3' - V4'$.

Step 707, calculating the maximum field intensity difference $\delta'$ at various distances with the distance control range of various typical terminals and obstacles. If $\delta'$ is greater than $\delta_A'$, the frequency f' is decreased and the method goes to Step 704. If $\delta'$ is less than $\delta_T'$, the frequency f' is increased and the method goes to Step 704. Further, if $\delta'$ is equal to $\delta_A'$, the current frequency f' is equal to the frequency f0'.

Thus, the maximum value f0' of the communication frequency f' of the system's second low-frequency channel can be determined. Within the frequency range of less than the maximum value f0', it can be ensured that the communication distance range of the second low-frequency channel is within the range of Din~Din+Dv'.

In one embodiment, the selection of the communication frequency f' of the second low-frequency channel may also need to take into consideration of the interference of environmental noise, especially audio noise.

Further, the second transmission parameters of the second RF device also include the low-frequency coding mode, modulation mode, and low-frequency transmission magnetic flux density Bc. The transmission parameters may be determined through the following steps.

Step c41, selecting any coding mode without an average DC component, such as Manchester, Differential Manchester, NRZ, etc.

Step c42, selecting no modulation or a carrier modulation mode without amplitude change. The carrier modulation mode can use any modulation method without amplitude change. For example, the carrier wave may be a sine wave carrier, a pulse carrier, or a triangle wave carrier, etc. The modulation may be on-off keying (OOK), phase shift keying or frequency shift keying (FSK), etc. In the no-modulation mode, the encoded baseband signal is directly driven by the driver circuit and transmitted by the transmitter coil.

Step c43, selecting the transmission magnetic flux density Bc of the second low-frequency channel. Specifically, under a selected operating frequency that is less than f0', a selected modulation scheme and a selected coding mode, first selecting the typical noise terminal and the magnetic detection and the amplification gain that are easy to achieve by the first RF device; then detecting inherent noise voltage amplitude Vn' of the detection voltage of the first RF device when the mobile terminal is not sending the low-frequency alternating magnetic field signal. Further, detecting the detection voltage Vr of the first RF device when the mobile terminal is sending the low-frequency alternating magnetic field signal using the selected modulation and coding mode. The transmission magnetic flux density Bc is selected such that Vr/Vn'>SNR', where SNR' is the signal-noise-ratio of the low-frequency signal of the first RF device. In general SNR' value may be selected as large as possible, as not to cause the transmission power of the second RF device to be too high. For example, the SNR' may be selected as SNR'=10. After the SNR' is determined, Bc is also determined as described above.

Step d4, the first RF device detects the second low-frequency alternating magnetic field signal.

Specifically, after receiving the second low-frequency alternating magnetic field signal, the first RF device obtains the identification information carried by the signal, and compares the identification information of the first RF device in the second low-frequency alternating magnetic field signal with its own identification information. If they are the same, the first RF device combines its own identification information and the identification information of the second RF device, which can be used for the RF communication address and channel parameters of the RF communication to conduct card transaction with the terminal equipped with the second RF device.

Step e4, based on the first low-frequency alternating magnetic field signal detected by the second RF device and the second low-frequency alternating magnetic field signal detected by the first RF device, the distance between the first RF device and the second RF device can be determined, such that the second RF device and the first RF device can exchange information within a preset distance range through the RF channel.

Further, the following steps can be performed to determine, based on the first low-frequency alternating magnetic field signal detected by the second RF device and the second low-frequency alternating magnetic field signal detected by the first RF device, the distance between the first RF device and the second RF device.

The second RF device converts the first low-frequency alternating magnetic field signal into a first electrical signal.

The second RF device compares the first electrical signal with a preset first threshold value and, based on the comparison result, determines whether the second RF device enters into a predetermined valid distance range between the first RF device and the second RF device.

The first RF device demodulates the second low-frequency alternating magnetic field signal to obtain the identification information of the first RF device carried in the second low-frequency alternating magnetic field signal.

The first RF device compares the demodulated identification information of the first RF device and stored its own identification information and, based on the comparison result, determines whether the first RF device enters into a predetermined valid distance range between the second RF device and the first RF device.

When the second RF device enters into the predetermined valid distance range between the first RF device and the second RF device, and the first RF device enters into the predetermined valid distance range between the second RF device and the first RF device, it can be determined that the distance between the second RF device and the first RF device is within the predetermined valid communication distance range.

Further steps may also be included: the first RF device converts the second low-frequency alternating magnetic field signal into a second electrical signal, the first RF device compares the second electrical signal with the preset second threshold value and, based on the comparison result, determines whether the first RF device enters into a predetermined valid distance range between the second RF device and the first RF device.

The above disclosed communication methods use the low-frequency two-way magnetic-field detection techniques to achieve secure communication distance control, without the need for terminal calibration.

Additionally, because the current required for the low-frequency transmission magnetic field intensity of the low-frequency channel is drawn from the mobile terminal, the current can be provided by the mobile terminal usually is limited to, for example, a maximum of 50 mA, the communication distance of the low-frequency channel will not be expanded too much even when the transmission parameters of the mobile terminal is tampered, and the effective communication distance can still be controlled within about Din~Din+Dv' range Further, the frequency of the low-frequency alternating magnetic field signal may be in the low frequency band, very-low frequency band, or ultra-low frequency band. For example, the ultra-low frequency band may be in a range of approximately 300 Hz~3000 Hz, the very-low frequency band may be in a range of approximately 3 KHz~30 KHz, and the low frequency band may be in a range of approximately 30 KHz~300 KHz. In certain embodiments, the frequency of the low-frequency alternating magnetic field signal can be in a range of approximately 300 Hz~50 KHz. For example, the frequency of the first low-frequency alternating magnetic field signal can be approximately 500 Hz, 1 KHz, 1.5 KHz, 2 KHz, 2.5 KHz, 3 KHz, 4 KHz, 5 KHz, 10 KHz, 20 KHz, 30 KHz, 40 KHz or 50 KHz; and the frequency of the second low-frequency alternating magnetic field signal can be approximately 10 KHz, 15 KHz, 20 KHz, 25 KHz or 30 KHz.

According to the disclosed embodiments, a communication system is also provided for using the low-frequency two-way magnetic-field detection techniques to achieve effective communication distance control, implementing the above disclosed methods.

Figure 45:
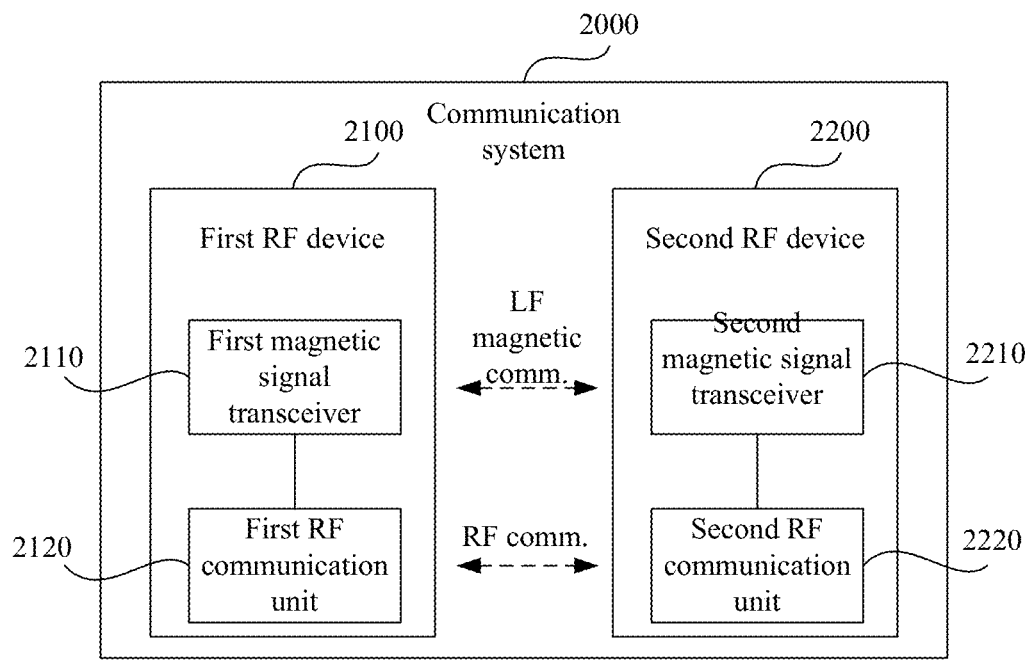
FIG. 45 illustrates a block diagram of an overall structure of a communication system.

FIG. 45 is a block diagram of an overall structure of a communication system according to disclosed embodiments. As shown in FIG. 45, in this embodiment, the communication system 2000 includes a first RF device 2100 and a second RF device 2200. The first RF device 2100 and second RF device 2200 control the communication distance through the low-frequency alternating magnetic field signals, and exchanges information through the RF channel.

Also shown in FIG. 45, the first RF device 2100 includes a first magnetic signal transceiver 2100 and a first RF communication unit 2120. The magnetic signal transceiver 2100 is configured to generate and transmit the first low-frequency alternating magnetic field signal, and to receive the second low-frequency alternating magnetic field signal, and the first radio communication unit 2120 is configured to exchange information with a second RF communication unit 2220. The second RF device 2200 includes a magnetic signal transceiver 2210 and the second RF communication unit 2220. The magnetic signal transceiver 2210 is configured to generate and transmit the second low-frequency alternating magnetic field signal, and to receive the first low-frequency alternating magnetic field signal. The second RF communication unit 2220 is configured to exchange information with the first RF communication unit 2120.

Of course, the first magnetic signal transceiver 2100 may further include a first magnetic signal receiving unit and a first magnetic signal transmitting unit (not shown). The first magnetic signal transmitting unit is configured to transmit the first low-frequency alternating magnetic field signal, and the first magnetic signal receiving unit is configured to receive the second low-frequency alternating magnetic field signal. The second magnetic signal transceiver 2210 may further include a second magnetic signal receiving unit and a second magnetic signal transmitting unit (not shown). The second magnetic signal transmitting unit is configured to transmit the second low-frequency alternating magnetic field signal, and the second magnetic signal receiving unit is configured to receive the first low-frequency alternating magnetic field signal.

Figure 46:
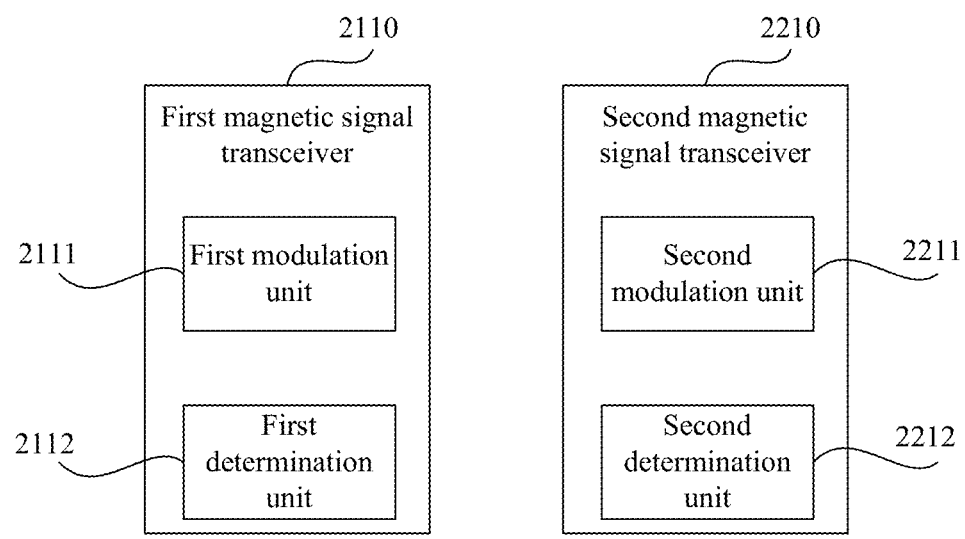
FIG. 46 illustrates a specific configuration of first magnetic signal transceiver 711 and second magnetic signal transceiver 721 of FIG. 45.

FIG. 46 is a specific configuration of the first magnetic signal transceiver 2100 and the second magnetic signal transceiver 2210. As shown in FIG. 46, the first magnetic signal transceiver 2100 may comprise a first modulation unit 2111, and the first modulation unit 2111 is configured to add the identification information of the first RF device into the first low-frequency alternating magnetic field signal. The second magnetic signal transceiver 2210 may comprise a second modulation unit 2211, and the second modulation unit 2211 is configured to add the identification information of the second RF device into the second low-frequency alternating magnetic field signal. Specifically, the first modulation unit 2111 can be included in the first magnetic signal transmitting unit of the first magnetic signal transceiver 2100, and the second modulation unit 2211 may be included in the second magnetic signal transmitting unit of the second magnetic signal transceiver 2210.

Further, in FIG. 46, the first magnetic signal transceiver 2100 can also include a first determination unit 2112. The first determination unit 2112 is configured to determine whether the first RF device enters into the preset valid card transaction range between the second RF device and the first RF device, based on the second low-frequency alternating magnetic field signal detected by the first RF device. Further, the second magnetic signal transceiver 2210 can also include a second determination unit 2212. The second determination unit 2212 is configured to determine whether the second RF device enters into the preset valid card transaction range between the first RF device and the second RF device, based on the first low-frequency alternating magnetic field signal detected by the second RF device. When the first determination unit 2112 determines that the first RF device enters into the preset valid card transaction range between the second RF device and the first RF device, and the second determination unit 2212 determines that the second RF device enters into the preset valid card transaction range between the first RF device and the second RF device, it can be determined that the distance between the first RF device and the second RF device is within the predetermined effective communication distance range. Specifically, the first determination unit 2112 can be included in the first magnetic signal receiving unit of the first magnetic signal transceiver 2100, and the second determination unit 2212 may be included in the second magnetic signal receiving unit of the second magnetic signal transceiver 2210.

Of course, the first magnetic signal transceiver 2100 and/or the second magnetic signal transceiver 2210 may further include a magnetic signal receiving unit (not shown), a magnetic signal transmitting unit (not shown) and the like, the detailed descriptions of which are omitted herein.

Figure 47:
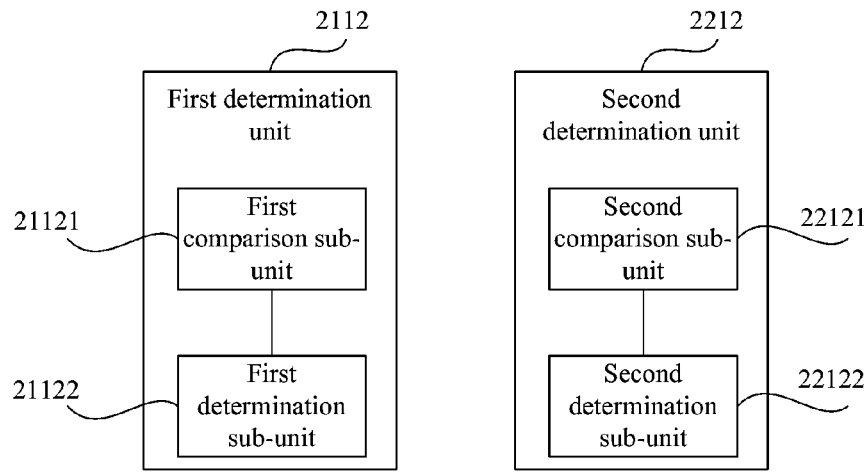
FIG. 47 illustrates a specific configuration diagram of first determination unit 7112 and second determination unit 7212 of FIG. 46.

FIG. 47 illustrates a specific configuration of the first determination unit 2112 and the second determination unit 2212 shown in FIG. 46. As shown in FIG. 47, the first determination unit 2112 may comprise a first comparison sub-unit 21121 and a first determination sub-unit 21122. The first comparison sub-unit 21121 is configured to compare the identification information of the first RF device demodulated from the second low-frequency alternating magnetic field signal with its own stored identification information; and the first determination sub-unit 21122 is configured to, based on the comparison result, determines whether the first RF device enters into a predetermined valid distance range between the second RF device and the first RF device.

The second determination unit 2212 can include a second comparison sub-unit 22121 and a second determination sub-unit 22122. The second comparison sub-unit 22121 is configured to compare the electrical signal converted from the first low-frequency alternating magnetic field signal with the preset threshold value, and the second determination sub-unit 22122 is configured to, based on the comparison result, determines whether the second RF device enters into a predetermined valid distance range between the second RF device and the first RF device.

It should be noted that, those skilled in the art can understand that the multiple modules or units may be combined into one module or unit, and one module or unit can be further divided into multiple sub-modules or sub-units.

According to the disclosed embodiments, the communication system comprises at least one first RF device and at least one second RF device. The first RF device and the second RF device perform communication distance control through low-frequency alternating magnetic field signals, and the first RF device and the second RF device exchange information via the RF channel. Further, the first RF device includes a first magnetic signal transceiver configured to generate and transmit the first low-frequency alternating magnetic field signal and to receive the second low-frequency alternating magnetic field signal, and a first radio communication unit configured to exchange information with a second RF communication unit. The second RF device includes a second magnetic signal transceiver configured to generate and transmit the second low-frequency alternating magnetic field signal, and to receive the first low-frequency alternating magnetic field signal, and a second RF communication unit configured to exchange information with the first RF communication unit.

Specifically, the first RF device can transmit the first low-frequency alternating magnetic field signal based on the first transmission parameters through the first low-frequency channel. The first low-frequency alternating magnetic field signal carries the identification information of the first RF device, and the first transmission parameters can include the frequency of the first low-frequency alternating magnetic field signal. This frequency is less than or equal to the highest frequency f0' of the first low-frequency channel. The first RF device can also receive the second low-frequency alternating magnetic field signal transmitted by the second RF device based on the second transmission parameters through the second low-frequency channel, and compare identification information of the first RF device carried in the second low-frequency alternating magnetic field signal with its own identification information. If they are the same, the first RF device combines its own identification information and the identification information of the second RF device, which can be used for the RF communication address and channel parameters of the RF communication to conduct card transaction with the terminal equipped with the second RF device through the RF channel.

More specifically, the second RF device receives and detects the first low-frequency alternating magnetic field signal sent by the first RF device at each distance through the first low-frequency channel, and amplifies the first low-frequency alternating magnetic field signal into an electrical signal corresponding to the distance and with constant amplitude (a voltage signal or a current signal). Further, based on a preset threshold value, it can be determined whether the terminal with the second RF device enters into the effective card transaction range. The threshold value may be set the same for all terminal with the second RF device When the voltage signal corresponding to the received first low-frequency alternating magnetic field signal is greater than or equal to the preset voltage threshold, the second RF device obtains the identification information of the first RF device from the received first low-frequency alternating magnetic field signal and, based on the second transmission parameters, transmits the second low-frequency alternating magnetic field signal through the second low-frequency channel. The second low-frequency alternating magnetic field signal carries the identification information of the first RF device obtained by the second RF device, and the identification information of the second RF device itself. The second transmission parameters include the frequency of the second low-frequency alternating magnetic field signal. This frequency is equal to or less than the maximum operating frequency f0' of the second low-frequency channel. The second RF device can then conduct card transactions with the first RF device through the RF channel.

Figure 48:
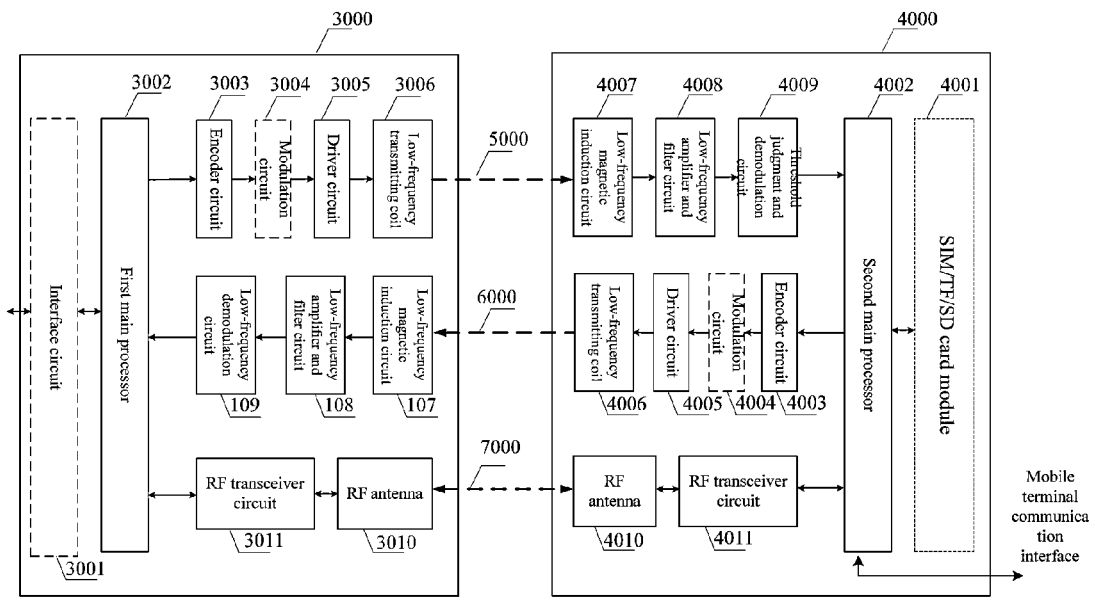
FIG. 48 illustrates a detailed structural diagram of a communication system.

FIG. 48 shows an exemplary communication system according to disclosed embodiments. As shown in FIG. 48, the communication system consists of two parts: the first RF device 3000 and the second RF device 4000.

The first RF device 3000 may comprise at least one transmitter coil 3006, at least one driver circuit 3005, at least an encoding circuit 3003, and at least a first main processor 3002. The low-frequency transmitter coil 3006, the driver circuit 3005, the encoding circuit 3003 and the first main processor 3002 are sequentially connected in series. The first RF device 3000 may also comprise at least a low-frequency magnetic induction circuit 3007, at least one low-frequency amplifier and filter circuit 3008, at least a demodulation circuit 3009. The low-frequency magnetic induction circuit 3007, the low-frequency amplifier and filter circuit 3008, and the demodulation circuit 3009 are sequentially connected to the first main processor 3002 in series. Further, the first RF device 3000 may at least one RF transceiver circuit 3011 and an RF antenna 3010. The RF antenna 3010 and the RF transceiver circuit 3011 are sequentially connected to the first main processor 3002 in series. There may be a modulation circuit 3004 provided between the drive circuit 3005 and the encoding circuit 3003, and the drive circuit 3005, the modulation circuit 3004, and the encoding circuit 3003 may be sequentially connected in series.

The second RF device 4000 may comprise at least one transmitter coil 4006, at least one driver circuit 4005, at least an encoding circuit 4003, and at least a second main processor 4002. The low-frequency transmitter coil 4006, the driver circuit 4005, the encoding circuit 4003 and the second main processor 4002 are sequentially connected in series. The second RF device 4000 may also comprise at least a low-frequency magnetic induction circuit 4007, at least one low-frequency amplifier and filter circuit 4008, at least a threshold judgment and demodulation circuit 4009. The low-frequency magnetic induction circuit 4007, the low-frequency amplifier and filter circuit 4008, and the threshold judgment and demodulation circuit 4009 are sequentially connected to the second main processor 4002 in series. Further, the second RF device 4000 may at least one RF transceiver circuit 4011 and an RF antenna 4010. The RF antenna 4010 and the RF transceiver circuit 4011 are sequentially connected to the second main processor 4002 in series. There may be a modulation circuit 4004 provided between the drive circuit 4005 and the encoding circuit 4003, and the drive circuit 4005, the modulation circuit 4004, and the encoding circuit 4003 may be sequentially connected in series.

In certain circuitry implementation, the low-frequency transmitter coil or coils can be wire coil or PCB coil. Preferably, the low-frequency transmitter coil can have more than 4 turns.

Preferably, the low-frequency transmitter coil of the first RF device can be filled with a ferrite core or an iron core. The largest width of the cross-sectional area enclosed by the low-frequency transmit coil of the first RF device may be greater than the width of the cross-sectional area of the second RF device. Preferably, the cross-sectional area enclosed by the low-frequency transmit coil of the first RF device may include at least a circular cross-sectional area with a diameter of 3 cm or a square area of 3 cm×3 cm. Preferably, the low-frequency transmitter coil of the first RF device can have approximately 50 to 500 turns.

The magnetic induction device used by the low-frequency magnetic induction circuit may be a wire coil, a PCB coil, a Hall device or a giant magnetoresistive device. Preferably, the low-frequency magnetic induction circuit of the first RF device is a low-frequency receiver coil, and the low-frequency receiver coil can have approximately 50 to 500 turns.

Further, the second RF device may be disposed inside a mobile terminal or on a SIM card, a UIM card, a USIM card, a TF card, or an SD card in the mobile terminal. The mobile terminal may include a mobile phone, a personal digital assistant PDA, an MP4 or a laptop computer, etc.

The implementation of the communication system is illustrated as follows.

(1), The communication frequency f of the first low-frequency channel and the communication frequency f' of the second low-frequency channel can be selected using previously-describe methods, the details of which are not repeated herein.

(2), the Process for Distance Control and Connection the Second RF Device to the First RF Device.

The first RF device switches back and forth between a low-frequency transmitting state and a low-frequency receiving state at a fixed period. When in the transmitting state, the first RF device transmits the first low-frequency alternating magnetic field signal at a frequency no higher than the selected frequency f0 using preconfigured transmission parameters and based on the distance control target. The first low-frequency alternating magnetic field signal carries a data frame based on modulated signal or direct baseband signal. The data frame contains a unique identifier IDr of the first RF device (of course can also be other identification information). When the mobile terminal with the second RF device is placed around the first RF device, the low-frequency alternating magnetic field signal penetrates the mobile terminal and reaches the second RF device. The second RF device detects and amplifies the low-frequency alternating magnetic field signal at each distance point into a voltage signal of constant amplitude and corresponding to the distance point.

When the voltage value is lower than the preset threshold value Vt in the second RF device, it indicates that the terminal does not enter into a valid card transaction range, and card transactions are not allowed. When the voltage amplitude is higher than the preset voltage threshold Vt, it indicates that the terminal enters into the valid card transaction range of the first RF device, and the second RF device parses the information in the magnetic field signal and obtains the identifier IDr of the first RF device. The second RF device then sends the second low-frequency alternating magnetic field signal to the first RF device, and the signal carries a data frame based on modulated signal or direct baseband signal. The data frame contains the unique identifier IDr of the first RF device and a unique identifier IDc of the second RF device. The first RF device parses the magnetic field signal and obtains the IDr and the IDc, and compares with the received IDr and its own IDr. If the received IDr is the same as its own IDr, it indicates that the first RF device and the terminal enter into the valid card transaction range. The first RF device combines the IDr and the IDc to generate the RF communication address and initiate card transaction. Further, when a card transaction is initiated, the first RF device is no longer switching between the low-frequency transmitting state and the low-frequency receiving state periodically. Instead, the first RF device continuously transmits the low-frequency magnetic field signal to ensure that the mobile terminal with the second RF device and the first RF device are always within the valid card transaction range. Thus, the second RF device and the first RF device can be uniquely bond, with both sides using the unique combined address (IDr, IDc) to identify each other. After the binding, the communication process for data exchange using the RF channel is less likely to generate errors. That is, after the second RF device is successfully bond with or connected to the first RF device, the distance control process is completed, and a subsequent card transaction can be carried out on the RF channel until the end of the transaction.

(3), the Transaction Process.

The first RF device and the second RF device establish the unique and reliable communication link through the RF channel. Based on the communication link, the two sides can complete the authentication required by the transaction and other processes required by the transaction. All of these processes can be accomplished by a fast RF channel. Because the above described process can ensure that the connection can only be made within a predetermined distance range, the entire transaction process can also be communication limited within the predetermined distance range.

Further referring to FIG. 48, the communication system consists of two parts: the first RF device 3000 and the second RF device 4000. The second RF device 4000 is placed inside a mobile terminal and interacts with the mobile terminal through terminal communication interfaces.

The first RF device 3000 may comprise the following modules: a first main processor 3002, responsible for the first RF device low frequency and high frequency control and processing other protocols, the first main processor 3002 can connect to the external communication interface via the interface circuit 3001 or directly; an encoding circuit 3003 responsible for coding the low-frequency frame data bit by bit; a modulation circuit 3004 responsible for modulating the symbol stream outputted by the encoding circuit against a carrier wave to generate a modulated signal to the drive circuit 3005 or for directly sending the encoded signal to the drive circuit 3005 if no modulation is used; a drive circuit 3005, responsible for driving the low-frequency transmitter coil 3006 to generate the low-frequency alternating magnetic field signal 5000; a low-frequency magnetic induction circuit 3007 comprising a PCB coil, a wire coil, a giant magnetoresistive device, a Hall device, or other circuit elements capable of sensing magnetic field changes, responsible for inducing and converting the low-frequency alternating magnetic field signal 6000 into an electrical signal; a low-frequency amplifier and filter circuit 3008 responsible for amplifying the electrical signal detected by the low-frequency magnetic induction circuit and filtering out the noise component; a demodulation circuit 3009 responsible for demodulating the low-frequency signal with the noise component filtered out to generate the encoded signal transmitted by the encoding circuit 4003 of the second RF device 4000, and sending the demodulated encoded signal to the first main processor 3002. The first main processor 402 is responsible for decoding processing. An RF transceiver circuit 3011 is responsible for completing RF two-way communication with the RF transceiver module of the second RF device 4000 through the RF antenna 3010.

The second RF device 4000 may comprise the following modules: a second main processor 4002 responsible for controlling low-frequency and RF modules and processing other protocols and is also responsible for communicating with the mobile terminal; an SIM/TF/SD card module 4001 being internal SIM/TF/SD card module of the mobile terminal, the module type is determined by the specific type of the card; a low-frequency magnetic induction circuit 4007 comprising a PCB coil, a wire coil, a giant magnetoresistive device, a Hall device, or other circuit elements capable of sensing magnetic field changes, responsible for inducing and converting the low-frequency alternating magnetic field signal 5000 into an electrical signal; a low-frequency amplifier and filter circuit 4008 responsible for amplifying the electrical signal detected by the low-frequency magnetic induction circuit into a low-frequency detection voltage signal; a threshold judgment and demodulation circuit 4009 responsible for comparing the value of the low-frequency detection voltage signal the value with the preset threshold value Vt. If the value does not reach the threshold Vt, demodulation is not performed and any card transaction is not allowed. If the value reaches the preset threshold value Vt, the demodulation is performed and the demodulated signal is sent to the second main processor 4002. The second RF device 4000 also includes an encoding circuit 4003, responsible for encoding a low-frequency frame bit by bit; a modulation circuit 4004 responsible for modulating the symbol stream outputted by the encoding circuit against a carrier wave to generate a demodulated signal to the drive circuit 4005 or for directly sending the encoded signal to the drive circuit 4005 if no modulation is used; the drive circuit 4005, responsible for driving the low-frequency transmitter coil 4006 to generate the low-frequency alternating magnetic field signal 6000; and an RF transceiver circuit 4011 responsible for completing RF two-way communication with the RF transceiver module of the first RF device 3000 through the RF antenna 4010.

The communication system achieves distance detection and control without calibration by determining the low-frequency communication threshold from the first RF device to the mobile terminal and the low-frequency communication distance limitation from the mobile terminal to the RF card reader. That is, the first RF device 3000 transmits the first low-frequency alternating magnetic field signal 5000 in accordance with the preset transmission parameters, and the second RF device 4000 receives the magnetic field signal and converts it into a low-frequency detection voltage signal, and uses a preset threshold value to determine whether the terminal enters the preset valid distance range set by the first RF device 3000. After entering the valid distance range, the second RF device 4000 transmits the second low-frequency alternating magnetic field signal 6000 to the first RF device 3000. The first RF device 3000 receives the magnetic field signal and analyzes the data in the received signal. If the data is legitimate, it indicates that the first RF device 3000 and the mobile terminal enter into the valid card transaction range set by the system. Thus, the unique binding between the first RF device 3000 and the second RF device 4000 is realized by using the combination of the two-way low-frequency communication and two-way RF communication. That is, the first RF device 3000 uses the first low-frequency channel to send its unique identification IDr to the second RF device 4000, and the second RF device 4000 uses the second low-frequency channel to send its unique identification IDc appended to the identification IDr to the first RF device 3000. The first RF device 3000 determines the correctness returned IDr, and achieves a unique binding between the second RF device 4000 and the first RF device 3000. After the binding, the RF channel can be used to perform two-way high-speed communication of large amount of data.

The specific workflow of the communication system are illustrates in the followings.

(A) First, basic operation parameters of the system are selected, including the RF frequency, first low-frequency channel communication frequency f, second low-frequency channel communication frequency f', first RF device transmission parameters, second RF device transmission parameters, second RF device receiving voltage threshold Vt, and first RF device receiving circuitry parameters, etc.

1. Selecting the RF Frequency

The RF communication frequency may be selected above 2400~2483 MH 2.4G ISM band, so as to achieve high-speed communication and good terminal penetration. Other frequency, such as 433 MHz, 900 MHz, 5 GHz, or the like, can also be used.

2. Selecting the Communication Frequency f of the First Low-Frequency Channel

The method described above can be used to determine the communication frequency f of the first low-frequency channel. For a typical GSM mobile terminal, to achieve a range of 0~10 cm distance control, the frequency f0 may be less than 10 KHZ, such as such as 500 HZ, 1 KNZ, 1.5 KHZ, 2 KHZ, 2.5 KHZ, 3 KHZ, or 5 KHZ, etc.

3. Selecting the Communication Frequency f' of the Second Low-Frequency Channel

The method described above can be used to determine the communication frequency f' of the second low-frequency channel, with consideration on noise interference especially the audio interference. The frequency f' may be selected between 20 KHZ and 50 KHz, such as 30 KHZ, 40 KHZ, or 50 KHZ, etc.

4. Selecting the First RF Device Transmission Parameters.

The transmission parameters include modulation mode, coding scheme and transmission magnetic induction intensity Br.

Figures 49, 50, 51:
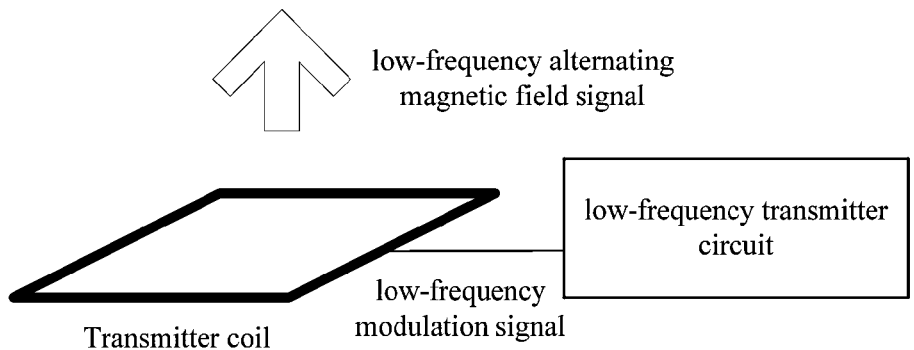
FIG. 49 illustrates a schematic diagram of the low-frequency transmitter part of the first RF device.
FIG. 50 illustrates a low-frequency data frame transmitted by the first RF device.
FIG. 51 illustrates a low-frequency data frame transmitted by the second RF device.

FIG. 49 is a schematic diagram of the low-frequency transmitter part of the first RF device. As shown in FIG. 49, the low-frequency transmitter portion of the first RF device includes a low-frequency transmitter circuit and a low-frequency transmitter coil. Referring to FIG. 48, the low-frequency transmitter circuit of the first RF device comprises the driving circuit 3005, the modulation circuit 3004, and the encoding circuit 3003. The low-frequency modulated signal driven by the driving circuit 3005 is outputted to the low-frequency transmitter coil 3006.

The modulation circuit 3004 can use the following modulation schemes:

(1) Carrier modulation: the baseband signal generated by the encoding circuit 3003 is modulated by the modulation circuit 3004 against the carrier, and the carrier may be a sine wave, a square wave, or a triangular wave, etc. The modulation can use On-off frequency shift keying (OOK), phase shift keying, frequency shift keying (FSK), etc. The modulated signal is loaded onto the low-frequency transmitter coil 3006 through the driving circuit 3005.

(2) No-carrier direct baseband transmission: the baseband signal generated by the encoding circuit 3003 is loaded directly onto the low-frequency transmitter coil 3006 through the drive circuit 3005.

(3) Other modulations: because the distance control is based on the threshold, the modulation mode used in general less prefers amplitude modulation, other modulation schemes that can maintain the detection voltage amplitude of the RF card substantially constant can also be used.

Encoding circuit 3003 can use the following encoding schemes:

(1) Manchester encoding: 1 bit is encoded as two symbols 01, bit 0 is encoded as 10.

(2) Differential Manchester encoding: two bit symbol sequences, 01 and 10, bit 1 is encoded differently from the previous symbol sequence, and bit 0 is encoded the same, or vice versa.

(3) Other encoding schemes: because the distance control is based on the threshold, the encoding may need to keep the average value of the low-frequency modulated signal, and the encoded sequence does not contain a DC component. Any encoding scheme resulting in zero average DC component can be used.

After selecting the modulation and coding schemes, the transmission magnetic induction intensity Br of the first RF device can be determined using the method described previously. The parameter Br can be adjusted by adjusting turns, diameter, and/or shape of the coil.

5. Selecting the Second RF Device Receiving Voltage Threshold Vt

The second RF device receiving voltage threshold Vt can be selected using the method described previously.

6. Selecting the Second RF Device Transmission Parameters

Referring to FIG. 48, the low-frequency transmitter circuit of the second RF device includes the driving circuit 4005, the modulation circuit 4004, and the encoding circuit 4003. The low-frequency modulated signal driven by the driving circuit 4005 is outputted to the low-frequency transmitter coil 4006.

Preferably, the modulation circuit 4004 can use the carrier modulation format. The encoding circuit 4003 can use various encoding modes, such as Manchester, Differential Manchester, NRZ, etc.

After selecting the modulation and coding schemes, the transmission magnetic induction intensity Bc of the second RF device can be determined using the method described previously. The parameter Bc can be adjusted by adjusting turns, diameter, and/or shape of the coil, and gain parameters of the driving circuit 4005.

7. Selecting the First RF Device Low-Frequency Receiving Circuitry Parameters

Referring to FIG. 48, the first RF device low-frequency magnetic induction circuit 3007 includes a winding-wire coil, a PCB coil, a Hall device, or a giant magnetoresistance device. Any such device with desired sensitivity can be selected in the low-frequency magnetic induction circuit of the first RF device.

The above parameters may only need to be selected once. After they are selected, no change might be required during operation.

(B) Second, the system operational flow after determining the operation parameters:

Step A701: distance detection and control process. The first main processor 3002 of the first RF device 3000 generates a data frame containing a unique identifier IDr of the first RF device 3000 and sends it to the encoding circuit 3003 to be encoded. The encoded signal is modulated by the modulation circuit 3004 and passed to the drive circuit 3005 or is directly passed to the drive circuit 3005 without modulation, the modulated voltage is sent to the low-frequency transmitter coil 3006. Based on preconfigured frame format, modulation and coding schemes, and driving capability, the transmitter coil 3006 transmits the first low-frequency alternating magnetic field signal 301 at the preset intensity Br periodically in accordance with the selected frame format and transmission parameters.

When the mobile terminal is placed around the first RF device 3000, the first low-frequency alternating magnetic field signal 3001 penetrates the terminal and reaches the low-frequency detection end of the second RF device 4000. The low-frequency magnetic induction circuit 4007 of the second RF device 4000 detects and amplifies the first low-frequency alternating magnetic field signal into an electrical signal. The electrical signal is amplified and filtered out noise component by the low-frequency amplifier circuit 4007 to generate a low-frequency detection voltage. When the voltage amplitude is less than the preset threshold value Vt, card transactions are not allowed. When voltage amplitude is greater than or equal to the preset threshold value Vt, it indicates that the terminal enters into the predetermined effective communication distance range of the first RF device, the threshold judgment and demodulation circuit 4009 parses the voltage signal to obtain IDr and send it to the second main processor 4002.

The second main processor 4002 combines the unique identifier IDc of the second RF device and the unique identifier IDr of the first RF device into a data frame and sends it to the encoding circuit 4003. The encoded signal is modulated by the modulation circuit 4004 and passed to the drive circuit 4005 or is directly passed to the drive circuit 4005 without modulation, the modulated voltage is sent to the low-frequency transmitter coil 4006. Based on preconfigured frame format, modulation and coding schemes, and preset magnetic field intensity Bc, the transmitter coil 4006 transmits the low-frequency alternating magnetic field signal 6000 periodically in accordance with the selected parameters.

The low-frequency magnetic induction circuit 3007 of the first RF device detects the low-frequency magnetic field signal and converts it into an electrical signal. The electrical signal is amplified and filtered out noise component by the low-frequency amplifier circuit 3008 to generate a low-frequency detection voltage. The voltage signal is processed by the low-frequency demodulation circuit 3009 to obtain the original encoded signal sent by the second RF device, which is then sent to the first main processor for decoding processing. After decoding, the IDr and the IDc is obtained, the first main processor determines whether the received IDr and its own IDr are the same. If the received IDr and its own IDr are not the same, card transactions are not allowed. If the received IDr and its own IDr are the same, it indicates that the first RF device and the mobile terminal enter into the preconfigured valid card transaction range.

The frame format in Step A701 can be defined as follows:

FIG. 50 illustrates a low-frequency data frame transmitted by the first RF device. As shown in FIG. 50, the first RF device low-frequency data frame includes the following.

Preamble: 8 bits, usually FFH, for frame synchronization.

Control field: eight bits, providing information for reading the frame, such as length, data type, etc., reserved bits can used for expansion.

IDr: N bits, the unique identifier of the first RF device, specified by the control field, where N is a natural number.

CRC: the checksum for the control field and the IDr, CRC checksum or other format can be used.

FIG. 51 illustrates a low-frequency data frame transmitted by the second RF device. As shown in FIG. 51, the second RF device low-frequency data frame includes the following.

Preamble: 8 bits, usually FFH, for frame synchronization.

Control field: eight bits, providing information for reading the frame, such as length, data type, etc., reserved bits can used for expansion.

IDr+IDc: N bits, the unique identifier of the first RF device and the unique identifier of the second RF device, specified by the control field, where N is a natural number.

CRC: the checksum for the control field, the IDr, and the IDc, CRC checksum or other format can be used.

The above-described frame format is only an example, any frame format containing the unique identifier of the RF card or the card reader can be used. The unique identifier can be a random number of sufficient length, the card reader may also be manually assigned a unique code, or other methods may be used to generate the unique identifier.

Step A702: as described in Step A701, after the first RF device determines that the received IDr information and its own IDr information are consistent, it indicates that the first RF device and the second RF device enter a valid card transaction range preconfigured by the system. The first main processor 4002 set the combination of the IDr and IDc as the RF communications address, so that the first RF device with identification IDc and the first RF device with identification IDr can establish unique communication. Thus, the second RF device and the first RF device are uniquely bond together, using the combination address (IDr, IDc) to uniquely identify each other. After the binding, the communication process over the RF channel is less likely to generate errors. After the second RF device is successfully connected to or bond to the first RF device, the distance control process is completed, and the subsequent card transaction process can be carried out on the RF channel.

The unique identifier IDc of the second RF device in Step A702 can be a unique identifier pre-stored in the nonvolatile memory (NVM) of the RF card, or a random number with a sufficient length internally generated by the second RF device.

Step A703: transaction process.

The first RF device 3000 and the second RF device 4000 establish a reliable and unique communication link through the RF channel. Based on the link, the two sides can complete the authentication required by the transaction and other processes required by the transaction. All of these processes can be accomplished by a fast RF channel. Because Steps A701~A702 can ensure that the connection to the second RF device can only be made within a predetermined distance range, the entire transaction process can also be communication limited within the predetermined distance range. The transaction process may be a POS transaction process, the details are omitted herein.

The low-frequency signal detection circuit 3007 and/or 4007 of the first RF device 3000 and the second RF device 4000 may comprise a PCB coil, a wire coil, a GMR device, or a Hall device. Other sensing device may also be used, so long as the device is capable of converting the magnetic field into an electrical signal, and with desired magnetic induction sensitivity. Only limitation is that the low-frequency signal detection circuit 4007 of the second RF device 4000 needs to be placed internally in a card, while the low-frequency signal detection circuit 3007 of the first RF device 3000 prefers magnetic induction components with high sensitivity.

Thus, the disclosed communication system can use low-frequency alternating magnetic field to achieve distance detection and control, and to achieve two-way low-frequency communication between the first RF device and the second RF device. The RF channel can be used in combination with the low-frequency two-way communication to achieve reliable and unique binding with the terminal, and the RF channel can be used to achieve high-speed data communication between the first RF device and the second RF device. Certain characteristics include: (1) the mobile terminal does not need to be modified, only needs to replace the SIM/TF/SD card inside the mobile terminal and the reliable two-way distance communication can be achieved; (2) because the current provided by the second RF device is limited, the communication distance of the low-frequency signal is limited, which can prevent the transmission power of the second RF device being tampered or increased, and the communication distance can be effectively controlled within a predetermined range. In addition, the RF transceiver circuit is placed within the second RF device to achieve two-way high-speed communication with the RF transceiver circuit with the first RF device. Because the antenna of the RF circuit is very small, it can be easily integrated into the SIM/TF/SD card.

According to the disclosed embodiments, the frequency f is selected to be less than the frequency f0 and the frequency f' is selected to be less than the frequency f0', no calibration is needed when the system operates at these frequencies, and the communication distance can be controlled safely and effectively. As an extension, frequency f may also be selected above the frequency f0 or frequency f' may also be selected above the frequency f0', which may cause reduced performance, reduced distance control accuracy, and/or reduced communication success rate. However, such use does not conflict with the disclosed invention, and merely an extension with modified performance.

According to the disclosed embodiments, two-way detection of a low-frequency alternating magnetic field signal can be used to effectively control the communication distance, improving the problem of uncontrollable communication distance and improving the security of card transaction communication and enhancing the security of card transaction communications.

The above mentioned examples are only some disclosed embodiments, and are not used to limit the present invention. Within the spirit and the scope of the present invention, any modifications, equal substitutions and improvements of those embodiments are all within the scope of the present invention.

What is claimed is:

1. A communication method, comprising:
controlling a communication distance between a first radio frequency (RF) device and a second RF device using a low-frequency magnetic field; and
exchanging information between the first RF device and the second RF device within a predetermined distance range using RF channels;
wherein, one of the first RF device and the second RF device receives a first low-frequency alternating magnetic field signal from the other of the first RF device and the second RF device to control the communication distance between the first RF device and the second RF device;
wherein receiving the first low-frequency alternating magnetic signal to control the communication distance further includes:
detecting the received first low-frequency alternating magnetic field signal;
converting the first low-frequency alternating magnetic field signal into a first electrical signal;
comparing the first electrical signal with a first preset threshold value; and controlling the communication distance between the first RF device and second RF device based on a comparison result;
wherein the first RF device is a card reader, the second RF device is a card, the first electrical signal is a voltage signal, and the first threshold value is a voltage threshold $V_t$;
wherein the voltage threshold $V_t$ is determined by:
under selected transmission parameters, measuring voltage-distance curves of a plurality of terminals and obstacles, the selected transmission parameters including a frequency of the low-frequency alternating magnetic field signal, a modulation mode, a coding mode, and a transmission magnetic flux density $B_e$;
obtaining a reference voltage-distance curve, the reference voltage-distance curve being an average value of curves of the terminals and obstacles; and
selecting a voltage value at a distance point at half of a maximum valid card transaction range on the reference voltage-distance curve as $V_t$ for the card reader.

2. The communication method according to claim 1, wherein: the first low-frequency alternating magnetic field signal is related to a frequency f0 and, when a frequency of first low-frequency alternating magnetic field signal is less than or equal to the frequency f0, the first RF device and the second RF device are within a valid distance range.

3. The communication method according to claim 2, and the frequency f0 is determined by:
determining a distance control target $(D_{in}, D_v)$ based on the first low-frequency alternating magnetic field signal, wherein Din represents a distance in which, within a range of 0-$D_{in}$, card transaction is ensured, and $D_v$ represents a distance fluctuation range in which, within $D_{in}$~$(D_{in}+D_v)$, card transaction is allowed and, beyond $D_{in}+D_v$, card transaction is not allowed;
determining a detection voltage fluctuation range $\delta_r$ of the card reader;
determining a detection voltage fluctuation range $\delta_c$ of the card;
determining said voltage-distance curves of the plurality terminals and obstacles at the frequency f of first low-frequency alternating magnetic field signal;
based on the distance control target $(D_{in}, D_v)$, determining a detection voltage fluctuation range $\delta_a$ of the card reader, the range $\delta_a$ being equal to a difference between a voltage corresponding to a distance point $D_{in}$ on a voltage-distance curve with an average field intensity attenuation curve slope and obtained from the voltage-distance curves of the plurality of terminals and obstacles and the voltage corresponding to a distance point $(D_{in}+D_v)$;
determining a detection voltage fluctuation range $\delta_t$ of the of the card caused by a mobile terminal containing the card, the parameter $\delta_t$ representing a fluctuation range of a detection voltage of the card caused by attenuation characteristics of the mobile terminal and $\delta_t = \delta_a - \delta_r - C$;

calculating a maximum field intensity difference δ at various distances with distance control range of various terminals and obstacles; if δ is greater than $δ_r$, decreasing a frequency f and continuing from the step of determining the voltage-distance curves; if δ is less than $δ_r$, increasing the frequency f and continuing from the step of determining the voltage-distance curves; and if δ is equal to $δ_r$, determining the current frequency f is the frequency f0.

4. The communication method according to claim 1, wherein the modulation mode, the coding mode, and the transmission magnetic flux density Be of the first low-frequency alternating magnetic field signal is selected by:

selecting a coding mode without an average DC component;

selecting no modulation or a carrier modulation mode without amplitude change;

selecting the transmission magnetic flux density Be by:

under a selected operating frequency that is less than a f0, a selected modulation and a selected coding mode, selecting magnetic detection and an amplification gain that are easy to achieve by the card reader;

detecting an inherent noise voltage amplitude Vn of the detection voltage of the card reader when there is no low-frequency alternating magnetic field signal;

detecting the detection voltage Vr of the card reader when the card reader is sending the low-frequency alternating magnetic field signal using the selected modulation and coding mode; and selecting the transmission magnetic flux density Be such that such that Vr/Vn>SNR, where SNR is signal-to-noise-ratio of the card reader.

5. The communication method according to claim 1, wherein:

the one of the first RF device and the second RF device sends a second low-frequency alternating magnetic field signal to the other of the first RF device and the second RF device with communication distance confirmation information.

6. The communication method according to claim 1, wherein:

one of the first RF device and the second RF device receives a second low-frequency alternating magnetic field signal from the other of the first RF device and the second RF device;

identification information carried in the second low-frequency alternating magnetic field signal is used to control communication distance between the first RF device and the second RF device.

7. The communication method according to claim 6, wherein:

one of the first RF device and the second RF device converts the second low-frequency alternating magnetic field signal into a second electrical signal and compares the second electrical signal with a second preset threshold; and when the second electrical signal is greater than or equal to the second preset threshold and the identification information in the second low-frequency alternating magnetic field signal is the same as identification information of the one of the first RF device and the second RF device sending the first low-frequency alternating magnetic field signal, it is determined that the first RF device and the second RF device are within a valid distance range.

8. The communication method according to claim 6, wherein:

the other of the first RF device and the second RF device controls the communication distance between the first RF device and the second RF device based on received first low-frequency alternating magnetic field signal and, when it is considered that the first RF device and the second RF device are within a valid distance range, sends back the second low-frequency alternating magnetic field signal.

9. The communication method according to claim 8, the first low-frequency alternating magnetic field signal is related to a frequency f0 and, when a frequency of first low-frequency alternating magnetic field signal is less than or equal to the frequency f0, mobile terminals equipped with the second RF device are within a valid distance range, the frequency f0 is determined by:

determining a distance control target (Din, Dv) based on the first low-frequency alternating magnetic field signal, wherein Din represents a distance in which, within a range of 0-Din, card transaction is ensured for the mobile terminals equipped with the second RF device, and Dv represents a distance fluctuation range in which, within Din~(Din–Dv), card transaction is allowed and, beyond Din+Dv, card transaction is not allowed;

determining a detection voltage fluctuation range δr of the second RF device caused by the first RF device;

determining a detection voltage fluctuation range δc caused by the second RF device;

determining said voltage-distance curves of the plurality terminals and obstacles at the frequency f of first low-frequency alternating magnetic field signal;

based on the distance control target (Din, Dv), determining a detection voltage fluctuation range δa of the second RF device, the range δa being equal to a difference between a voltage corresponding to a distance point Din on a voltage-distance curve with an average field intensity attenuation curve slope and obtained from the voltage-distance curves of the plurality of terminals and obstacles and the voltage corresponding to a distance point (Din+Dv);

determining a detection voltage fluctuation range δt of the second RF device caused by a mobile terminal containing the second RF device, the parameter δt representing a fluctuation range of a detection voltage of the card caused by attenuation characteristics of the mobile terminal and δt=δa−δr−δc;

calculating a maximum field intensity difference δ at various distances with distance control range of various terminals and obstacles; if δ is greater than δt, decreasing a frequency f and continuing from the step of determining the voltage-distance curves; if δ is less than δt, increasing the frequency f and continuing from the step of determining the voltage-distance curves; and if δ is equal to δt, determining the current frequency f is the frequency f0.

10. The communication method according to claim 8, the first low-frequency alternating magnetic field signal is related to a frequency f0' and, when a frequency of first low-frequency alternating magnetic field signal is less than or equal to the frequency f0', mobile terminals equipped with the second RF device are within a valid distance range, the frequency f0' is determined by:

determining a distance control target (Din, Dv') based on the first low-frequency alternating magnetic field signal, wherein Din represents a distance in which, within a range of 0-Din, card transaction is ensured for the mobile terminals equipped with the second RF device, and Dv' represents a distance fluctuation range in which, within Din~(Din+Dv'), card transaction is allowed and, beyond Din+Dv', card transaction is not allowed;

determining a detection voltage fluctuation range $\delta r$ of the second RF device caused by the first RF device;

determining a detection voltage fluctuation range $\delta c$ caused by the second RF device;

determining said voltage-distance curves of the plurality terminals and obstacles at the frequency f of first low-frequency alternating magnetic field signal;

based on the distance control target (Din, Dv'), determining a detection voltage fluctuation range $\delta a'$ of the second RF device, the range $\delta a'$ being equal to a difference between a voltage corresponding to a distance point Din on a voltage-distance curve with an average field intensity attenuation curve slope and obtained from the voltage-distance curves of the plurality of terminals and obstacles and the voltage corresponding to a distance point (Din+Dv);

determining a detection voltage fluctuation range $\delta t'$ of the second RF device caused by a mobile terminal containing the second RF device, the parameter $\delta t'$ representing a fluctuation range of a detection voltage of the card caused by attenuation characteristics of the mobile terminal and $\delta t' = \delta a' - \delta r' - \delta c'$;

calculating a maximum field intensity difference $\delta'$ at various distances with distance control range of various terminals and obstacles; if $\delta'$ is greater than $\delta t'$, decreasing a frequency f' and continuing from the step of determining the voltage-distance curves; if $\delta'$ is less than $\delta t'$, increasing the frequency f' and continuing from the step of determining the voltage-distance curves; and if $\delta'$ is equal to $\delta t'$, determining the current frequency f' is the frequency f0'.

11. The communication method according to claim 8, wherein the modulation mode, the coding mode, and the transmission magnetic flux density Br of the first low-frequency alternating magnetic field signal is selected by:

selecting a coding mode without an average DC component;

selecting no modulation or a carrier modulation mode without amplitude change;

selecting the transmission magnetic flux density Br by:

under a selected operating frequency that is less than f0, a selected modulation and a selected coding mode, selecting a typical noise mobile terminal and magnetic detection and the amplification gain that are easy to achieve in the second RF device;

detecting an inherent noise voltage amplitude Vn of the detection voltage of the second RF device when there is no low-frequency alternating magnetic field signal;

detecting the detection voltage Vc of the second RF device when the first RF device is sending the low-frequency alternating magnetic field signal using the selected modulation and coding mode; and selecting the transmission magnetic flux density Br such that such that Vc/Vn>SNR, where SNR is signal-to-noise-ratio of the second RF device.

12. The communication method according to claim 11, wherein the modulation mode, the coding mode, and the transmission magnetic flux density Bc of the second low-frequency alternating magnetic field signal is selected by:

selecting a coding mode without an average DC component;

selecting no modulation or a carrier modulation mode without amplitude change;

selecting the transmission magnetic flux density Bc by:

under a selected operating frequency that is less than f0', the selected modulation and the selected coding mode, selecting a typical noise terminal and magnetic detection and the amplification gain that are easy to achieve by the first RF device;

detecting an inherent noise voltage amplitude Vn' of the detection voltage of the first RF device when no low-frequency alternating magnetic field signal;

detecting the detection voltage Vr of the first RF device when the mobile terminal is sending the low-frequency alternating magnetic field signal using the selected modulation and coding mode; and selecting the transmission magnetic flux density Bc such that such that Vr/Vn'>SNR', where SNR' is signal-to-noise-ratio of the first RF device.

\* \* \* \* \*